US011094966B2

(12) United States Patent
Ren et al.

(10) Patent No.: US 11,094,966 B2
(45) Date of Patent: Aug. 17, 2021

(54) HIGH EFFICIENCY ELECTROLYTES FOR HIGH VOLTAGE BATTERY SYSTEMS

(71) Applicant: Battelle Memorial Institute, Richland, WA (US)

(72) Inventors: Xiaodi Ren, Richland, WA (US); Wu Xu, Richland, WA (US); Ji-Guang Zhang, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 16/230,531

(22) Filed: Dec. 21, 2018

(65) Prior Publication Data

US 2019/0140322 A1 May 9, 2019

Related U.S. Application Data

(63) Continuation-in-part of application No. 15/599,298, filed on May 18, 2017, now Pat. No. 10,367,232.
(Continued)

(51) Int. Cl.
*H01M 10/0569* (2010.01)
*H01M 4/133* (2010.01)
(Continued)

(52) U.S. Cl.
CPC ....... *H01M 10/0569* (2013.01); *H01M 4/131* (2013.01); *H01M 4/133* (2013.01);
(Continued)

(58) Field of Classification Search
None
See application file for complete search history.

(56) References Cited

U.S. PATENT DOCUMENTS 4,086,403 A 4/1978 Whittingham et al.
5,830,660 A 11/1998 Hillman et al.
(Continued)

FOREIGN PATENT DOCUMENTS

CN 107978794 5/2018
JP 2000294281 10/2000
(Continued)

OTHER PUBLICATIONS

Ding et al., "Effects of Carbonate Solvents and Lithium Salts on Morphology and Coulombic Efficiency of Lithium Electrode," *Journal of the Electrochemical Society* (Sep. 4, 2013). 160(10):A1894-A1901.
(Continued)

*Primary Examiner* — Lisa S Park
(74) *Attorney, Agent, or Firm* — Klarquist Sparkman, LLP

(57) ABSTRACT

Disclosed herein are embodiments of an electrolyte that is stable and efficient at high voltages. The electrolyte can be used in combination with certain cathodes that exhibit poor activity at such high voltages with other types of electrolytes and can further be used in combination with a variety of anodes. In some embodiments, the electrolyte can be used in battery systems comprising a lithium cobalt oxide cathode and lithium metal anodes, silicon anodes, silicon/graphite composite anodes, graphite anodes, and the like.

17 Claims, 54 Drawing Sheets

(48 of 54 Drawing Sheet(s) Filed in Color)

Related U.S. Application Data

(60) Provisional application No. 62/466,267, filed on Mar. 2, 2017.

(51) Int. Cl.

| H01M 4/131 | (2010.01) |
|---|---|
| H01M 10/0525 | (2010.01) |
| H01M 4/525 | (2010.01) |
| H01M 4/505 | (2010.01) |
| H01M 4/134 | (2010.01) |
| H01M 10/052 | (2010.01) |
| H01M 10/0567 | (2010.01) |
| H01M 10/0568 | (2010.01) |

(52) U.S. Cl.
CPC ............ *H01M 4/134* (2013.01); *H01M 4/505* (2013.01); *H01M 4/525* (2013.01); *H01M 10/052* (2013.01); *H01M 10/0525* (2013.01); *H01M 10/0567* (2013.01); *H01M 10/0568* (2013.01)

(56) References Cited

U.S. PATENT DOCUMENTS

| 8,815,453 | B1 | 8/2014 | Tsukamoto |
| 10,367,232 | B2 | 7/2019 | Zhang et al. |
| 10,472,571 | B2 | 11/2019 | Zhang et al. |
| 10,854,923 | B2 | 12/2020 | Xu et al. |
| 2007/0243470 | A1 | 10/2007 | Yamamoto et al. |
| 2010/0209782 | A1 | 8/2010 | Choi et al. |
| 2011/0111308 | A1 | 5/2011 | Halalay et al. |
| 2011/0200885 | A1 | 8/2011 | Yamada |
| 2012/0141883 | A1 | 6/2012 | Smart et al. |
| 2014/0125292 | A1 | 5/2014 | Best et al. |
| 2014/0342249 | A1 | 11/2014 | He et al. |
| 2015/0364801 | A1 | 12/2015 | Wijaya et al. |
| 2016/0020489 | A1 | 1/2016 | Rhodes et al. |
| 2016/0233549 | A1 | 8/2016 | Tiruvannamalai et al. |
| 2016/0240896 | A1 | 8/2016 | Zhang et al. |
| 2016/0248122 | A1 | 8/2016 | Hwang et al. |
| 2016/0254567 | A1 | 9/2016 | Cai et al. |
| 2016/0294005 | A1* | 10/2016 | Lee ............... H01M 10/0565 |
| 2016/0329567 | A1* | 11/2016 | Lee .................. H01M 4/366 |
| 2016/0344063 | A1 | 11/2016 | Chang et al. |
| 2016/0380314 | A1* | 12/2016 | Yang ............. H01M 10/0569 |
| | | | 429/231.95 |
| 2017/0062829 | A1* | 3/2017 | Ryu ............... H01M 10/0568 |
| 2017/0098858 | A1* | 4/2017 | Kim .................. H01M 4/623 |
| 2017/0162910 | A1 | 6/2017 | Katou et al. |
| 2017/0187031 | A1 | 6/2017 | Kurita et al. |
| 2017/0331152 | A1* | 11/2017 | Kim .................. H01M 4/134 |
| 2017/0352908 | A1 | 12/2017 | Noguchi et al. |
| 2018/0251681 | A1 | 9/2018 | Zhang et al. |
| 2018/0254524 | A1 | 9/2018 | Zhang et al. |
| 2018/0331393 | A1 | 11/2018 | Cho et al. |
| 2019/0123390 | A1 | 4/2019 | Xu et al. |
| 2019/0148775 | A1 | 5/2019 | Zhang et al. |
| 2020/0161706 | A1 | 5/2020 | Cao et al. |

FOREIGN PATENT DOCUMENTS

| JP | 2002-270222 | 9/2002 |
| JP | 2012-169138 | 9/2012 |
| WO | WO 2015/158755 | 10/2015 |
| WO | WO 2016/010090 | 1/2016 |
| WO | WO 2018/160209 | 9/2018 |

OTHER PUBLICATIONS

Doi, et al., "Dilution of Highly Concentrated $LiBF_4$ -Propylene Carbonate Electrolyte Solution with Fluoroalkyl Ethers for 5-V $LiNi_{0.5}Mn_{1.5}O_4$ Positive Electrodes," *Journal of the Electrochemical Society*, (Jan. 24, 2017). 164(1): A6412-A6416.

Dokko et al., "Solvate Ionic Liquid Electrolyte for Li—S Batteries," *Journal of the Electrochemical Society*, (Jun. 6, 2013). 160: A1304-A1310.

Qian et al., "High rate and stable cycling of lithium metal anodes," *Nature Communications* (Feb. 20, 2015), pp. 1-9.

Suo et al., "'Water-in-salt' electrolyte enables high-voltage aqueous lithium-ion chemistries," *Science*, (Nov. 20, 2015). 350(6263): 938-944.

Wang et al., "Superconcentrated electrolytes for a high-voltage lithium-ion battery," *Nature Communications*, (Jun. 29, 2016). 12032: 1-9.

Xu et al., "lithium metal anodes for rechargeable batteries,"*Energy & Environmental Science*, (2014). 7:513-537.

Yamada et al., "Review—Superconcentrated Electrolytes for Lithium Batteries,"*Journal of the Electrochemical Society*, (Oct. 9, 2015). 162(14): A2406-A2423.

Zhang, "Li Metal Anodes and Li Metal Batteries," presented at the $3^{rd}$ International Forum on Cathode & Anode Materials for Advanced Batteries, Apr. 14-15, 2017, 21 pp.

Zheng et al., "Electrolyte additive enabled fast charging and stable cycling lithium metal batteries," *Nature Energy*, (Feb. 27 2017). 2:1-8.

International Search Report and Written Opinion, dated Nov. 27, 2017, issued in corresponding International Application No. PCT/US2017/033391.

Chen et al., "High-Voltage Lithium-Metal Batteries Enabled by Localized High-Concentration Electrolytes," *Advanced Materials*, Mar. 25, 2018, vol. 30, issue 21.

International Search Report and Written Opinion issued for International Application No. PCT/US2019/049684 dated Feb. 12, 2020.

Office action dated Jan. 18, 2019, for U.S. Appl. No. 15/599,298.

Office Action dated Apr. 26, 2019, for U.S. Appl. No. 15/788,188, 17 pp.

International Search Report and Written Opinion issued for International Application No. PCT/US2018/049141 dated Jan. 20, 2019.

Chalasani et al., "Methylene ethylene carbonate: Novel additive to improve the high temperature performance of lithium ion batteries," *Journal of Power Sources*, vol. 208, pp. 67-73, Jun. 15, 2012.

Hyung et al., "Flame-retardant additives for lithium-ion batteries," *Journal of Power Sources* (2003) 119-121, 383-387.

Lee et al., "A novel flame-retardant additive for lithium batteries," *Electrochemical and Solid-State Letters*, 3(2): 63-65, Dec. 16, 1999.

Matsumoto et al., "A highly safe battery with a non-flammable triethyl-phosphate-based electrolyte," *Journal of Power Sources*, vol. 273, pp. 954-958, Oct. 2, 2014.

Qian et al., "High rate and stable cycling of lithium metal anodes," *Nature Communications*, pp. 1-9, Feb. 20, 2015.

Shiga et al., "Self-extinguishing electrolytes using fluorinated alkyl phosphates for lithium batteries," *Journal of Materials Chemistry A*, vol. 5, pp. 5156-5162, Feb. 8, 2017.

Shigematsu et al., "Thermal behavior of charged graphite and $LixCoO_2$ in electrolytes containing alkyl phosphate for lithium-ion cells," *Journal of the Electrochemical Society*, 156(3): A176-A180, Jan. 9, 2009.

Shim et al., "Electrochemical performance of lithium-ion batteries with triphenylphosphate as a flame-retardant additive," *Journal of Power Sources*, vol. 172, pp. 919-924, May 10, 2007.

Smart et al., "The evaluation of triphenyl phosphate as a flame retardant additive to improve the safety of lithium-ion battery electrolytes," *ECS Transactions*, 35(13): 1-11, 2011.

Smith et al., "Lithium-ion electrolytes containing flame-retardant additives for increased safety characteristics," *ECS Transactions*, 16(35): 33-41, 2009.

Suo et al., "'Water-in-salt' electrolyte enables high-voltage aqueous lithium-ion chemistries," *Science*, 350(6283): 938-944, Nov. 20, 2015.

Wang et al., "Nonflammable trimethyl phosphate solvent-containing electrolytes for lithium-ion batteries: II, The use of an amorphous carbon anode," *Journal of the Electrochemical Society*, (Aug. 24, 2001) 148(1 0): A 1066-A 1071.

Wang et al., "Fire-extinguishing organic electrolytes for safe batteries," *Nature Energy*, 3(1): Jan. 22-29, 2018.

(56) References Cited

OTHER PUBLICATIONS

Wang et al., "Nonflammable trimethyl phosphate solvent-containing electrolytes for lithium-ion batteries: I. Fundamental properties," *Journal of the Electrochemical Society*, 148(10): A1058-A1065, Aug. 24, 2001.
Xiang et al., "Dimethyl methylphosphonate (DMMP) as an efficient flame retardant additive for the lithium-ion battery electrolytes," *Journal of Power Sources* (May 6, 2007) 173: 562-564.
Xu et al., "An attempt to formulate nonflammable lithium ion electrolytes with alkyl phosphates and phosphazenes," *Journal of the Electrochemical Society* (Apr. 2, 2002) 149(5): A622-A626.
Xu et al., "Nonflammable electrolytes for Li-ion batteries based on a fluorinated phosphate," *Journal of the Electrochemical Society* (Jul. 2, 2002) 149(8): A 1079-1082.
Yao et al., "Comparative study of trimethyl phosphite and trimethyl phosphate as electrolyte additives in lithium ion batteries," *Journal of Power Sources* (2005) 144: 170-175.
Zhang et al., "Tris (2,2,2-trifluoroethyl) phosphite as a co-solvent for nonflammable electrolytes in Li-ion batteries," *Journal of Power Sources* (2003) 113: 166-172.
International Search Report and Written Opinion issued for International Application No. PCT/US2020/013363 dated May 7, 2020.
International Search Report and Written Opinion issued for International Application No. PCT/US2019/062276 dated Mar. 13, 2020.
Extended European Search Report for EPC App. No. 17898487.8, dated Dec. 4, 2020.
Kasnatscheew et al., "Determining oxidative stability of battery electrolytes: validity of common electrochemical stability window (ESW) data and alternative strategies," *Physical Chemistry Chemical Physics* 19(24):16078-16086, Jun. 5, 2017.
Li et al. "Atomic structure of sensitive battery materials and interfaces revealed by cryo-electron microscopy," *Science*, vol. 358, pp. 506-510, Oct. 27, 2017.
Li et al., "Li+Desolvation Dictating Lithium-Ion Battery Low-Temperature Performances," *ACS Appl. Mater. Interfaces*, 9(49): 21 pp., Nov. 17, 2017.
Zhu et al., "Perfluoroalkyl-substituted ethylene carbonates: Novel electrolyte additives for high-voltage lithium-ion batteries," *J. of Power Sources*, vol. 246, pp. 184-191, Jul. 25, 2013.

* cited by examiner

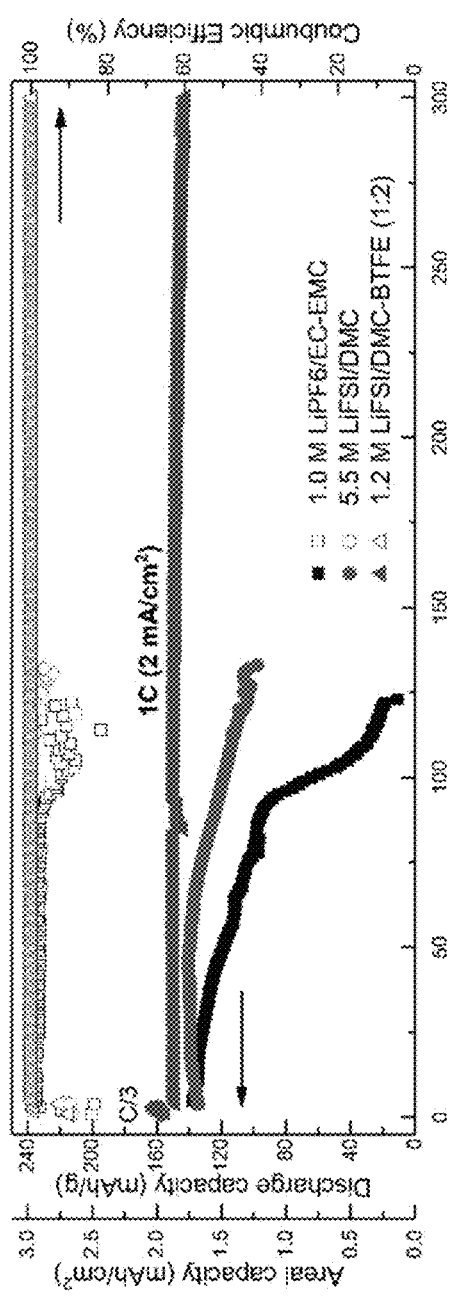
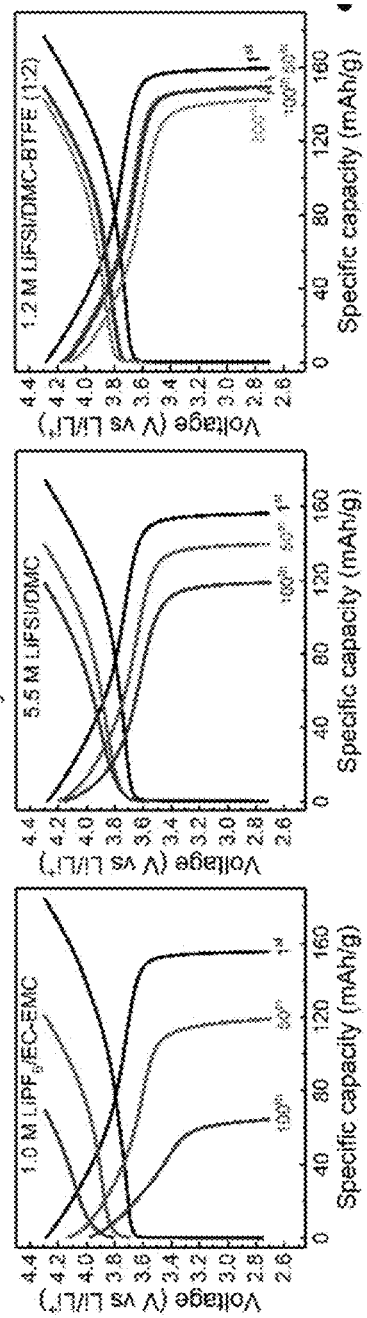
FIG. 18A
FIG. 18B
FIG. 18C
FIG. 18D

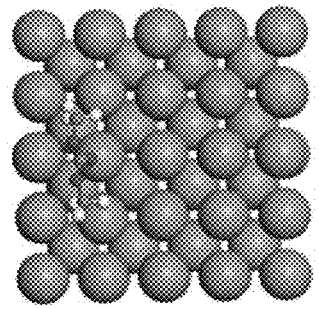
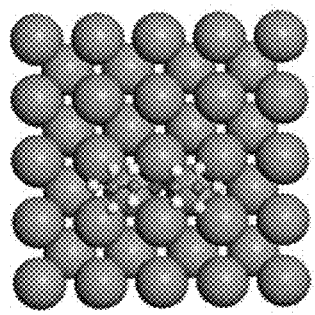
DMC
FIG. 36A
BTFE
FIG. 36B
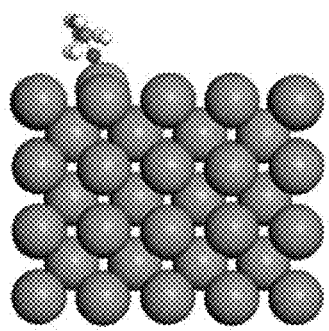
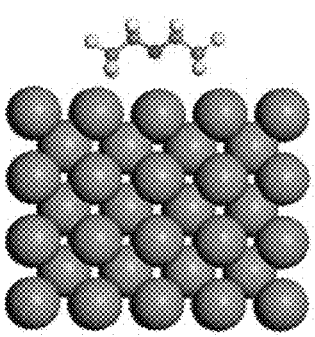
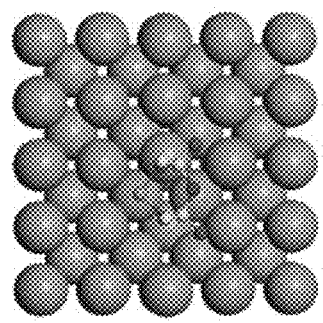
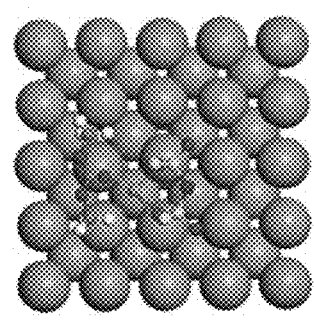
LiFSI
FIG. 36C
DMC-LiFSI
FIG. 36D
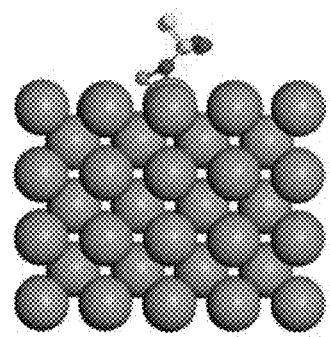
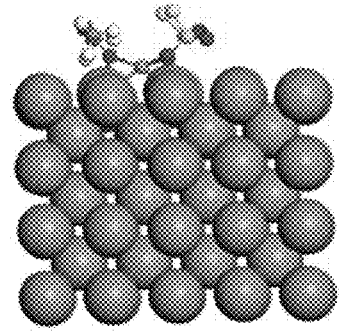

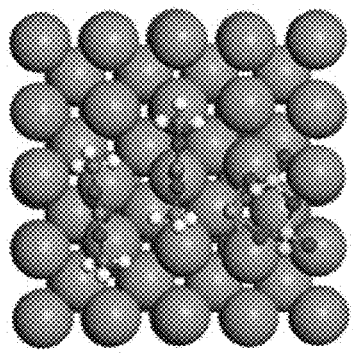
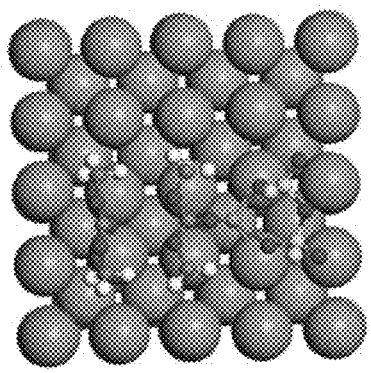
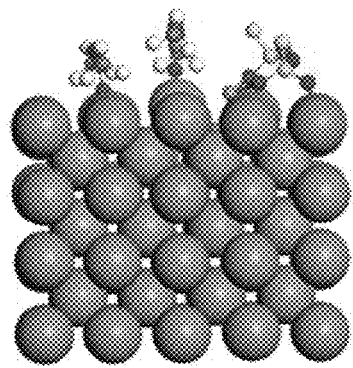
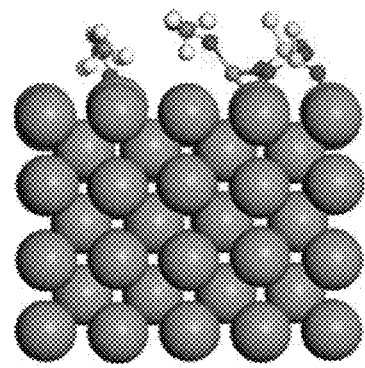
2DMC/LiFSI
FIG. 36E
DMC/DMC-LiFSI
FIG. 36F
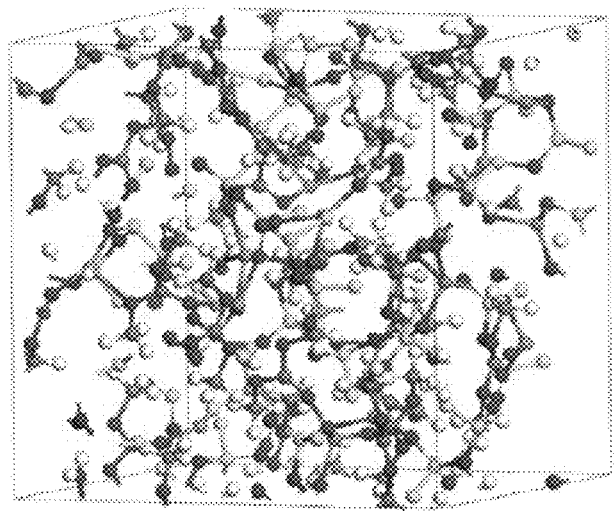
LiFSI/DMC (1:1.1)
(20 LiFSI + 22 DMC)
FIG. 37A

LiFSI/DMC/BTFE (0.94:1.1:0.55)
(19 LiFSI + 22 DMC + 11 BTFE)

LiFSI/DMC/BTFE (0.5:1.1:2.2)
(5 LiFSI + 11 DMC + 22 BTFE)

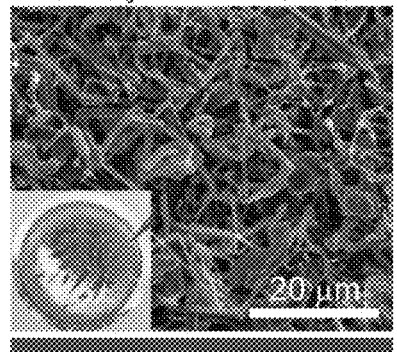 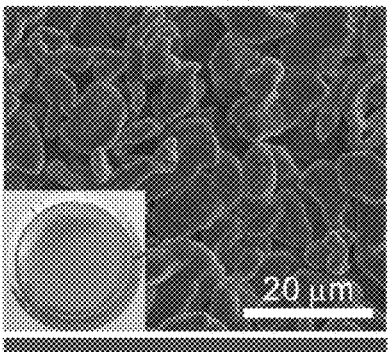 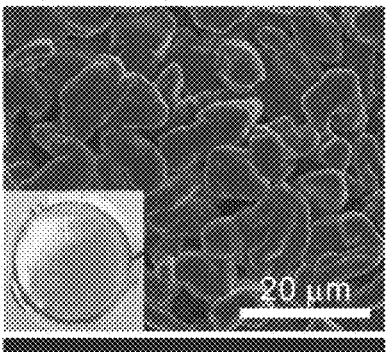
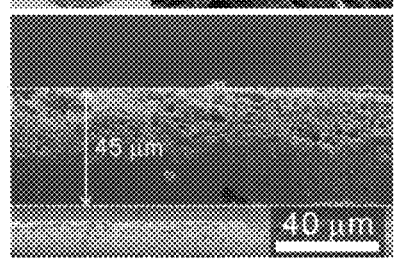 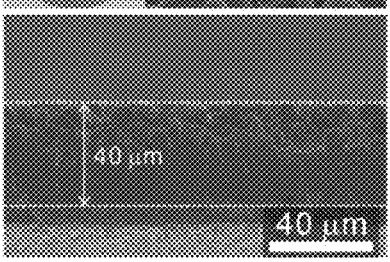 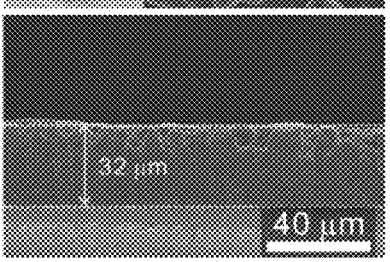
FIG. 47A    FIG. 47B    FIG. 47C

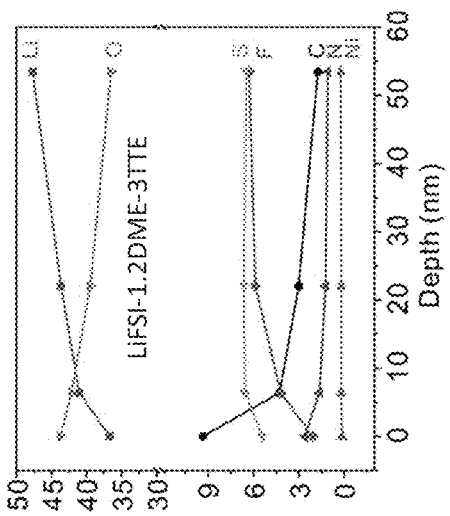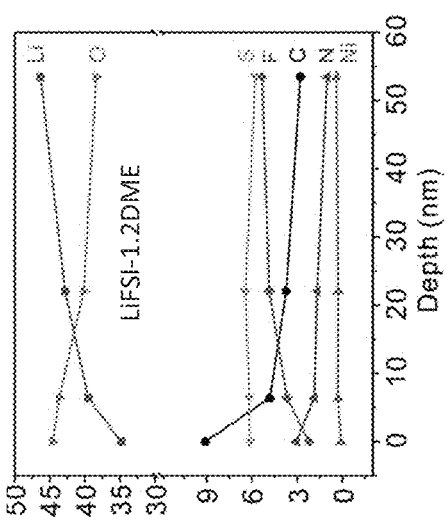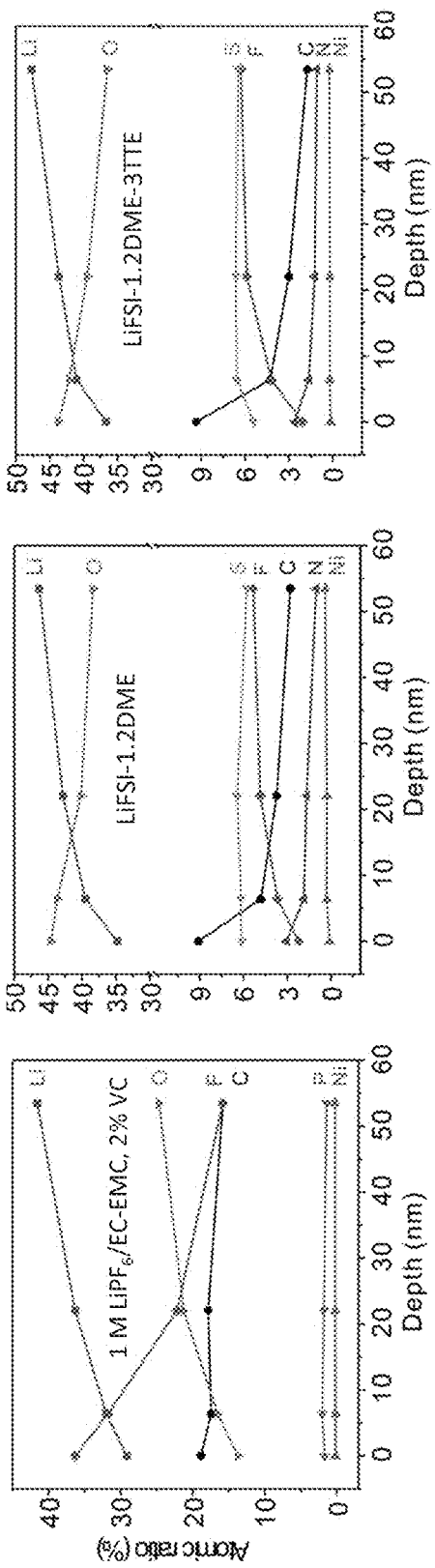
FIG. 58A   FIG. 58B   FIG. 58C
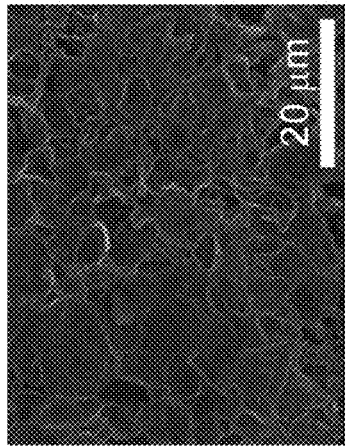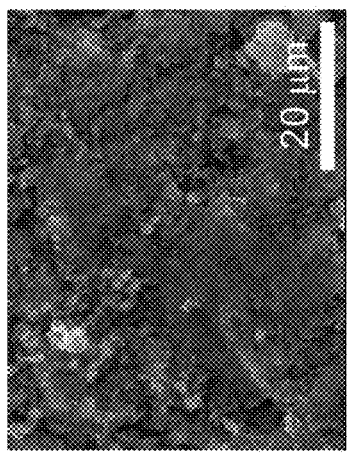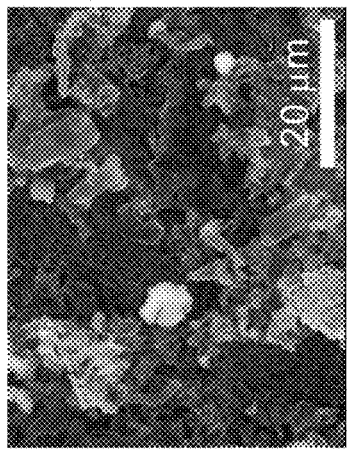
FIG. 58D   FIG. 58E   FIG. 58F

HIGH EFFICIENCY ELECTROLYTES FOR HIGH VOLTAGE BATTERY SYSTEMS

CROSS-REFERENCE TO RELATED APPLICATIONS

This application is a continuation-in-part of U.S. application Ser. No. 15/599,298, filed May 18, 2017, which claims the benefit of the earlier filing date of U.S. Provisional Application No. 62/466,267, filed Mar. 2, 2017; each of these prior applications is incorporated by reference herein in its entirety.

ACKNOWLEDGMENT OF GOVERNMENT SUPPORT

This invention was made with government support under Contract No. DE-AC05-76RL01830 awarded by the U.S. Department of Energy. The government has certain rights in the invention.

FIELD

The present disclosure concerns embodiments of electrolytes that enable better stable cycling under high voltages and battery systems comprising the same.

BACKGROUND

High voltage rechargeable batteries, including lithium (Li) metal batteries and others, face performance obstacles due to high reactivity between the battery components and traditional electrolytes. Additionally, the cathode components of batteries face their own challenges, such as limited utilization of full capacity. For example, commercial batteries with the popular $LiCoO_2$ (LCO) cathode, which is used in Li ion batteries for the majority of portable electronics, including cell phones, laptops and etc.), can only utilize about half of their full capacity. At 4.2 V, only ~140 mAh $g^{-1}$ out of the theoretical capacity (~273 mAh $g^{-1}$) can be utilized. Such a high irreversible capacity is due to not only the cation mixing between Li and Co under high voltages, but also the phase transition from hexagonal phase to monoclinic phase, which is likely to be caused by the dissolution of cobalt (Co) ions into the electrolyte. The loss of Co from the cathode lattice increases the elastic strains and results in micro-crack among and inside the LCO particles. The structural instability and the cathode/electrolyte interface degradation greatly limit the applications of these batteries. A need in the art exists for electrolytes that can be used in high voltage batteries that address such fallbacks.

SUMMARY

Disclosed herein are embodiments of electrolytes capable of performing in battery systems operated at high voltage, battery systems comprising such electrolytes, and methods of using such batteries.

In some embodiments, the electrolyte comprises a lithium-containing active salt; an ether-based solvent A; and a diluent. In some embodiments, the molar ratio of the active salt to the ether-based solvent A is 1:1.2 or 1:1. In any or all of these electrolyte embodiments, the lithium-containing active salt can comprise a single lithium salt or a lithium salts mixture and in particular embodiments can be lithium bis(fluorosulfonyl)imide (LiFSI) or lithium bis(trifluoromethylsulfonyl)imide (LiTFSI). In any or all of these electrolyte embodiments, the ether-based solvent A is DME, diglyme, triglyme, tetraglyme, butyl diglyme, dimethyl ether, diethyl ether, polyethylene glycol, or a combination thereof. In any or all of these electrolyte embodiments, the diluent can be a fluoroalkyl ether, a fluorinated carbonate, a fluorinated orthoformate, or a combination thereof. In any or all of these electrolyte embodiments, the diluent can be 1,1,2,2-tetrafluoroethyl-2,2,3,3-tetrafluoropropyl ether (TTE), bis(2,2,2-trifluoroethyl) ether (BTFE), 1,1,2,2,-tetrafluoroethyl-2,2,2-trifluoroethyl ether (TFTFE), tris(2,2,2-trifluoroethyl)orthoformate (TFEO), methoxynonafluorobutane (MOFB), ethoxynonafluorobutane (EOFB), di(2,2,2-trifluoroethyl) carbonate (DTFEC), or any combination thereof. In any or all of these electrolyte embodiments, the molar ratio of the active salt to the diluent ranges from 1:0.1 to 1:10. In some embodiments, the electrolyte consists essentially of LiFSI, DME, and TTE.

Also disclosed herein are embodiments of an electrolyte comprising LiFSI, DME, and TTE. In some such embodiments, the molar ratio of the LiFSI to the DME ranges from 1:0.5 to 1:5, provided that the molar ratio is not 1:1.4. In any or all of these electrolyte embodiments, the molar ratio of the LiFSI to the TTE ranges from 1:0.1 to 1:10.

Also disclosed herein are embodiments of a battery comprising an electrolyte, comprising an active salt, a solvent A, and a diluent wherein the active salt has a solubility in the diluent at least 10 times less than a solubility of the active salt in the solvent; a cathode comprising a material selected from LCO; $Li_{1+w}Ni_xMn_yCo_zO_2$, wherein $x+y+z+w=1$, $0 \leq w \leq 0.25$; $LiNi_xMn_yCo_zO_2$, wherein $x+y+z=1$; $LiNi_{0.8}Co_{0.15}Al_{0.5}O_2$; $LiCoO_2$; $LiNi_{0.5}Mn_{1.5}O_4$ spinel; $LiMn_2O_4$; $LiM^{C1}_xM^{C2}_{1-x}PO_4$, wherein $M^{C1}$ or $M^{C2}$=Fe, Mn, Ni, Co, Cr, or Ti; $0 \leq x \leq 1$; $LiM^{C1}_xM^{C2}_{1-x}O_2$, wherein $M^{C1}$ and $M^{C2}$ independently are Fe, Mn, Ni, Co, Cr, Ti, Mg, or Al; $0 \leq x \leq 1$; $LiM^{C1}_xM^{C2}_yM^{C3}_{1-x-y}O_2$, wherein $M^{C1}$, $M^{C2}$, and $M^{C3}$ independently are Fe, Mn, Ni, Co, Cr, Ti, Mg, or Al; $0 \leq x \leq 1$; $0 \leq y \leq 1$; $LiMn_{2-y}X_yO_4$, wherein X=Cr, Al, or Fe, $0 \leq y \leq 1$; $LiNi_{0.5-y}X_yMn_{1.5}O_4$, wherein X=Fe, Cr, Zn, Al, Mg, Ga, V, or Cu; $0 \leq y < 0.5$; $xLi_2MnO_3 \cdot (1-x)LiM^{C1}_yM^{C2}_zM^{C3}_{1-y-z}O_2$, wherein $M^{C1}$, $M^{C2}$, and $M^{C3}$ independently are Mn, Ni, Co, Cr, Fe, or mixture thereof and x=0.3-0.5; y≤0.5; z≤0.5; $Li_{2-x}(Fe_{1-y}Mn_y)P_2O_7$, wherein $0 \leq y \leq 1$; and a lithium metal anode, a silicon anode, a silicon/graphite composite anode, or a graphite anode. In particular embodiments, such battery embodiments are capable of operating at a voltage of 4.4 V or higher to produce a coulombic efficiency of 99% or higher. In some embodiments, the active salt is a lithium-containing active salt and wherein the molar ratio of the active salt to the solvent A is 1:1.2 or 1:1.

Also disclosed are battery embodiments comprising: a cathode comprising a lithium cobalt oxide (LCO) material, a nickel manganese cobalt (NMC) material, or a nickel cobalt transition metal oxide (NC-TM) material; an anode; and an electrolyte comprising a lithium-containing active salt; an ether-based solvent A; and a diluent. In some embodiments, the molar ratio of the active salt to the ether-based solvent A is 1:1.2 or 1:1. In some embodiments, the cathode comprises the LCO material and the anode is a lithium metal anode, a silicon anode, a graphite anode, or a graphite/silicon composite anode. In some embodiments, the cathode can comprise the NMC material and the anode is a lithium metal anode, a silicon anode, a graphite anode, or a graphite/silicon composite anode. In any or all of these battery embodiments, the battery can exhibit a CE of 99.8% or more when operated at a voltage of 4.4 V or higher.

Also disclosed are embodiments of a battery, comprising: a cathode comprising a lithium cobalt oxide (LCO) material, a nickel manganese cobalt (NMC) material, or a nickel cobalt transition metal oxide (NC-TM) material; an anode; and an electrolyte comprising LiFSI, DME, and TTE. In some such embodiments, the molar ratio of the LiFSI to the DME ranges from 1:0.5 to 1:5, provided that the molar ratio is not 1:1.4. In some embodiments, the cathode comprises the LCO material and the anode is a lithium metal anode, a silicon anode, a graphite anode, or a graphite/silicon composite anode. In some embodiments, the cathode comprises the NMC material and the anode is a lithium metal anode, a silicon anode, a graphite anode, or a graphite/silicon composite anode. In any or all of these battery embodiments, the battery can exhibit a CE of 99.8% or more when operated at a voltage of 4.4 V or higher.

Also disclosed are method embodiments comprising providing a battery system comprising a battery according to any of the above embodiments; and applying a voltage of 4.4 V or higher to the battery.

The foregoing and other objects and features of the present disclosure will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 17A and 17C are cross-sectional views; FIGS. 17B and 17D are top views.

FIGS. 18A-18D show the electrochemical behavior of Li||NMC batteries with different electrolytes. FIG. 18A shows the cycling stability and CEs. FIGS. 18B-18D show typical voltage profiles in 1.0 M LiPF$_6$/EC-EMC (FIG. 18B), 5.5 M LiFSI/DMC (FIG. 18C), and 1.2 M LiFSI/DMC-BTFE (1:2) (FIG. 18D).

FIGS. 21A, 21C, and 21E are cross-section views; FIGS. 21B, 21D, and 21F are top views of Li metal after plating on Cu substrates. The electrolytes were 1.0 M LiPF$_6$/EC-EMC (FIGS. 21A, 21B), 5.5 M LiFSI/DMC (FIGS. 21C, 21D), and 1.2 M LiFSI/DMC-BTFE (1:2) (FIGS. 21E, 21F).

FIG. 29A shows the initial Na plating/stripping profiles; FIG. 29B shows the cycling stability over 100 cycles; FIG. 29C shows the charge and discharge capacities of NaFSI/DME-BTFE (1:1:2 in mol) over 100 cycles.

FIG. 31A is the initial charge/discharge voltage profiles, FIG. 31B is the cycling performance, and FIG. 31C shows the CE of the Li—S cells as a function of cycle number evaluated at 0.1C (168 mA g$^{-1}$).

FIGS. 36A-36F are molecular models showing adsorption of solvent molecules DMC (FIG. 36A) and BTFE (FIG. 36B), LiFSI salt (FIG. 36C), and DMC-LiFSI solvent-salt pairs (FIGS. 36D-36F) on the Li(100) anode surface. The upper and lower images in each pair are the top and side view structures, respectively.

FIGS. 37A-37C are molecular models of electrolyte/salt mixtures from ab initio molecular dynamics (AIMD) simulations at 303 K—LiFSI-DMC (1:1.1) (FIG. 37A); LiFSI-DMC-BTFE (0.94:1.1:0.55) (FIG. 37B); LiFSI-DMC-BTFE (0.51:1.1:2.2) (FIG. 37C); the ratios in the parentheses indicate the molar ratios of LiFSI:DMC:BTFE.

FIG. 39B is an enlarged view of FIG. 39A in the wavenumber range of 2000-200 cm$^{-1}$.

FIGS. 47A-47C show the differences in Li metal growth of the 1 M LiPF$_6$ in EC-EMC (3:7 wt) with 2% VC electrolyte (FIG. 47A), the LiFSI-1.2DME electrolyte (FIG. 47B), and the LiFSI-1.2DME-3TTE electrolyte (FIG. 47C) after depositing a Li metal film of 4 mAh cm$^{-2}$.

FIGS. 48B-48D show the initial charge/discharge voltage profiles for the cells using LiFSI-1.2DME-3TTE, LiFSI-1.2DME, and 1 M LiPF$_6$ in EC-EMC (3:7 wt) with 2% VC electrolytes, respectively.

FIGS. 58A-58F shows XPS and SEM characterizations of cycled Li anodes from Li||NMC811 cells in an 1 M LiPF$_6$ in EC-EMC (3:7 wt) with 2% VC electrolyte (FIGS. 58A and 58D), an LiFSI-1.2DME electrolyte (FIGS. 58B and 58E), and an LiFSI-1.2DME-3TTE electrolyte (FIGS. 58C and 58F).

DETAILED DESCRIPTION

I. Explanation of Terms

Figure 1:
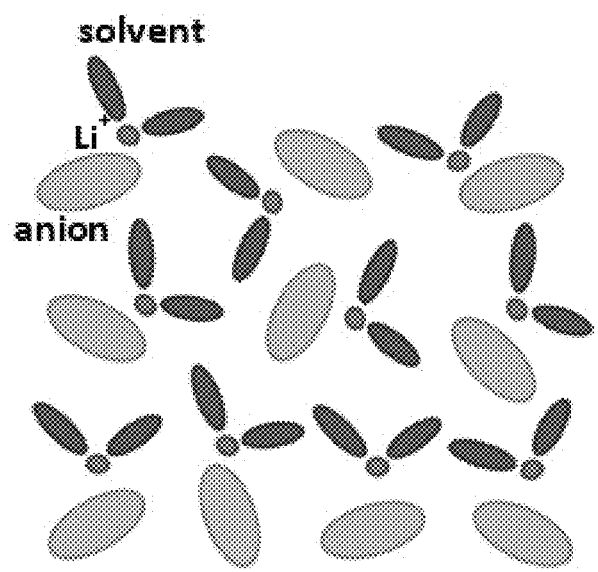
FIG. 1 is a schematic illustration of a superconcentrated electrolyte (SE) comprising a lithium salt and a solvent.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, molarities, voltages, capacities, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Definitions of common terms in chemistry may be found in Richard J. Lewis, Sr. (ed.), *Hawley's Condensed Chemical Dictionary*, published by John Wiley & Sons, Inc., 1997 (ISBN 0-471-29205-2).

In order to facilitate review of the various embodiments of the disclosure, the following explanations of specific terms are provided:

Active Salt: As used herein, the term "active salt" refers to a salt that significantly participates in electrochemical processes of electrochemical devices. In the case of batteries, it refers to charge and discharge processes contributing to the energy conversions that ultimately enable the battery to deliver/store energy. As used herein, the term "active salt" refers to a salt that constitutes at least 5% of the redox active materials participating in redox reactions during battery cycling after initial charging.

AN: acetonitrile

Anode: An electrode through which electric charge flows into a polarized electrical device. From an electrochemical point of view, negatively-charged anions move toward the anode and/or positively-charged cations move away from it to balance the electrons leaving via external circuitry. In a discharging battery or galvanic cell, the anode is the negative terminal where electrons flow out. If the anode is composed of a metal, electrons that it gives up to the external circuit are accompanied by metal cations moving away from the electrode and into the electrolyte. When the battery is recharged, the anode becomes the positive terminal where electrons flow in and metal cations are reduced.

Associated: As used here, the term "associated" means coordinated to or solvated by. For example, a cation that is associated with a solvent molecule is coordinated to or solvated by the solvent molecule. Solvation is the attraction of solvent molecules with molecules or ions of a solute. The association may be due to electronic interactions (e.g., ion-dipole interactions and/or van der Waals forces) between the cation and the solvent molecule. Coordination refers to formation of one or more coordination bonds between a cation and electron lone-pairs of solvent atoms. Coordination bonds also may form between the cation and anion of the solute.

Bridge solvent: A solvent having amphiphilic molecules with a polar end or moiety and a nonpolar end or moiety.

BTFE: bis(2,2,2-trifluoroethyl) ether.

Capacity: The capacity of a battery is the amount of electrical charge a battery can deliver. The capacity is typically expressed in units of mAh, or Ah, and indicates the maximum constant current a battery can produce over a period of one hour. For example, a battery with a capacity of 100 mAh can deliver a current of 100 mA for one hour or a current of 5 mA for 20 hours. Areal capacity or specific areal capacity is the capacity per unit area of the electrode (or active material) surface, and is typically expressed in united of mAh cm$^{-2}$.

Carbonate-Based Electrolyte: An electrolyte comprising an organic carbonate compound as the solvent used to solubilize the active salt.

Cathode: An electrode through which electric charge flows out of a polarized electrical device. From an electrochemical point of view, positively charged cations invariably move toward the cathode and/or negatively charged anions move away from it to balance the electrons arriving from external circuitry. In a discharging battery or galvanic cell, the cathode is the positive terminal, toward the direction of conventional current. This outward charge is carried internally by positive ions moving from the electrolyte to the positive cathode, where they may be reduced. When the battery is recharged, the cathode becomes the negative terminal where electrons flow out and metal atoms (or cations) are oxidized.

CEI: cathode electrolyte interphase

Cell: As used herein, a cell refers to an electrochemical device used for generating a voltage or current from a chemical reaction, or the reverse in which a chemical reaction is induced by a current. Examples include voltaic cells, electrolytic cells, and fuel cells, among others. A battery includes one or more cells. The terms "cell" and "battery" are used interchangeably when referring to a battery containing only one cell.

Coin Cell: A small, typically circular-shaped battery. Coin cells are characterized by their diameter and thickness.

Conversion Compound: A compound comprising one or more cations, which are displaced by another metal when a battery is discharged. For example, when iron (II) selenide (FeSe) is used as a cathode material, Fe is replaced by Na during discharge of a Na battery:

2Na$^+$+2$e^-$+FeSe↔Na$_2$Se+Fe

Coulombic Efficiency (CE): The efficiency with which charges are transferred in a system facilitating an electrochemical reaction. CE may be defined as the amount of charge exiting the battery during the discharge cycle divided by the amount of charge entering the battery during the charging cycle. CE of Li‖Cu or Na‖Cu cells may be defined as the amount of charge flowing out of the battery during stripping process divided by the amount of charge entering the battery during plating process.

DEC: diethyl carbonate
DMC: dimethyl carbonate
DME: 1,2-dimethoxyethane
DMS: dimethyl sulfone
DMSO: dimethyl sulfoxide
DOL: 1,3-dioxolane Donor Number: A quantitative measure of Lewis basicity, such as a solvent's ability to solvate cations. A donor number is defined as the negative enthalpy value for the 1:1 adduct formation between a Lewis base and SbCl$_5$ in dilute solution in 1,2-dichloroethane, which has a donor number of zero. The donor number is typically reported in units of kcal/mol. Acetonitrile, for example, has a donor number of 14.1 kcal/mol. As another example, dimethyl sulfoxide has a donor number of 29.8 kcal/mol.

EC: ethylene carbonate

Electrolyte: A substance containing free ions that behaves as an electrically conductive medium. Electrolytes generally comprise ions in a solution, but molten electrolytes and solid electrolytes also are known.

EMC: ethyl methyl carbonate
EMS: ethyl methyl sulfone
EOFB: ethoxynonafluorobutane Ether-Based Solvent: An electrolyte solvent comprising an organic ether compound that solubilizes the active salt of the electrolyte and that is capable of forming a solvation structure of ether-based solvent-cation-anion aggregates, such as the solvation structure depicted in FIG. 2. Such a solvation structure can be determined, characterized, and/or evaluated using methods described in the Examples section of the present disclosure. In an independent embodiment, the ether-based solvents of the present disclosure comprise an ether compound in a majority amount relative to an amount of any other solvent present in the solvent A component of the disclosed electrolytes.

EVS: ethyl vinyl sulfone
FEC: fluoroethylene carbonate

Immiscible: This term describes two substances of the same state of matter that cannot be uniformly mixed or blended. Oil and water are a common example of two immiscible liquids.

Intercalation: A term referring to the insertion of a material (e.g., an ion or molecule) into the microstructure of another material. For example, lithium ions can insert, or intercalate, into graphite (C) to form lithiated graphite (LiC$_6$).

KFSI: potassium bis(fluorosulfonyl)imide
KTFSI: potassium bis(trifluoromethanesulfonyl)imide
LiBETI: lithium bis(pentafluoroethanesulfonyl)imide
LiFSI: lithium bis(fluorosulfonyl)imide
LiTFSI: lithium bis(trifluoromethanesulfonyl)imide
LiBOB: lithium bis(oxalato)borate
LiDFOB: lithium difluoro oxalato borate anion
LSE: localized superconcentrated electrolyte
MEC: methylene ethylene carbonate
MOFB: methoxynonafluorobutane
NaFSI: sodium bis(fluorosulfonyl)imide
NaTFSI: sodium bis(trifluoromethylsulfonyl)imide
NaBOB: sodium bis(oxalato)borate
PC: propylene carbonate
SEI: solid electrolyte interphase Separator: A battery separator is a porous sheet or film placed between the anode and cathode. It prevents physical contact between the anode and cathode while facilitating ionic transport.

Soluble: Capable of becoming molecularly or ionically dispersed in a solvent to form a homogeneous solution. As used herein, the term "soluble" means that an active salt has a solubility in a given solvent of at least 1 mol/L (M, molarity) or at least 1 mol/kg (m, molality).

Solution: A homogeneous mixture composed of two or more substances. A solute (minor component) is dissolved in a solvent (major component). A plurality of solutes and/or a plurality of solvents may be present in the solution.

Superconcentrated: As used herein, the term "superconcentrated electrolyte" refers to an electrolyte having a salt concentration of at least 3 M.

TFTFE: 1,1,2,2,-tetrafluoroethyl-2,2,2-trifluoroethyl ether

TMTS: tetramethylene sulfone or sulfolane

TTE: 1,1,2,2-tetrafluoroethyl-2,2,3,3-tetrafluoropropyl ether

VC: vinylene carbonate

VEC: 4-vinyl-1,3-dioxolan-2-one or vinyl ethylene carbonate

II. Introduction

Due to the structural instability of certain cathode materials (such as lithium cobalt oxide (LCO) cathode materials) under high voltages (e.g., voltages above 4.2 V), commercial Li-ion batteries (LIBs) using these cathodes typically have a low cut-off charge voltage. The practical reversible capacity of LCO is only limited to ~160 mAh $g^{-1}$. Additionally, the stability of the electrolyte on the cathode under high voltage has a major influence on the cathode stability and thus the cycling performance. Most electrolytes are not thermodynamically stable over 4.5 V. Even the state-of-the-art carbonate electrolytes are known to decompose at and above 4.5 V. Ether electrolytes are not typically used in high-voltage batteries due to their anodic instability above 4 V. Furthermore, high-voltage cathodes made of transition metal oxides typically have highly catalytically active surfaces which could significantly promote the decomposition of electrolytes. The decomposition of electrolyte generates highly corrosive acidic species (e.g. HF etc.), which can etch the cathode material and cause structural degradations.

While different doping and coating methods have been developed to improve the structural stability and the electrochemical performance of LCO cathodes, these solutions have their own fallbacks. For example, different elements (Mg, Zr, Al, etc.) have been doped into LCO to suppress the phase transition at high voltage; however, apparent capacity decays are still observed at high voltages (e.g., 4.4 V or 4.5 V). Various surface coating materials ($Al_2O_3$, $ZrO_2$, $AlF_3$, polypyrrole, etc.) and techniques have also been employed to improve the stability of LCO; however, such surface coating strategies typically either have low $Li^+$ conductivity or have limited stability over cycling. In addition, these methods are usually tedious and expensive, and thus cannot be easily employed in commercial batteries. There are also studies on electrolyte additives (4-(trifluoromethyl) benzonitrile, fumaronitrile, etc.) to stabilize the LCO cathode under high voltages; however, these additives are not stable with certain anodes, such as Li metal anode as they are quickly consumed at the Li metal anode and cause anode resistance increase.

To suppress the catalytic decomposition of electrolytes on the reactive cathodes under high voltages, new electrolyte embodiments that form a highly stable interfacial layer on the cathode surface to isolate the electrolyte molecules away from active sites are disclosed herein. As a result, the side reactions between the active cathode and the electrolyte are significantly suppressed and the cathode corrosion is greatly mitigated. The electrolyte embodiments disclosed herein also enable the stable cycling of battery systems comprising various cathode and/or anode materials under high voltages (e.g., greater than 4.3 V) and enabled much higher CEs and capacities for the cells using these electrolytes than those using other types of electrolytes (e.g., superconcentrated electrolytes and/or conventional carbonate-based electrolytes, such as electrolytes comprising $LiPF_6$ and a combination of EC and EMC). In some embodiments, using the electrolyte embodiments described herein in combination with LCO cathodes and a variety of anodes (e.g., Si, graphite, Si/graphite composite, Li metal, and others), can deliver a very high capacity (e.g., 190 mAh $g^{-1}$ or more at 0.1C for LCO cathodes) and realize excellent cycling stability under a charge cut-off voltage of greater than 4.3 (e.g., 4.4 V or higher), along with a high cell CE. In sharp contrast, an LCO cathode exhibits a fast capacity fading (66% capacity retention after only 50 cycles) and a low cell CE of 97.5% when a conventional carbonate-based electrolyte (e.g., 1 M $LiPF_6$ in EC/EMC, 3:7 wt) was used. The disclosed electrolyte embodiments can therefore significantly improve the energy densities and cycle lives of batteries, particularly batteries with LCO cathodes.

III. Electrolyte Embodiments

A superconcentrated electrolyte typically comprises a solvent and a salt with a salt concentration of at least 3 M. Some superconcentrated electrolytes have a salt concentration of at least 4 M or at least 5 M. In certain instances, the salt molality may be up to 20 m or more, e.g., aqueous LiTFSI. FIG. 1 is a schematic illustration of a superconcentrated electrolyte comprising a solvent and a lithium salt. All or a large majority of the solvent molecules are associated with a lithium cation in the superconcentrated electrolyte. A reduced presence of free, unassociated solvent molecules increases CE of a lithium metal anode, facilitates formation of a stabilized solid electrolyte interphase (SEI) layer, and/or increases cycling stability of a battery including the electrolyte. However, superconcentrated electrolytes have disadvantages, such as high material cost, high viscosity, and/or poor wetting of battery separators and/or cathodes. While dilution with additional solvent can resolve one or more of the disadvantages, dilution results in free solvent molecules and often decreases CE, hinders formation of the stabilized SEI layer, and/or decreases cycling stability of a battery.

Disclosed herein are embodiments of an electrolyte that can be used in high voltage batteries and further that resolve fallbacks and problems discussed above. Embodiments of the disclosed electrolyte comprise an active salt, a solvent A (which can comprise a single solvent or a mixture of two or more solvents) in which the active salt is soluble, and a diluent (which can comprise a single solvent or a mixture of two or more solvents) in which the salt is insoluble or poorly soluble. As used herein, "poorly soluble" means that the active salt has a solubility in the diluent that is at least 10× less than a solubility of the active salt in the solvent A.

Figure 2:
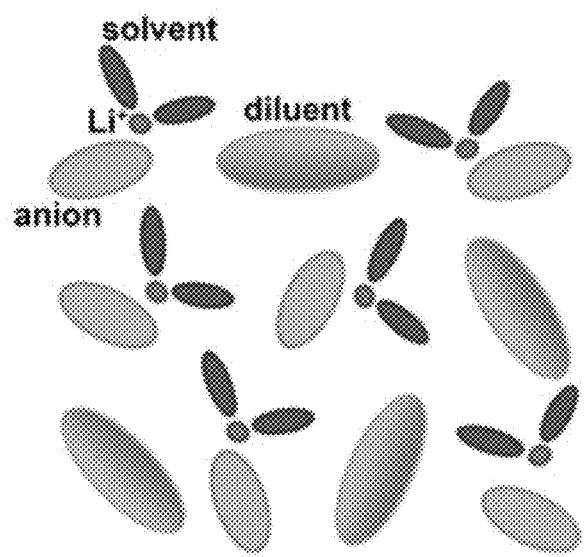
FIG. 2 is a schematic illustration of an exemplary electrolyte embodiment of the present disclosure comprising a lithium salt, a solvent in which the lithium salt is soluble, and a diluent.

FIG. 2 is a schematic illustration of an exemplary electrolyte including a lithium salt, a solvent in which the lithium salt is soluble, and a diluent in which the lithium salt is insoluble or poorly soluble. As shown in FIG. 2, the lithium ions remain associated with solvent molecules after addition of the diluent. The anions are also in proximity to, or associated with, the lithium ions. Thus, localized regions of solvent-cation-anion aggregates are formed. In contrast, the lithium ions and anions are not associated with the diluent molecules, which remain free in the solution. Evidence of this electrolyte structure with regions of locally concentrated salt/solvent and free diluent molecules is seen by Raman spectroscopy (see, e.g., FIGS. 39A, 39B, 40A, and 40B), NMR characterization, and molecular dynamics (MD) simulations. Thus, although the solution as a whole is less concentrated than the solution of FIG. 1, there are localized regions (some of which are of high concentration) where the lithium cations are associated with the solvent molecules. There are few to no free solvent molecules in the diluted electrolyte, thereby providing the benefits of highly stable electrolytes without the disadvantages typically associated with superconcentrated electrolytes.

The electrolyte embodiments disclosed herein can comprise, consist essentially of, or consist of the active salt, solvent A, and the diluent. As used herein, "consist essentially of" means that the electrolyte does not include any component that materially affects the properties of the electrolyte. For example, the electrolyte does not include any electrochemically active component (i.e., a component, such as an element, an ion, or a compound, that is capable of forming redox pairs having different oxidation and reduction states, e.g., ionic species with differing oxidation states or a metal cation and its corresponding neutral metal atom) other than the active salt in an amount sufficient to affect performance of the electrolyte and does not include a diluent in which the active salt is soluble. In particular disclosed embodiments, the diluent has a different chemical composition than solvent A.

The solubility of the active salt in the solvent A (in the absence of the diluent) may be greater than 3 M, such as at least 4 M or at least 5 M. In some embodiments, the solubility and/or concentration of the active salt in the solvent A is within a range of from 3 M to 10 M, such as from 3 M to 8 M, from 4 M to 8 M, or from 5 M to 8 M. In certain embodiments, the concentration may be expressed in terms of molality and the concentration of the active salt in the solvent A (in the absence of the diluent) may be within a range of from 3 m to 28 m, such as from 5 m to 28 m, or 10 m to 28 m. In contrast, the molar or molal concentration of the active salt in the electrolyte as a whole (salt, solvent A, and diluent) may be at least 20% less than the molar or molal concentration of the active salt in the solvent A, such as at least 30% less, at least 40% less, at least 50% less, at least 60% less, or even at least 70% less than the molar or molal concentration of the active salt in the solvent A. For example, the molar or molal concentration of the active salt in the electrolyte may be 20-80% less, 20-70% less, 30-70% less, or 30-50% less than the molar or molal concentration of the active salt in the solvent A. In some embodiments, the molar concentration of the active salt in the electrolyte is within a range of 0.2 M to 3 M, such as 0.2 M to 2 M, or 0.5 M to 2 M, or 0.75 M to 2 M, or 0.75 M to 1.5 M. In particular disclosed embodiments, the molar concentration of the active salt in the electrolyte is 1 M to 1.4 M, with exemplary embodiments being 1.2 M.

The active salt is a salt, or combination of salts, that participates in the charge and discharge processes of a cell including the electrolyte. The active salt comprises a cation that is capable of forming redox pairs having different oxidation and reduction states, such as ionic species with differing oxidation states or a metal cation and its corresponding neutral metal atom. In some embodiments, the active salt is an alkali metal salt, an alkaline earth metal salt, or any combination thereof. The active salt may be, for example, a lithium salt, a sodium salt, a potassium salt, a magnesium salt, a mixture of lithium salts, a mixture of sodium salts, a mixture of potassium salts, or a mixture of magnesium salts. Advantageously, the active salt is stable towards an alkali metal or alkaline earth metal anode and also is stable towards carbon-based anodes, silicon-based anodes, and the like. Exemplary salts include, but are not limited to, LiFSI, LiTFSI, LiBETI, NaFSI, NaTFSI, LiBOB, sodium bis(oxalato)borate (NaBOB), $LiPF_6$, $LiAsF_6$, $LiBF_4$, $LiCF_3SO_3$, $LiClO_4$, LiDFOB, LiI, LiBr, LiCl, LiSCN, $LiNO_3$, $Li_2SO_4$, $NaPF_6$, $NaAsF_6$, $NaBF_4$, $NaCF_3SO_3$, $NaClO_4$, NaDFOB, NaI, NaBr, NaCl, NaSCN, $NaNO_3$, $Na_2SO_4$ and combinations thereof. In some embodiments, the salt is LiFSI, LiTFSI, LiBETI, NaFSI, NaTFSI, or any combination thereof. In exemplary embodiments, the salt is LiFSI.

Solvent A comprises, consists essentially of, or consists of a single solvent or a mixture of two or more solvents. As used in this context, "consists essentially of" means that solvent A does not include any electrochemically active component in an amount sufficient to affect performance of an electrolyte including the solvent A. In some independent embodiments, solvent A associates with (e.g., solvates or coordinates) cations of the active salt or salt mixture. Some embodiments of the disclosed electrolytes are stable toward anodes (e.g., a metal or carbon-based anode), cathodes (including ion intercalation and conversion compounds), and current collectors (e.g., Cu, Al) that may be unstable when lower concentration electrolytes are used and/or when other solvents are used. As used in this context, "stable" means that the electrolyte component has negligible chemical and electrochemical reactions with the anode, cathode, separator and current collector. In some embodiments, the stability enables high CE, e.g., >98% of battery operation.

In some embodiments, solvent A is nonaqueous. Suitable solvents include, but are not limited to, ether solvents, such as 1,2-dimethoxyethane (DME), 1,3-dioxolane (DOL), 1,4-dioxane, tetrahydrofuran (THF), allyl ether, diethylene glycol dimethyl ether (or "diglyme"), triethylene glycol dimethyl ether (or "triglyme"), tetraethylene glycol dimethyl ether (or "tetraglyme"), butyl diglyme, dimethyl ether, diethyl ether, polyethylene glycol, or any combination thereof. In some embodiments, solvent A can comprise a mixture of solvents, such as a solvent specified as a "solvent A" and a co-solvent. In such embodiments, the co-solvent can include, but is not limited to, acetonitrile, dimethyl sulfoxide, sulfolane, trimethyl phosphate (TMPa), triethyl phosphate (TEPa), dimethyl methylphosphonate (DMMP), hexamethyldisiloxane, hexamethylcyclotrisiloxane, and silanes. In yet some additional embodiments, these co-solvents can be used as the solvent A. In certain embodiments, solvent A comprises DME, diglyme, triglyme, tetraglyme, butyl diglyme, dimethyl ether, diethyl ether, polyethylene glycol, or a combination thereof. In one embodiment, solvent A is DME.

In some embodiments of the disclosed electrolyte, it is advantageous to have few, substantially no, or no free solvent molecules (that is, solvent molecules that are not associated with cations of the active salt or salt mixture). The concentration of the active salt may be selected to minimize the number of free solvent A molecules in the electrolyte. In some embodiments, a molar ratio of the active salt to the solvent A (moles salt/moles solvent A) ranges from 1:0.5 to 1:5, such as 1:0.7 to 1:2, or 1:0.8 to 1:1.5, or 1:1 to 1:1.4, or 1:1 to 1:1.2. In an independent embodiment, the molar ratio of the active salt to the solvent A is not 1:1.4 when the active salt is LiFSI, solvent A is DME, and the diluent is TTE, the DME and TTE are present in a ratio of 3:8, v:v (DME:TTE) and the concentration is 1M or 2M. In particular disclosed embodiments, the molar ratio of the active salt to the solvent A (moles salt/moles solvent A) is 1:1.2 at a final concentration of salt in electrolyte of 1.2 M. In another embodiment, the molar ratio of the active salt to the solvent A is 1:1.

The diluent is a component in which the active salt is insoluble or has poor solubility, such as a solubility at least 10× less than the active salt's solubility in the solvent A. For instance, if the salt has a solubility of 5 M in the solvent A, the diluent is selected such that the salt has a solubility of less than 0.5 M in the diluent. In some embodiments, the active salt has a solubility in the solvent A that is at least 10 times, at least 15 times, at least 20 times, at least 25 times, at least 30 times, at least 40 times, or at least 50 times greater than the active salt's solubility in the diluent. The diluent is selected to be stable with the anode, cathode, and current collectors at low active salt concentrations (e.g., 3 M) or even without the active salt. In some embodiments, the diluent is selected to have a low dielectric constant (e.g., a relative dielectric constant ≤7) and/or low donor number (e.g., a donor number ≤10). Advantageously, the diluent does not disrupt the solvation structure of solvent A-cation-anion aggregates and is considered inert because it is not interacting with the active salt. In other words, there is no significant coordination or association between the diluent molecules and the active salt cations. The active salt cations remain associated with solvent A molecules. Thus, although the electrolyte is diluted, there are few or no free solvent A molecules in the electrolyte.

In some embodiments, the diluent comprises an aprotic organic solvent. In certain embodiments, the diluent is a fluorinated solvent having a wide electrochemical stability window (e.g., >4.3 V, such as >4.5 V), such as a hydrofluoroether (HFE) (also referred to as a fluoroalkyl ether), a fluorinated carbonate solvent, or a fluorinated orthoformate solvent. Embodiments of such compounds advantageously have low dielectric constants, low donor numbers, reductive stability with the metal of the active salt (e.g., lithium, sodium, and/or magnesium), and/or high stability against oxidation due to the electron-withdrawing fluorine atoms.

Exemplary HFE solvents include, but are not limited to, 1,1,2,2-tetrafluoroethyl-2,2,3,3-tetrafluoropropyl ether (TTE), bis(2,2,2-trifluoroethyl) ether (BTFE), 1,1,2,2,-tetrafluoroethyl-2,2,2-trifluoroethyl ether (TFTFE), methoxynonafluorobutane (MOFB), ethoxynonafluorobutane (EOFB), and combinations thereof. In exemplary embodiments, the diluent is TTE.

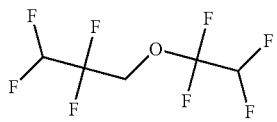

TTE-BP 92° C., FP 27.5° C.

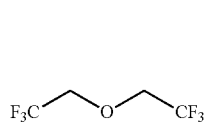 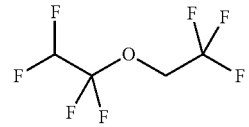

BTFE-BP 62-63° C., FP 1° C.    TFTFE-BP 56.7° C., FP n/a

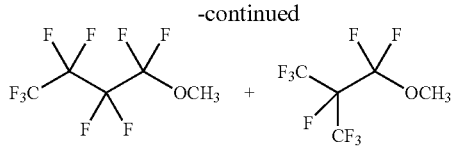

MOFB-mixture of 2 isomers
BP 60° C., autoignition temp. 405° C.

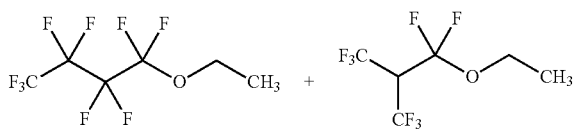

EOFB-mixture of 2 isomers
BP 76° C., autoignition temp. 434° C.

Exemplary fluorinated carbonate solvents include, but are not limited to, methyl 2,2,2-trifluoroethyl carbonate (MTFEC), di(2,2,2-trifluoroethyl) carbonate (DTFEC), or combinations thereof.

Exemplary fluorinated orthoformates include, but are not limited to:

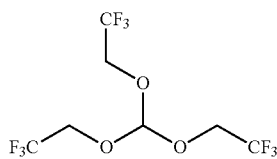

Tris(2,2,2-trifluoroethyl)orthoformate
(TFEO, b.p. 144-146° C., flash point 60° C.)

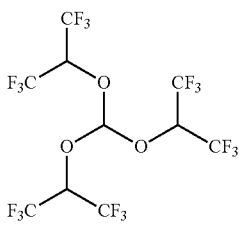

Tris(hexafluoroisopropyl)orthoformate
(THFiPO, b.p. 188 ± 35° C.*)

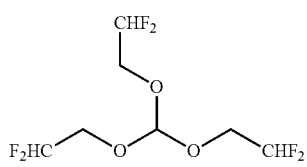

Tris(2,2-difluoroethyl)orthoformate
(TDFEO, b.p. 147 ± 35° C.)

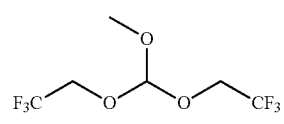

Bis(2,2,2-trifluoroethyl) methyl orthoformate
(BTFEMO, b.p. 119 ± 35° C.)

-continued

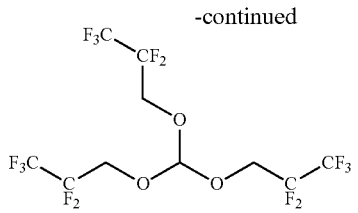

Tris(2,2,3,3,3-pentafluoropropyl)orthoformate
(TPFPO, b.p. 191 ± 35° C.)

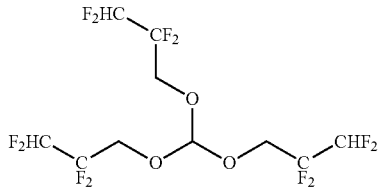

Tris(2,2,3,3-tetrafluoropropyl)orthoformate
(TTPO, b.p. 223° C.)

With reference to the structures above, boiling points indicated with ±35° C. are predicted by ChemDraw® software (PerkinElmer).

Some embodiments of the fluorinated orthoformates have a higher boiling point, higher flash point, and lower vapor pressure than other fluoroalkyl ethers that are linear molecules. The higher boiling points, higher flash points, and lower vapor pressures of the fluorinated orthoformates can facilitate their use in certain embodiments as they reduce evaporation of the diluent, which makes it easier to control the electrolyte composition. Additionally, the higher boiling point may provide the electrolyte with increased stability when the battery is operating at elevated temperatures, e.g., at temperatures up to 55° C. Embodiments of the disclosed fluorinated orthoformates also have low melting points and a wide electrochemical stability window. Advantageously, embodiments of the disclosed fluorinated orthoformates are stable with alkali metal anodes, such as lithium metal anodes. In contrast, non-fluorinated orthoformates, such as triethyl orthoformate, are not suitable for use as diluents because they are not stable with lithium metal anodes, resulting in a low coulombic efficiency with poor cycling and failure of the battery. Additionally, embodiments of the disclosed electrolyte salts usually are soluble in non-fluorinated orthoformates.

In some embodiments, a molar ratio of the active salt to the diluent (moles active salt/moles diluent) in the electrolyte can range from 1:0.1 to 1:10, such as 1:0.5 to 1:5, or 1:1 to 1:3. In particular embodiments, the molar ratio of the active salt to the diluent (moles active salt/moles diluent) is 1:3.

In some embodiments of the disclosed electrolyte, at least 80%, at least 90%, at least 96%, at least 97%, at least 98%, or at least 99% of the molecules of solvent A are associated (e.g., solvated or coordinated) with cations of the active salt. In certain embodiments, fewer than 20%, such as fewer than 10%, fewer than 4%, fewer than 3%, or fewer than 2% of the diluent molecules are associated with cations of the active salt. The degree of association can be quantified by any suitable means, such as by calculating the peak intensity ratio of solvent molecules associated with cations and free solvent in Raman spectra or by using NMR spectra.

The relative amounts of the solvent A and the diluent are selected to reduce the cost of materials for the electrolyte, reduce viscosity of the electrolyte, maintain stability of the electrolyte against oxidation at high-voltage cathodes, improve ionic conductivity of the electrolyte, improve wetting ability of the electrolyte, facilitate formation of a stable SEI layer, or any combination thereof. In one embodiment, a molar ratio of solvent A to the diluent (moles solvent A/moles diluent) in the electrolyte is ranges from 0.2 to 5, such as from 0.2 to 2, or 0.2 to 1.5, 0.2 to 1, or 0.2 to 0.5. In particular embodiments, the molar ratio of solvent A to the diluent (moles solvent A/moles diluent) is 0.4. In an independent embodiment, a volumetric ratio of solvent A to the diluent (L solvent NL diluent) in the electrolyte ranges from 0.2 to 10, such as 0.2 to 5, or 0.25 to 4 or 0.33 to 3. In another independent embodiment, a mass ratio of solvent A to the diluent (g solvent Ng diluent) in the electrolyte ranges from 0.2 to 10, such as 0.2 to 5, or 0.25 to 4 or 0.33 to 3.

Advantageously, certain embodiments of the disclosed electrolyte allow significant dilution of the active salt without sacrificing performance of the electrolyte. In some examples, the electrolyte performance is enhanced compared to a comparable electrolyte that does not include a diluent. In yet additional examples, the electrolyte performance is enhanced compared to a comparable electrolyte comprising a solvent A:diluent volumetric ratio that is 3:5 or 3:8. Due to the interactions between cations of the active salt and molecules of solvent A, the behavior of the electrolyte corresponds more closely to the concentration of the active salt in the solvent A. Because the diluent is present, however, the active salt may have a molar concentration in the electrolyte that is at least 20% less than the molar concentration of the active salt in the solvent A. In certain embodiments, the molar concentration of the active salt in the electrolyte is at least 25% less, at least 30% less, at least 40% less, at least 50% less, at least 60% less, at least 70% less, or even at least 80% less than the molar concentration of the active salt in the solvent A.

In some embodiments, the formation of cation-anion-solvent aggregates also reduces the lowest unoccupied molecular orbital (LUMO) energy of the anions so they can form a stable SEI. As described in the Examples section under the heading "Molecular Simulations," when the LUMOs of the conduction bands are located at the solvent molecules, the solvent molecules are reductively decomposed at the anode, leading to corrosion of the anode and fast capacity degradation upon cycling. In contrast, the lowest energy level of conduction bands of the anions in certain embodiments of the disclosed electrolyte embodiments is lower than those of the solvent, indicating that the anions instead of the solvent molecules will be decomposed, forming a stable SEI.

In some embodiments, the diluent is miscible with solvent A. In other embodiments, the diluent is immiscible with solvent A, e.g., when solvent A comprises water and the diluent is a fluorinated organic solvent as disclosed herein. When the solvent A and the diluent are immiscible, the electrolyte may not be effectively diluted with the diluent.

Figure 3:
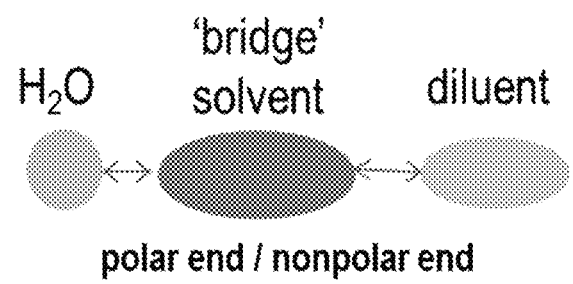
FIG. 3 is a schematic illustration of an exemplary "bridge" solvent molecule between a water molecule and a diluent molecule.

Accordingly, in some embodiments, when the diluent is immiscible with solvent A, the electrolyte further comprises a bridge solvent. The bridge solvent has a different chemical composition than either the solvent A or the diluent. The bridge solvent is selected to be miscible with both solvent A and the diluent, thereby enhancing the practical miscibility of solvent A, and the diluent. In some embodiments, molecules of the bridge solvent are amphiphilic, including both a polar end or moiety, and a non-polar end or moiety, such that molecules of the bridge solvent will associate both with molecules of solvent A and molecules of the diluent as shown in FIG. 3, thereby improving the miscibility between solvent A, and the diluent. Exemplary bridge solvents include, but are not limited to, acetonitrile, dimethyl carbonate, diethyl carbonate, propylene carbonate, dimethyl sulfoxide, 1,3-dioxolane, 1,4-dioxane, 1,2-dimethoxyethane (DME), diglyme (bis(2-methoxyethyl) ether), triglyme (triethylene glycol dimethyl ether), tetraglyme (tetraethylene glycol dimethyl ether), and combinations thereof.

In some examples, the active salt is LiFSI or NaFSI, solvent A is DME, diglyme, triglyme, tetraglyme, butyl diglyme, dimethyl ether, diethyl ether, polyethylene glycol, or a combination thereof, and the diluent is TTE, BTFE, or a combination thereof. In certain examples, the salt is LiTFSI or NaTFSI, solvent A is DME or a mixture of DME and DOL, and the diluent is TTE. In another independent embodiment, the salt is LiTFSI or NaTFSI, the solvent DME, and the diluent is TTE. In particular disclosed embodiments, the electrolyte is free of, or does not comprise a flame retardant compound. In such embodiments, the flame retardant compound is an organic phosphate, an organic phosphite, an organic phosphonate, an organic phosphoramide, a phosphazene, or any combination thereof.

Exemplary solvent A and diluent combinations include, but are not limited to, DME-BTFE, DME-TTE, DME-TFEO, diglyme-TTE, triglyme-TTE, tetraglyme-TTE, and DOL-DME-TTE. In an independent embodiment, the solvent A and diluent combination can include TEPa-TTE, TEPa-BTFE, TEPa-TFEO, TMPa-BTFE, TMPa-TFEO, DMMPa-TTE, TMS-TTE, TMS-BTFE, or TMS-TFEO. In some embodiments, the active salt is LiFSI, LiTFSI, NaFSI, or NaTFSI.

Exemplary electrolytes include, but are not limited to, LiFSI/DME-BTFE, LiFSI/DME-TTE, NaFSI/DME-TTE, NaFSI/DME-BTFE, LiTFSI/DME-TTE, LiTFSI/DME-BTFE, LiTFSI/DME-DOL-TTE, NaTFSI/DME-TTE, NaTFSI/DME-BTFE, LiFSI/diglyme-TTE, LiFSI/triglyme-TTE, LiFSI/tetraglyme-TTE, LiFSI/DOL-DME-TTE, LiTFSI/diglyme-TTE, LiTFSI/triglyme-TTE, LiTFSI/tetraglyme-TTE, LiTFSI/DOL-DME-TTE, NaFSI/diglyme-TTE, NaFSI/triglyme-TTE, NaFSI/tetraglyme-TTE, NaFSI/DOL-DME-TTE, and NaTFSI/DME-DOL-TTE. In an independent embodiment, the electrolyte can include LiFSI/DME-TFEO, LiFSI/TEPa-TTE, LiFSI/TEPa-BTFE, LiFSI/TEPa-TFEO, LiFSI/TMPa-BTFE, LiFSI/TMPa-TFEO, LiFSI/DMMPa-TTE, LiFSI/TMS-TTE, LiFSI/TMS-BTFE, LiFSI/TMS-TFEO, NaFSI/DME-TTE, NaFSI/DME-TFEO, NaFSI/TEPa-TTE, NaFSI/TEPa-BTFE, NaFSI/TEPa-TFEO, NaFSI/TMPa-BTFE, NaFSI/TMPa-TFEO, NaFSI/DMMPa-TTE, NaFSI/TMS-TTE, NaFSI/TMS-BTFE, NaFSI/TMS-TFEO, LiTFSI/DME-TFEO, LiTFSI/TEPa-TTE, LiTFSI/TEPa-BTFE, LiTFSI/TEPa-TFEO, LiTFSI/TMPa-BTFE, LiTFSI/TMPa-TFEO, LiTFSI/DMMPa-TTE, LiTFSI/TMS-TTE, LiTFSI/TMS-BTFE, and LiTFSI/TMS-TFEO.

In some embodiments, the electrolyte is LiFSI/DME-BTFE or LiFSI/DME-TTE. In particular disclosed embodiments, the electrolyte can comprise LiFSI-1.2DME-3TTE and can have a molarity of 1.2 M or 1.1 M. In yet additional embodiments, the electrolyte can comprise LiFSI-1DME-3TTE.

IV. Battery Systems

Embodiments of the disclosed electrolytes are useful in energy storage devices, such as batteries (e.g., rechargeable batteries), sensors, and supercapacitors. Suitable batteries include, but are not limited to, lithium metal batteries, lithium ion batteries, lithium-sulfur batteries, lithium-oxygen batteries, lithium-air batteries, sodium metal batteries, sodium ion batteries, sodium-sulfur batteries, sodium-oxygen batteries, sodium-air batteries, potassium metal batteries, potassium ion batteries, and magnesium ion batteries.

Figure 4:
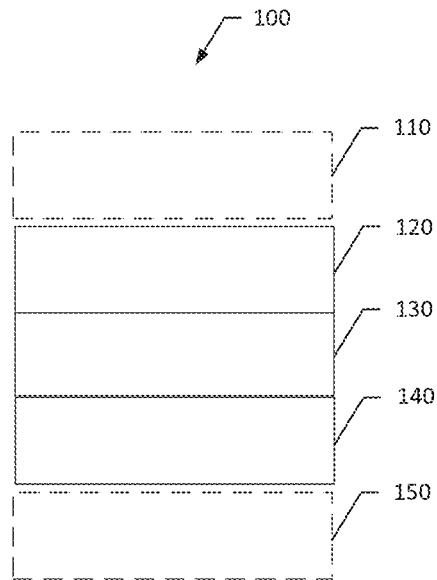
FIG. 4 is a schematic diagram of a battery.

In some embodiments, a rechargeable battery comprises an electrolyte embodiment as disclosed herein, a cathode, an anode, and optionally a separator. FIG. 4 is a schematic diagram of one exemplary embodiment of a rechargeable battery 100 including a cathode 120, a separator 130 which is infused with an electrolyte embodiment, and an anode 140. In some embodiments, the battery 100 also includes a cathode current collector 110 and/or an anode current collector 150.

The current collectors can be a metal or another conductive material, such as (but not limited to) nickel (Ni), copper (Cu), aluminum (Al), iron (Fe), stainless steel, or conductive carbon materials. The current collector may be a foil, a foam, or a polymer substrate coated with a conductive material. Advantageously, the current collector is stable (that is, does not corrode or react) when in contact with the anode or cathode and the electrolyte in an operating voltage window of the battery. The anode and cathode current collectors may be omitted if the anode or cathode, respectively, are free standing, e.g., when the anode is metal or a free-standing film comprising an intercalation material or conversion compound, and/or when the cathode is a free-standing film. "Free-standing" in this context means that the film itself has sufficient structural integrity such that the film can be positioned in the battery without a support material.

In some embodiments, the anode is a metal (e.g., lithium or sodium), an intercalation material, or a conversion compound. The intercalation material or conversion compound may be deposited onto a substrate (e.g., a current collector) or provided as a free-standing film, typically, including one or more binders and/or conductive additives. Suitable binders include, but are not limited to, polyvinyl alcohol, polyvinyl chloride, polyvinyl fluoride, ethylene oxide polymers, polyvinylpyrrolidone, polyurethane, polytetrafluoroethylene, polyvinylidene fluoride, polyethylene, polypropylene, styrene-butadiene rubber, epoxy resin, nylon, and the like. Suitable conductive additives include, but are not limited to, carbon black, acetylene black, Ketjen black, carbon fibers (e.g., vapor-grown carbon fiber), metal powders or fibers (e.g., Cu, Ni, and Al), and conductive polymers (e.g., polyphenylene derivatives). Exemplary anodes for lithium batteries include, but are not limited to, $Mo_6S_8$, $TiO_2$, $V_2O_5$, $Li_4Mn_5O_{12}$, $Li_4Ti_5O_{12}$, C/S composites, graphite/silicon composites, graphite, silicon, and polyacrylonitrile (PAN)-sulfur composites. Exemplary anodes for sodium batteries include, but are not limited to $NaTi_2(PO_4)_3$, $TiS_2$, CuS, $FeS_2$, $NiCo_2O_4$, $Cu_2Se$, and $Li_{0.5}Na_{0.5}Ti_2(PO_4)_3$. In particular disclosed embodiments using an electrolyte embodiments disclosed herein, the anode can be a lithium anode, a graphite/silicon composite anode, a graphite anode, or a silicon anode.

Exemplary cathode materials for lithium batteries include, but are not limited to, Li-rich $Li_{1+w}Ni_xMn_yCo_zO_2$ (x+y+z+w=1, $0 \leq w \leq 0.25$), $LiNi_xMn_yCo_zO_2$ (NMC, x+y+z=1), $LiCoO_2$, $LiNi_{0.8}Co_{0.15}Al_{0.05}O_2$ (NCA), $LiNi_{0.5}Mn_{1.5}O_4$ spinel, $LiMn_2O_4$ (LMO), $LiFePO_4$ (LFP), $Li_{4-x}M_xTi_5O_{12}$ (M=Mg, Al, Ba, Sr, or Ta; $0 \leq x \leq 1$), $MnO_2$, $V_2O_5$, $V_6O_{13}$, $LiV_3O_8$, $LiM^{C1}_xM^{C2}_{1-x}PO_4$ ($M^{C1}$ or $M^{C2}$=Fe, Mn, Ni, Co, Cr, or Ti; $0 \leq x \leq 1$), $Li_3V_{2-x}M^1_x(PO_4)_3$ ($M^1$=Cr, Co, Fe, Mg, Y, Ti, Nb, or Ce; $0 \leq x \leq 1$), $LiVPO_4F$, $LiM^{C1}_xM^{C2}_{1-x}O_2$ ($M^{C1}$ and $M^{C2}$ independently are Fe, Mn, Ni, Co, Cr, Ti, Mg, or Al; $0 \leq x \leq 1$), $LiM^{C1}_xM^{C2}_yM^{C3}_{1-x-y}O_2$ ($M^{C1}$, $M^{C2}$, and $M^{C3}$ independently are Fe, Mn, Ni, Co, Cr, Ti, Mg, or Al; $0 \leq x \leq 1$;

0≤y≤1), $LiMn_{2-y}X_yO_4$ (X=Cr, Al, or Fe, 0≤y≤1), $LiNi_{0.5-y}X_yMn_{1.5}O_4$(X=Fe, Cr, Zn, Al, Mg, Ga, V, or Cu; 0≤y<0.5), $xLi_2MnO_3\cdot(1-x)LiM^{C1}_yM^{C2}_zM^{C3}_{1-y-z}O_2$ ($M^{C1}$, $M^{C2}$, and $M^{C3}$ independently are Mn, Ni, Co, Cr, Fe, or mixture thereof; x=0.3-0.5; y≤0.5; z≤0.5), $Li_2M^2SiO_4$ ($M^2$=Mn, Fe, or Co), $Li_2M^2SO_4$ ($M^2$=Mn, Fe, or Co), $LiM^2SO_4F$ ($M^2$=Fe, Mn, or Co), $Li_{2-x}(Fe_{1-y}Mn_y)P_2O_7$ (0≤y≤1) $Cr_3O_8$, $Cr_2O_5$, a carbon/sulfur composite, or an air electrode (e.g., a carbon-based electrode comprising graphitic carbon and, optionally, a metal catalyst such as Ir, Ru, Pt, Ag, or Ag/Pd). In an independent embodiment, the cathode may be a lithium conversion compound, such as $Li_2O_2$, $Li_2S$, or LiF. In particular disclosed embodiments using an electrolyte comprising LiFSI-1.2DME-3TTE, the cathode is made of an LCO material, an NMC material, or a nickel cobalt transition metal oxide (NC-TM) material (e.g., $LiM^{C1}_xM^{C2}_{1-x}O_2$ where $M^{C1}$ and $M^{C2}$ independently are Fe, Mn, Ni, Co, Cr, Ti, Mg, or Al; 0≤x≤1).

Exemplary cathodes for sodium batteries include, but are not limited to, $NaFePO_4$, $Na_2FePO_4F$, $Na_2FeP_2O_7$, $Na_3V_2(PO_4)_3$, $Na_3V_2(PO_4)_2F_3$, $NaVPO_4F$, $NaVPOPOF$, $Na_{1.5}VOPO_4F_{0.5}$, $NaCo_2O_4$, $Na_2Ti_3O_7$, and $Na_xMO_2$ where 0.4≤x≤1, and M is a transition metal or a mixture of transition metals (e.g., $NaCrO_2$, $NaCoO_2$, $Na_xCoO_2$ (0.4≤x≤0.9), $Na_{2/3}Ni_{1/3}Mn_{2/3}O_2$, $Na_{2/3}Fe_{1/2}Mn_{1/2}O_2$, $Na_{2/3}Ni_{1/6}Co_{1/6}Mn_{2/3}O_2$, $NaNi_{1/3}Fe_{1/3}Mn_{1/3}O_2$, $NaNi_{1/3}Fe_{1/3}Co_{1/3}O_2$, $NaNi_{1/2}Mn_{1/2}O_2$, Prussian white analogue cathodes (e.g., $Na_2MnFe(CN)_6$ and $Na_2Fe_2(CN)_6$), Prussian blue analogue (PBA) cathodes $(Na_{2-x}M_a[M_b(CN)_6]_{1-y}\cdot nH_2O$, wherein $M_a$ and $M_b$ independently are Fe, Co, Ni, or Cu, x=0 to 0.2, y=0 to 0.2, n=1 to 10). Other sodium intercalation materials include $Na_4Ti_5O_{12}$, $Fe_3O_4$, $TiO_2$, $Sb_2O_4$, Sb/C composite, SnSb/C composite, BiSb/C composite, and amorphous P/C composite. In an independent embodiment, the cathode is a sodium conversion compound in which sodium displaces another cation, such as FeSe, $CuWO_4$, CuS, CuO, CuCl, or $CuCl_2$.

Exemplary cathodes for magnesium batteries include, but are not limited to, zirconium disulfide, cobalt (II,III) oxide, tungsten selenide, $V_2O_5$, molybdenum-vanadium oxide, stainless steel, $Mo_6S_8$, $Mg_2Mo_6S_8$, $MoS_2$, $Mo_6S_{8-y}Se_y$ where y=0, 1, or 2, $Mg_xS_3O_4$ where 0<x<1, $MgCoSiO_4$, $MgFeSiO_4$, $MgMnSiO_4$, $V_2O_5$, $WSe_2$, sulfur, poly(2,2,6,6-tetramethylpiperidinyloxy-4-yl methacrylate)/graphene, $MnO_2$/acetylene black, and carbyne polysulfide.

The separator may be glass fiber, a porous polymer film (e.g., polyethylene- or polypropylene-based material) with or without a ceramic coating, or a composite (e.g., a porous film of inorganic particles and a binder). One exemplary polymeric separator is a polyethylene (PE) membrane. Another exemplary polymeric separator is a polypropylene (PP) membrane. Another exemplary polymeric separator is a Celgard® 3501 surfactant-coated polypropylene membrane. The separator may be infused with an electrolyte, as disclosed herein.

In some embodiments, a battery includes a lithium metal anode, a cathode suitable for a lithium battery as disclosed above, a separator, and an electrolyte comprising an active salt as disclosed herein, a solvent A (or mixture of a solvent A and a co-solvent) as disclosed herein, and a diluent, as disclosed herein. In particular disclosed embodiments, the battery system includes a cathode suitable for a lithium battery as disclosed above, a separator, (i) an active salt selected from LiFSI, LiTFSI, or a combination thereof, (ii) a solvent A selected from DME, diglyme, triglyme, tetraglyme, butyl diglyme, dimethyl ether, diethyl ether, polyethylene glycol, or a combination thereof; and (iii) a diluent selected from TTE, BTFE, TFTFE, MOFB, EOFB, TEO, MTFEC, DTFEC, TFEO, THFiPO, TDFEO, BTFEMO, TTPO, or TPFPO, or any combination thereof. In some embodiments, a battery includes a graphite anode, a silicon anode, or a graphite/silicon composite anode; a cathode suitable for a lithium battery as disclosed above; a separator; and an electrolyte comprising (i) an active salt selected from LiFSI, LiTFSI, or a combination thereof, (ii) a solvent A selected from DME, diglyme, triglyme, tetraglyme, butyl diglyme, dimethyl ether, diethyl ether, polyethylene glycol, or a combination thereof; and (iii) a diluent selected from TTE, BTFE, TFTFE, MOFB, EOFB, TEO, MTFEC, DTFEC, TFEO, THFiPO, TDFEO, BTFEMO, TTPO, or TPFPO, or any combination thereof. In any of these particular embodiments, the cathode is an NMC cathode or an LCO cathode.

In some embodiments, a battery including an electrolyte embodiment as disclosed herein has a performance at least equal to, and (in most embodiments) superior to, a comparison battery including a superconcentrated electrolyte comprising a solvent A but without a diluent and/or an electrolyte comprising a conventional carbonate solvent (such as electrolytes comprising $LiPF_6$ and a combination of EC and EMC). For instance, the battery including the disclosed electrolyte may have a CE greater than a comparison battery including a conventional carbonate-containing electrolyte. In some embodiments, the battery comprising the disclosed electrolyte has a CE 98%, such as 98.5%, 99%, 99.5%, even 99.8%, whereas a comparison electrode comprising a conventional carbonate-based electrolyte only exhibits a CE of 97.5% or less. In particular embodiments, these superior CE values can be obtained using the disclosed electrolytes even at very high voltages (e.g., greater than 4.3 V, such as 4.4 V, 4.5 V, or 4.55 V). In yet additional embodiments, a battery comprising the disclosed electrolyte and an LCO cathode has a CE≥98%, such as ≥98.5%, ≥99%, ≥99.5%, even ≥99.8% at high voltage (e.g., 4.5 V or higher), whereas a comparison electrode comprising a superconcentrated electrolyte comprising a solvent A, but not comprising a diluent, exhibits lower CE at the same voltage.

The battery comprising an electrolyte embodiment as disclosed herein also may have a greater discharge capacity and/or cycling stability compared to a battery comprising a superconcentrated electrolyte comprising a solvent A but without a diluent and/or an electrolyte comprising a conventional carbonate solvent. Embodiments of batteries including an electrolyte as disclosed herein demonstrate stable cycling performance (e.g., as evidenced by a stable CE and/or specific capacity) over a period of at least 10 cycles, at least 25 cycles, at least 50 cycles, at least 75 cycles, at least 100 cycles, at least 200 cycles, or at least 300 cycles. For example, the battery may demonstrate stable cycling performance for 10-500 cycles, such as 25-500 cycles, 50-500 cycles, 100-500 cycles, 200-500 cycles, or 300-500 cycles. In addition, while batteries comprising a disclosed electrolyte embodiment may exhibit lower conductivity, the low viscosity of certain disclosed electrolyte embodiments support efficient $Li^+$ transport for high rate cycling and thus can contribute to the superior electrochemical performances of electrochemical devices. In one example, Li∥LCO batteries including an electrolyte comprising 1.2 M LiFSI-DME-TTE (DME:TTE 1.2:3 by mole) were demonstrated to undergo long-term stable cycling (at least 100 cycles) with a high CE of over 99.8%, even when charged to a high voltage of 4.5 V (Example 10). Additionally, Li∥NMC811 batteries including an electrolyte comprising 1.2 M LiFSI-DME-TTE (DME:TTE 1.2:3 by mole)

were demonstrated to undergo long-term stable cycling (at least 300 cycles) with a high capacity retention of 86.5%, even when charged to a high voltage of 4.4 V (Example 12). This improved performance also can be observed in embodiments with a high cathode loading, a very thin anode, and limited amounts of the electrolyte. In yet additional embodiments, an electrolyte comprising LiFSI-1DME-3TTE exhibits better performance than an electrolyte comprising LiFSI-1.33TEPa-4TTE and a conventional carbonate-containing electrolyte in a Li‖LCO battery (Example 17) and also exhibits much more stable cycling performance in Si/Gr‖LCO systems as compared to carbonate-containing electrolytes (Example 19).

As established herein, embodiments of the disclosed electrolytes are cost-effective, enable dendrite-free plating, provide high CE, and/or greatly enhance fast charging and/or stable cycling of batteries at high voltage. For example, 1.2 M LiFSI-1.2DME-3TTE enabled a high CE of greater than 99.8%, and provided enhanced fast-charging and stable cycling of Li‖LCO batteries at high voltage cutoff at 4.4 and 4.5 V. This outstanding performance is even superior over than that achieved in superconcentrated electrolytes and/or conventional carbonate-based electrolytes. Similar beneficial results are seen with other embodiments of the disclosed electrolytes and with other battery types, such as lithium-sulfur batteries, lithium-oxygen batteries, lithium-air batteries, sodium metal batteries, sodium ion batteries, sodium-air batteries, sodium-sulfur batteries, sodium-oxygen batteries, and magnesium ion batteries, including aqueous lithium and sodium batteries.

V. Examples

General Information

Li metal chips (diameter: 1.55 cm) of 450 μm thickness were purchased from MTI Corporation and 50 μm thick Li metal on Cu foil was ordered from China Energy Lithium. NMC811 ($LiNi_{0.8}Mn_{0.1}Co_{0.1}O_2$) cathode material was obtained from Targray (Canada). The cathode laminates were prepared by slurry coating using N-methyl-2-pyrrolidone (NMP) as solvent at the Advanced Battery Facility, Pacific Northwest National Laboratory (PNNL). The slurry contains NMC811 material, conductive carbon (C-NERGY Super C65, Timcal) and PVDF binder (Kureha L #1120) with a weight ratio of 96:2:2. Cathode disks of ½ inch diameter were punched out and further dried at 80° C. under vacuum before use. The cathode loadings used in certain examples are either 1.5 or 4.2 mAh $cm^{-2}$. LCO laminates were obtained from the Cell Analysis, Modelling, and Prototyping (CAMP) Facility located at Argonne National Laboratory (ANL). The LCO active material loading is about 13-14 mg $cm^{-2}$. Battery grade lithium bis(fluorosulfonyl)imide (LiFSI) was kindly provided Nippon Shokubai and further dried at 120° C. under vacuum for 24 hours before use. Battery grade 1, 2-dimethoxyethane (DME), fluoroethylene carbonate (FEC), ethylene carbonate (EC), ethyl methyl carbonate (EMC), vinylene carbonate (VC) and lithium hexafluorophosphate (LPN were purchased from BASF and used as received. 1,1,2,2-tetrafluoroethyl-2,2,3,3-tetrafluoropropyl ether (TTE, 99%, Synquest Laboratories) was also dried with molecular sieves before use.

Electrochemical Evaluations

Ionic conductivity was measured using BioLogic MCS 10 Fully Integrated Multichannel Conductivity Spectroscopy with a cell made of two parallel Pt electrodes over a temperature range of 5 to 30° C. The conductivity cell constants were pre-determined using conductivity standard solution from Okalon Inc.

In Examples 1 to 9, electrochemical cycling tests were carried out using CR2032-type coin cells of a two-electrode configuration with constant current mode on battery testers (Land BT2000 and Arbin BT-2000, Arbin Instruments, College Station, Tex.) at 30° C. in environmental chambers. Coin cells (Li‖Cu, Li‖Li and Li‖NMC) were assembled in the glove box with a Li chip as both the counter and reference electrode. Celgard® 2500 polypropylene membrane was used as the separators except for cells with LiFSI/DMC electrolytes for which Celgard® 3501 surfactant-coated polypropylene membranes were used to ensure good wetting due to the wettability issue with Celgard® 2500 membrane. To standardize the testing, 200 μL of electrolyte (excess amount) was added in each coin cell despite some spilling during cell crimping process. For Li‖Cu cells, the effective area of the Cu foil for Li deposition was 2.11 $cm^2$ (diameter 1.64 cm). During each cycle, a desired amount of Li metal was deposited on the Cu substrate at various current densities and then stripped until the potential reached 1.0 V vs $Li/Li^+$. Li|Li symmetric cells were assembled with Li metal used as the working and counter electrodes. All the Li‖NMC batteries were assembled using Al-clad coin cell cans for the cathode part to eliminate the corrosion of stainless steel can and the side effects at high voltage, and were tested between 2.7 and 4.3 V. 1C is equal to 160 mA $g^{-1}$ (which is ~2 mA $cm^{-2}$) of active NMC333 material.

Linear sweep voltammetry (LSV) studies of the electrolyte solutions were conducted in a coin cells using a 2.11 $cm^2$ Al foil disk as working electrode on a CHI660C workstation (CH Instruments, Inc., Austin, Tex.) with a scan rate of 0.2 mV/s from OCV (open circuit voltage) to 6 V.

In Examples 10-19, CR2032 coin cells were assembled inside Argon-fill glovebox ($H_2O$<1 ppm, $O_2$<1 ppm) for the electrochemical tests. For Li‖NMC cells, Li chip, polyethylene separator (Asahi Kasei), cathode disk were stacked together; for Li‖Cu cells, the cathode disk was replaced by a piece of Cu foil (2.11 cm diameter). To avoid the corrosion of the stainless steel cathode case, Al-clad cathode cases were used for high-voltage battery tests and an additional piece of Al foil (2.11 cm diameter) was placed underneath the cathode disk. 75 μL of electrolyte was used in each coin cell if not specified. For the high-loading, lean-electrolyte tests under extreme conditions, an electrolyte/cathode ratio of 3 g $Ah^{-1}$ was employed to maximize the energy density of the system. Galvanostatic cycling tests were tested within a voltage window between 2.8-4.4 V using Land battery testers (Wuhan Land) inside a temperature chamber (TestEquity) at 25° C. After two formation cycles at C/10 rates (1C=200 mAh $g^{-1}$), the Li‖NMC cells were charged to 4.4 V at C/3 and held at 4.4 V until the anodic current drops below C/20 before discharged to 2.8 V at C/3. Electrochemical impedance spectroscopy (EIS) data were collected on a 1255B Solartron frequency response analyzers and a 1287 electrochemical workstation in the frequency range from 100 kHz to 10 mHz with a perturbation amplitude of ±5 mV.

Characterizations

Morphology observations and EDS measurements of cycled electrodes were performed on a FEI Quanta or a Helios focused ion beam scanning electron microscope (SEM) 9 Hillsboro, Oreg.) at 5.0 kV. For sample preparation, the cycled electrodes were soaked in pure DMC for 10 min and then rinsed with pure DMC at least 3 times to eliminate remaining electrolytes, and finally dried under vacuum. The cross-sections were obtained by using a razor blade to cut the electrodes. The XPS was performed with a Physical Electronics Quantera scanning X-ray microprobe (Chanhassen, Minn.), which was outfitted with a monochromatic Al Kα X-ray source (1,486.7 eV) for excitation. To avoid side reactions or electrode contamination with ambient oxygen and moisture, samples from cycled electrodes were transported from the glovebox to the SEM and XPS instruments in a hermetically sealed container protected by argon gas. Raman spectra were collected using a Raman spectrometer (Horiba LabRAM HR) with sub-1 cm$^{-1}$ spectral resolution, with all the samples sealed in a test glass tube. The viscosity (η) of the electrolytes was measured on a Brookfield DV-II+ Pro Viscometer (Middleboro, Mass.) at temperatures of 5° C. and 30° C.

The diffusion coefficients of Li$^+$ cation, FSI$^-$ anion and solvent molecules (DMC and BTFE) denoted to $D_{Li}$, $D_{FSI}$, $D_{DMC}/D_{BTFE}$ were measured by using the $^7$Li, $^{19}$F, and $^1$H pulsed field gradient (PFG) NMR, respectivley, in the temperature range of 0~50° C. on a 600 MHz NMR spectrometer (Agilent Tech, Santa Clara, Calif.) equipped with a 5 mm liquid NMR probe (Doty Scientific, Columbia, S.C.), with a maximum gradient strength of ~31 T m$^{-1}$. Bipolar pulsed gradients stimulated echo sequence (Dbppste in VNMRJ, vender supplied sequence) with a 90 degree pulse lengths of 5.5, 7 and 12 μs were employed at Larmor frequencies of 599.8, 564.3, and 233.1 MHz for $^1$H, $^{19}$F and $^7$Li PFG-NMR, respectively. The echo profile S(g) obtained as a function of gradient strength (g) were fit with the Stejskal-Tanner equation [1] (Stejskal et al., *J. Chem. Phys.* 1965, 42:288-292):

$$S(g)=S(0)\exp[-D(\gamma\delta g)^2(\Delta-\delta/3)] \quad [1]$$

where S(g) and S(0) are peak intensities at a gradient strength of g and 0, respectively, D is diffsuion coefficient, γ is the gyromagnetic ratio of observing nuclei, δ and Δ are the gradient pulse length and the duration of the two gradient pulses, respectively. δ and Δ were fixed at 2 ms and 30 ms for all measurements and varied g values to obtain a sufficient decay in the echo profiles.

In some examples, for sample post analyses, the coin cells after cycling were disassembled inside the glove box and rinsed several times by anhydrous DME or DMC solvent to remove residual electrolytes before dried under vacuum. For X-ray photoelectron spectroscopy (XPS) studies, the samples were transferred in air-tight vessels and loaded into the test chamber without exposure to the ambient air. The spectra were collected on a Physical Electronic Quantera scanning X-ray microprobe with a focused monochromatic Al Kα X-ray source. The sputter rate of Argon ion depth profiling (2 kV, 0.5 μA) was calibrated for SiO$_2$. X-ray diffraction (XRD) patterns were obtained on a Rigaku MiniFlex II XRD instrument (Cu Kα radiation, 30 kV, 15 mA, scan rate 0.1° per min).

Scanning electron microscopy (SEM) characterizations were carried out on an FEI Helios DualBeam focused ion beam (FIB) SEM at 5-15 kV. Transmission electron microscopy (TEM) specimen preparation by FIB lift out was conducted on the Helios FIB-SEM. Firstly, 2.2 μm thick Pt layer (200 nm e-beam deposition followed by 1 μm ion beam deposition) was deposited on the particles to be lifted out to avoid Ga ion beam damage. After lifting out, the specimen was thinned to electron transparency using 30 kV Ga ion beam. A final polishing was performed using 2 kV Ga ion to reduce the surface damage layer. After a 2 kV Ga ion polish, the surface damage layer was believed to be less than 4 nm. The FIB-prepared NMC samples were investigated by using a JEOL JEM-ARM200CF microscope at 200 kV. This microscope is equipped with a probe spherical aberration corrector, enabling imaging at sub-angstrom resolution. The electron signals from 68 to 280 mrad were collected for HAADF-STEM imaging.

Coulombic Efficiency (CE) Measurement

The following protocol was used to measure average CE of Li metal anode using a Li||Cu coin cell: 1) one initial formation cycle with Li plating of 5 mAh/cm$^2$ on Cu and stripping to 1 V; 2) Plate at 5 mAh/cm$^2$ Li on Cu as Li reservoir; 3) repeatedly strip/plate Li with 1 mAh/cm$^2$ (or strip to 1 V if over-potential >1 V is needed to strip Li with 1 mAh/cm$^2$) for 9 (n=9) cycles; 4) Strip all Li to 1 V. Current: 0.5 mA/cm$^2$. Avg. CE is calculated by dividing the total stripping capacity by the total plating capacity based on the following formula:

$$CE_{avg.} = \frac{nQ_{cycle,strip} + Q_{strip}}{nQ_{cycle,plate} + Q_{reservoir}} \times 100$$

where n is the cycle number at the charge capacity of $Q_{cycle,strip}$ and discharge capacity of $Q_{cycle,plate}$, $Q_{strip}$ is the charge capacity during the final stripping, and $Q_{reservoir}$ is the amount of deposition lithium during step 2.

MD Simulations

First-principles density functional theory (DFT) and ab initio molecular dynamics (AIMD) simulations were used to characterize the DMC-LiFSI solvation structure in certain electrolyte embodiments. All calculations were performed using the Vienna ab Initio Simulation Package (VASP) (Kresse et al., *Phys. Rev. B* 1996, 54:11169-11186; Kresse et al., *Phys. Rev. B* 1993, 47:558-563; Kresse et al., *Phys. Rev. B* 1994, 49:14251-14269). Electron-ion interactions were described by the projector-augmented wave (PAW) pseudopotentials with the cutoff energy of 400 eV (Blochl, *Phys Rev B* 1994, 50:17953-17979; Kresse et al., *Phys Rev B* 1999, 59:1758-1775). The exchange-correlation functional was represented using the Perdew-Burke-Ernzerhof generalized gradient approximation (GGA-PBE) (Perdew et al., *Phys Rev Lett* 1996, 77:3865-3868). The exchange-correlation functional with a Gaussian smearing width term of 0.05 eV was used in the calculations of electrolytes and LiFSI salt interacting with Li metal anode surface systems. The Monkhorst-Pack k-point mesh grid scheme (4×4×1) was used to obtain the optimized Li anode surface and adsorption of electrolyte and salt molecules in the ground state. The convergence criteria for electronic self-consistent iteration and ionic relaxation were set to 1×10$^{-5}$ eV and 1×10$^{-4}$ eV, respectively. AIMD simulations of electrolyte-salt mixtures were performed in the canonical (NVT) ensemble at 303 K. The constant temperature of AIMD simulation systems was controlled using the Nose thermostat method with a Nose-mass parameter of 0.5. The time step of 0.5 fs was used in all AIMD simulations. A Monkhorst-Pack k-point mesh grid scheme (2×2×2) was used in AIMD simulations. The total AIMD simulation time for each electrolyte/salt system was 15 ps. The AIMD trajectory of final 5 ps was used to obtain radial distribution functions of Li—O pairs.

Example 1

Lithium Metal Batteries with LiFSI/EMC-BTFE and LiFSI/EMC-TTE Electrolytes

Figure 5A:
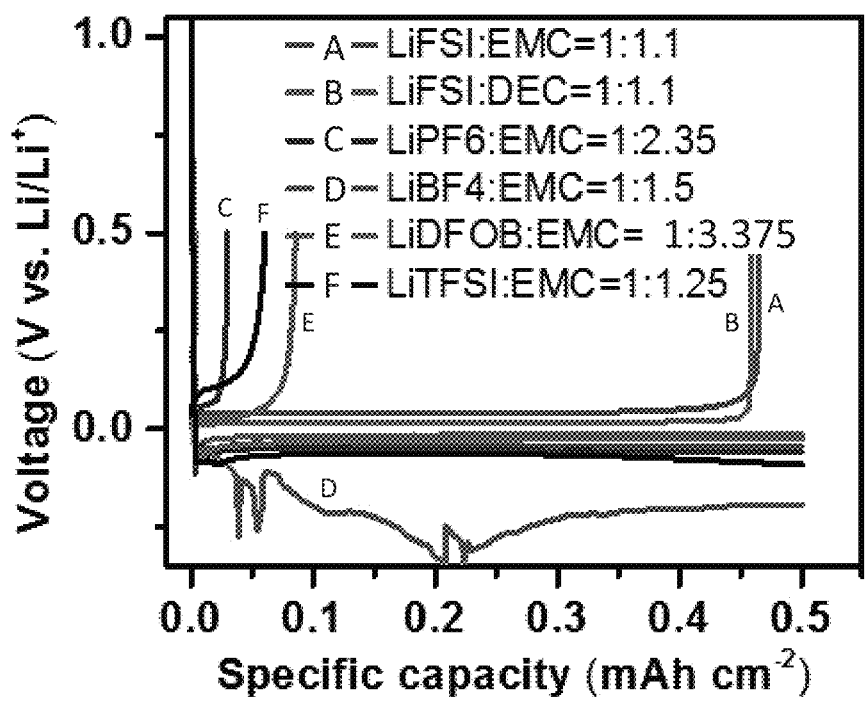
FIGS. 5A and 5B show initial Li deposition/stripping voltage profiles (FIG. 5A) and coulombic efficiency (CE) as a function of cycle number (FIG. 5B) for Li||Cu (Cu: copper) cells having a Li areal deposition capacity of 0.5 mAh cm$^{-2}$, tested at 1 mA cm$^{-2}$ with various concentrated electrolytes comprising lithium salts in carbonate solvents.
Figure 5B:
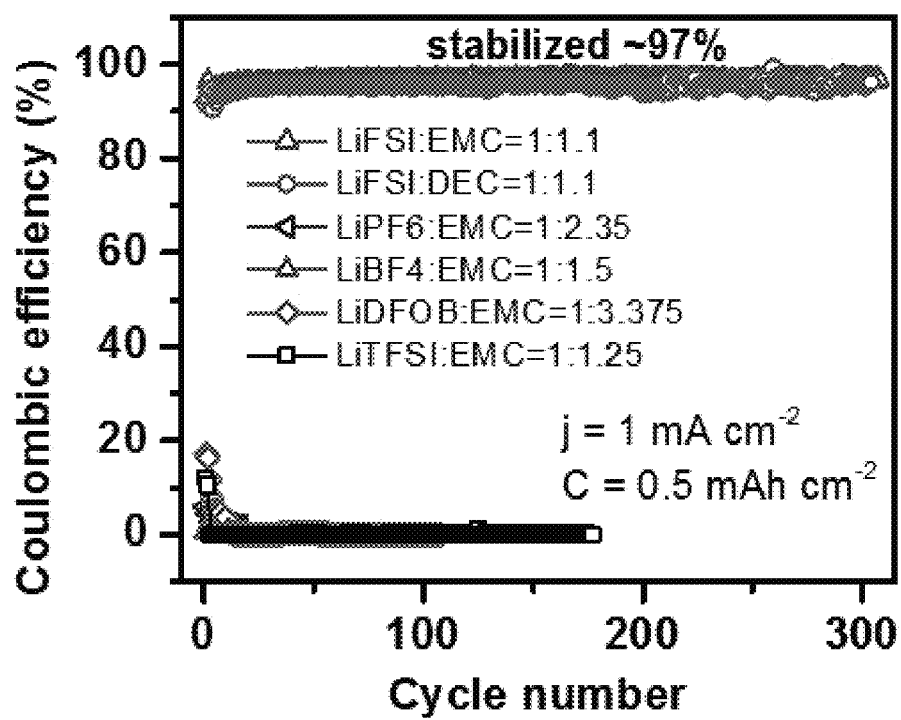

The coulombic efficiencies (CEs) of Li||Cu cells using different superconcentrated Li salts in carbonate solvent were evaluated. The solubility of different salts in carbonate solvents, e.g. EMC, is different, as reflected by the Li salt:solvent molar ratios shown in FIG. 5A. For example, the $LiPF_6$:EMC ratio is ca. 1:2.35 in a saturated $LiPF_6$/EMC solution, while the LiFSI:EMC ratio could be as high as 1:1.1 in a saturated LiFSI/EMC solution. The Li∥Cu cells were cycled at 1 mA $cm^{-2}$, with lithium deposition/stripping areal capacity of 0.5 mAh $cm^{-2}$ in each cycle. The CE data in FIG. 5B shows that only the concentrated electrolytes based on LiFSI salt, for example LiFSI/EMC (molar ratio 1:1.1, 8.73 mol $kg^{-1}$), could enable the reversible Li deposition/stripping with a stabilized CE of ~97%.

Fluoroalkyl ethers were used to dilute the concentrated LiFSI/EMC (molar ratio 1:1.1, 8.73 mol $kg^{-1}$) electrolyte. The LiFSI salt was confirmed insoluble in the fluoroalkyl ethers, e.g., TTE. On the other hand, TTE is miscible with EMC. Therefore, the fluoroalkyl ethers are considered an 'inert' diluent of the electrolyte without participating in the solvation of LiFSI. The electrolyte formulations and the corresponding mole numbers of these electrolytes are shown in Table 1.

TABLE 1

Electrolyte number and formulations

| Electrolyte number | Electrolyte formulation LiFSI:EMC: diluent molar ratio | M (mol $L^{-1}$) | m (mol $kg^{-1}$) |
|---|---|---|---|
| E1 | LiFSI:EMC = 1:1.1 | 4.9 | 8.73 mol $kg^{-1}$ |
| E2 | LiFSI:EMC:BTFE = 1:1.1:0.55 | 3.5 | 4.66 mol $kg^{-1}$ |
| E3 | LiFSI:EMC:TTE = 1:1.1:0.55 | | 4.13 mol $kg^{-1}$ |

Figure 6:
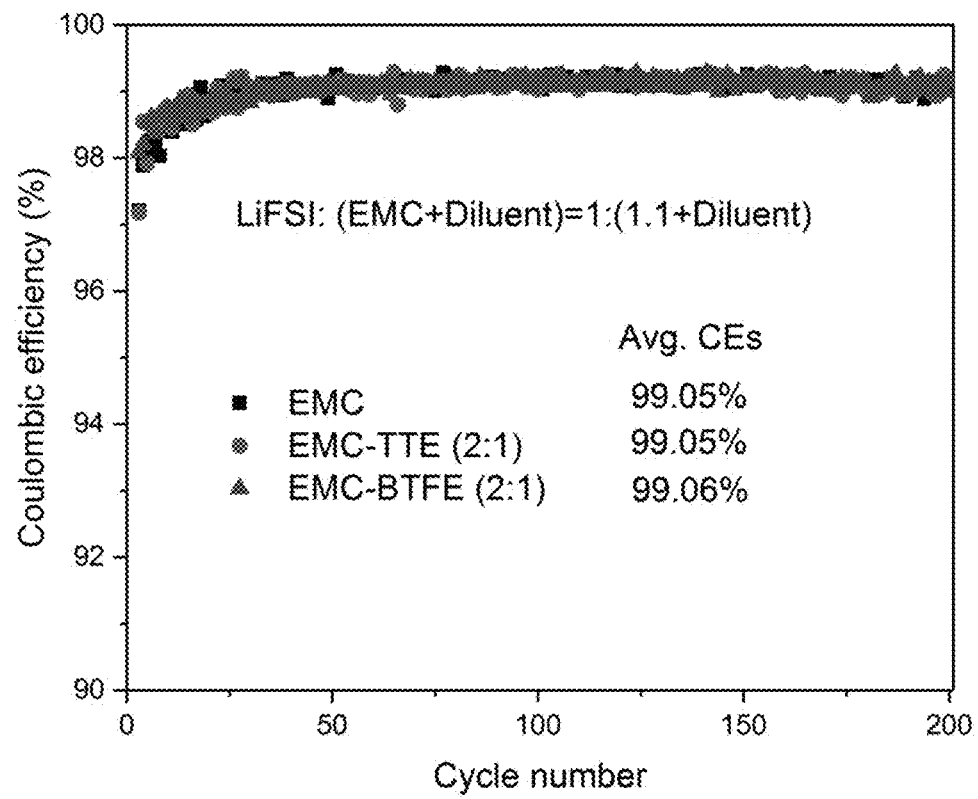
FIG. 6 is a graph of CE as a function of cycle number for Li||Cu cells having a Li areal deposition capacity of 1 mAh cm$^{-2}$, tested at 0.5 mA cm$^{-2}$ with electrolytes comprising concentrated lithium bis(fluorosulonyl)imide (LiFSI) in ethyl methyl carbonate (EMC) with and without fluoroalkyl ether diluents.

In E2 and E3, the localized superconcentrated LiFSI/EMC (1:1.1) solvation cation-anion aggregates (AGGs) are well maintained, beneficial for achieving higher CE for reversible Li deposition/stripping. The formation of $Li^+$—$FSI^-$-solvent aggregates also reduces the lowest unoccupied molecular orbital (LUMO) energy of the $FSI^-$ anions so they can be decomposed first to form a stable solid electrolyte interphase (SEI). With adding fluoroalkyl ethers to a EMC:fluoroalkyl ether ratio of 2:1, the concentration of LiFSI/EMC-fluoroalkyl ether is largely decreased, which is calculated to be 4.66 mol $kg^{-1}$ for LiFSI/EMC-BTFE (2:1) and 4.13 mol $kg^{-1}$ for LiFSI/EMC-TTE (2:1). As shown in FIG. 6, with the addition of fluoroalkyl ethers, i.e. TTE, BTFE as diluent, the average CEs of Li∥Cu cells from $3^{rd}$ to $86^{th}$ cycles are up to 98.95%, which is comparable to that of the parent superconcentrated LiFSI/EMC electrolyte (98.93%).

Figure 7:
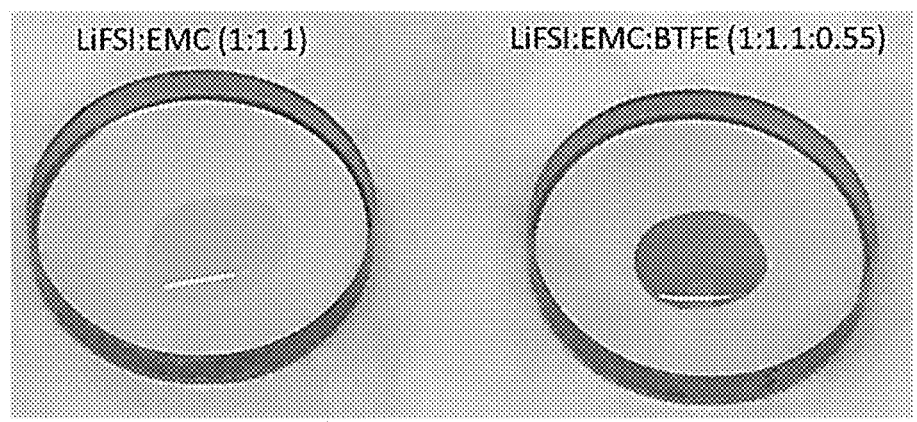
FIG. 7 shows digital photographs demonstrating that addition of bis(2,2,2-trifluoroethyl) ether (BTFE) to a LiFSI/EMC electrolyte improved wetting of a battery separator.
Figure 8A:
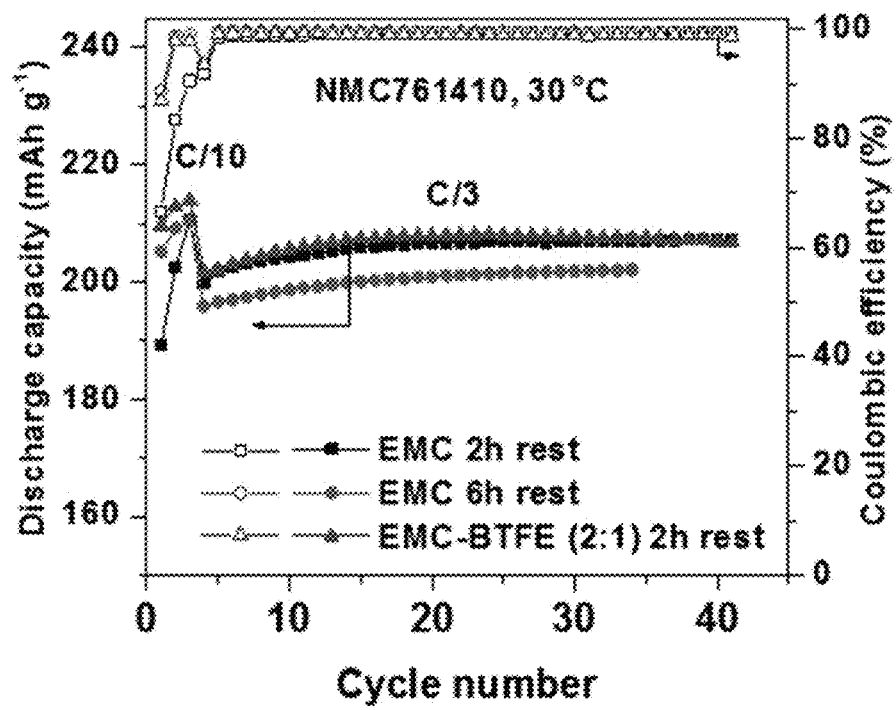
FIGS. 8A and 8B are graphs showing the cycling stability of Li||NMC761410 (LiNi$_{0.76}$Mn$_{0.14}$Co$_{0.10}$O$_2$) cells containing concentrated LiFSI/EMC electrolyte without and with BTFE diluent at C/3 (FIG. 8A) and 1C rates (FIG. 8B) (BTFE: bis(2,2,2-trifluoroethyl) ether).
Figure 8B:
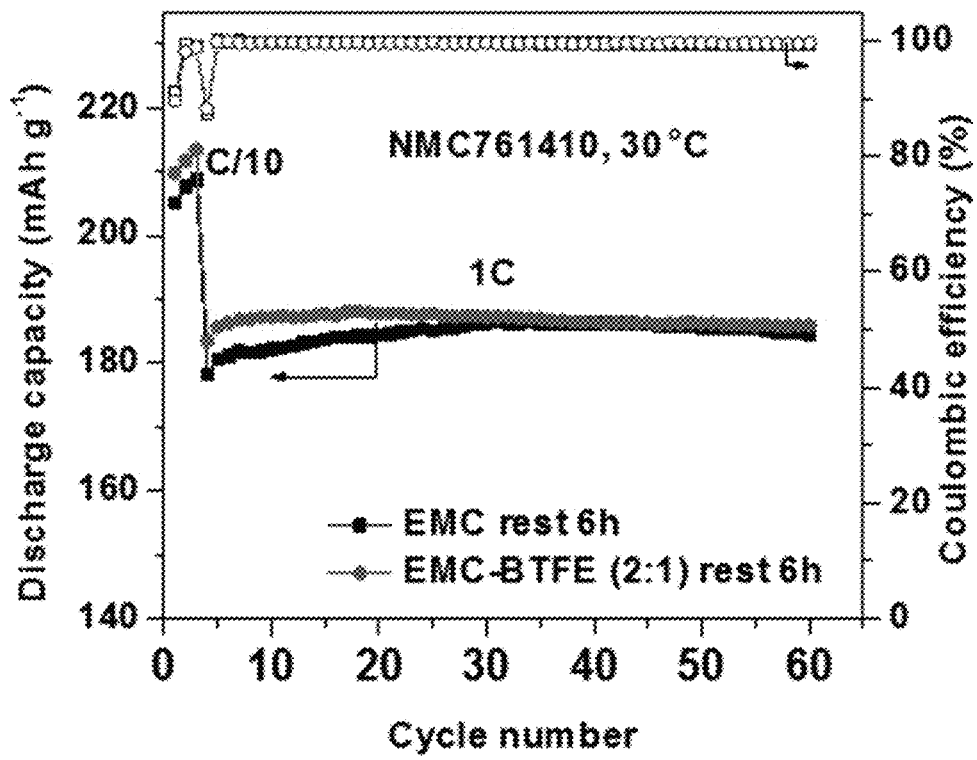

The cycling performance of Li∥NMC cells with concentrated LiFSI/EMC electrolyte without and with BTFE diluent was investigated. Improved wetting of the Celgard® 2500 separator could be visually observed after addition of BTFE, as presented in FIG. 7. The cells were cycled either at C/3 or 1C with a charge cutoff voltage of 4.5 V. FIG. 8A shows that the addition of BTFE as diluent largely shortened the rest time required to wet the electrode/separator. Cycling performance result shows that the Li∥NMC cell using BTFE diluted LiFSI/EMC-BTFE (2:1) electrolyte exhibits comparable discharge capacity, cycling stability and CE during cycling at both C/3 and 1C rates, as shown in FIGS. 8A and 8B, respectively. The result suggests that addition of BTFE or TTE as a diluent does not compromise the oxidative stability of the concentrated electrolyte.

Figure 9A:
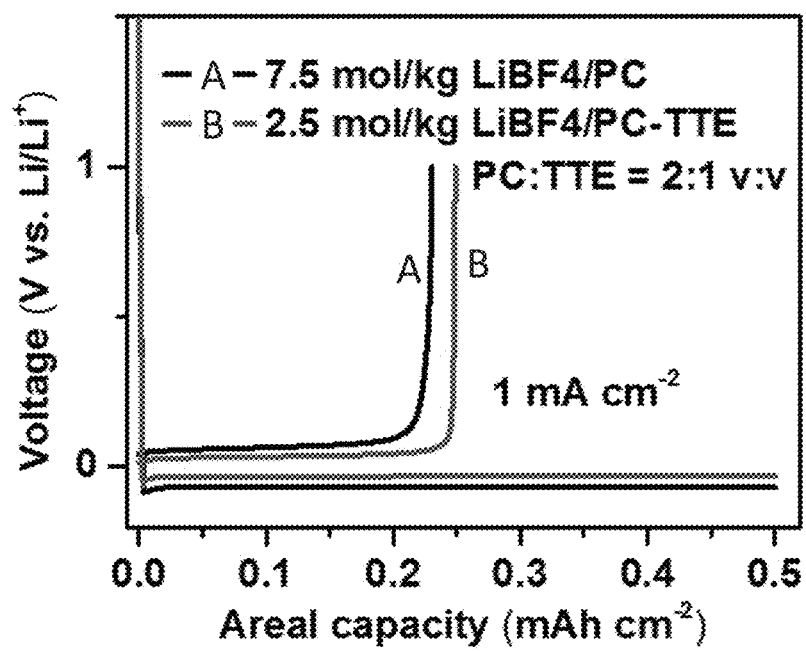
FIGS. 9A and 9B how initial Li deposition/stripping voltage profiles (FIG. 9A) and CE as a function of cycle number (FIG. 9B) for Li||Cu cells having a Li areal deposition capacity of 0.5 mAh/cm$^2$ with electrolytes comprising 7.5 mol/kg LiBF$_4$/PC and 2.5 mol/kg LiBF$_4$/PC-TTE (PC:TTE=2:1 v:v) (PC: propylene carbonate; TTE: 1,1,2,2-tetrafluoroethyl 2,2,3,3-tetrafluoropropyl ether).
Figure 9B:
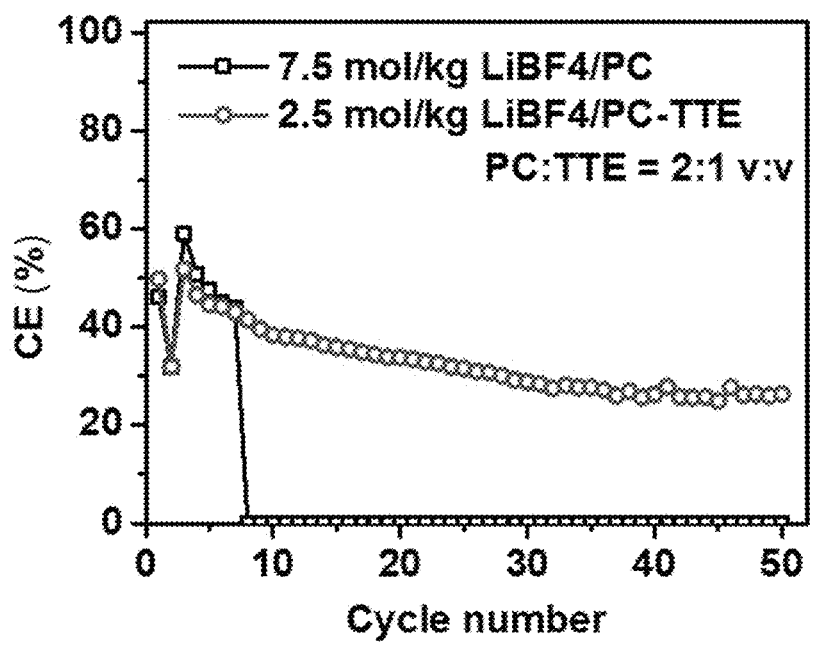
Figure 10A:
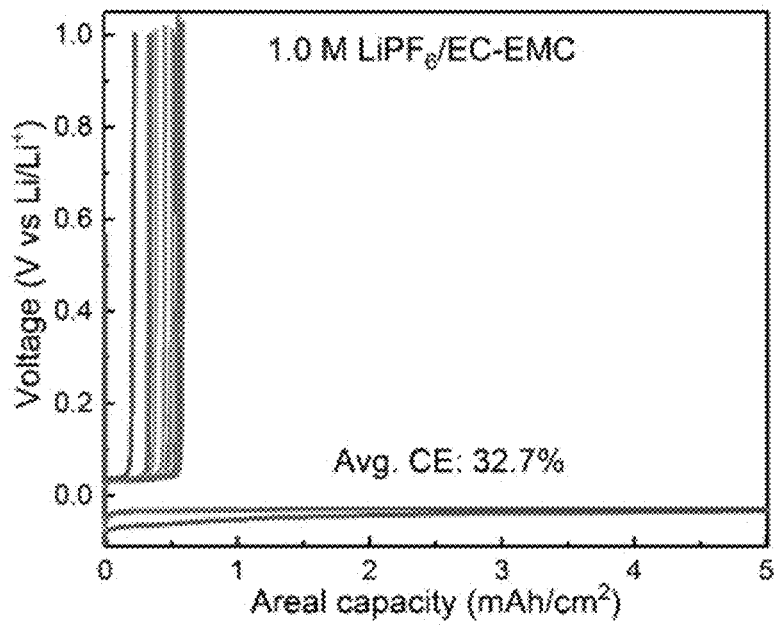
FIGS. 10A-10D are Li plating/stripping profiles of Li||Cu cells using conventional electrolyte (1.0 M LiPF$_6$/EC-EMC (4:6, w)) (FIG. 10A), 1.2 M LiFSI/DMC (FIG. 10B), 3.7 M LiFSI/DMC (FIG. 10C), and 5.5 M LiFSI/DMC (FIG. 10D). (EC: ethylene carbonate; DMC: dimethyl carbonate)
Figure 10B:
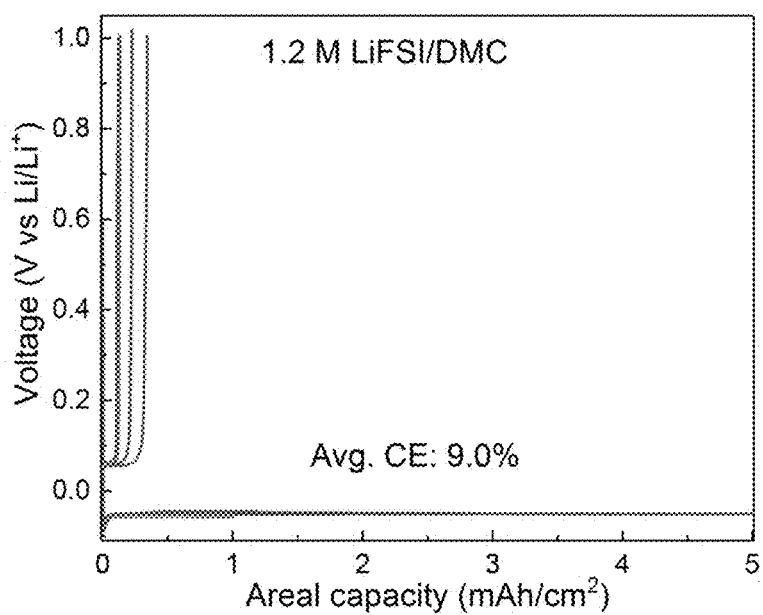
Figure 10C:
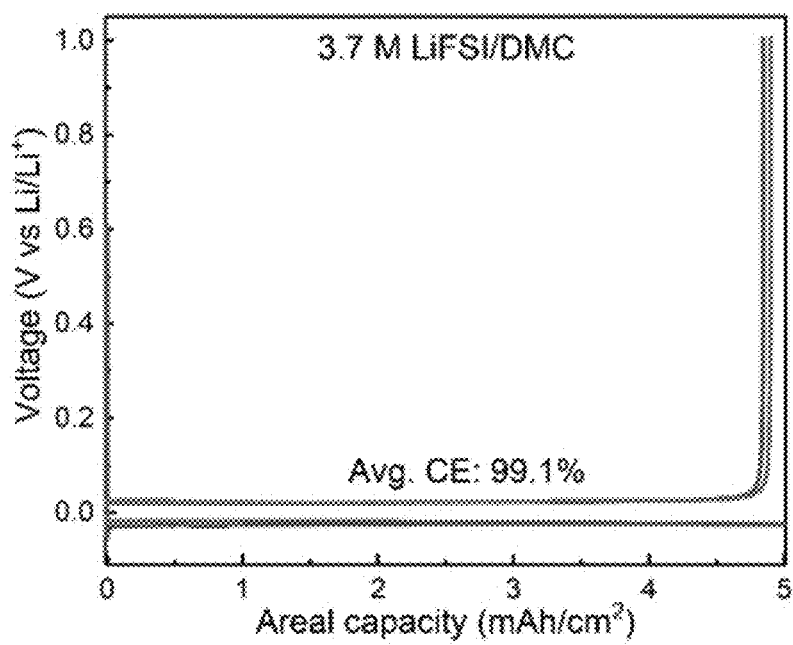
Figure 10D:
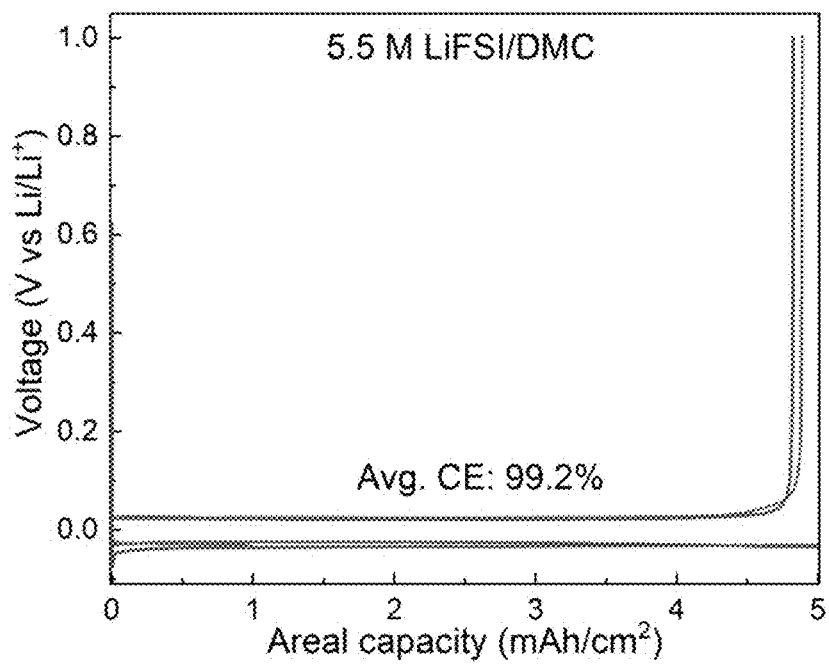
Figure 11A:
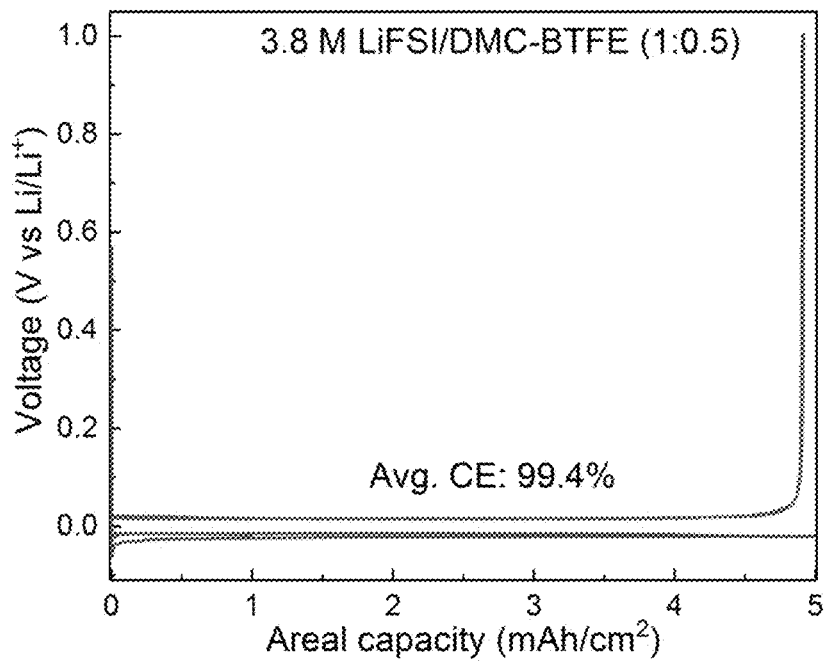
FIGS. 11A-11D are Li plating/stripping profiles of Li||Cu cells using concentrated 3.8M LiFSI/DMC-BTFE (1:0.5) (FIG. 11A), 2.5M LiFSI/DMC-BTFE (1:1) (FIG. 11B), 1.8M LiFSI/DMC-BTFE (1:1.5) (FIG. 11C), and 1.2M LiFSI/DMC-BTFE (1:2) (FIG. 11D). The ratios in the parentheses indicate the molar ratios of DMC:BTFE.
Figure 11B:
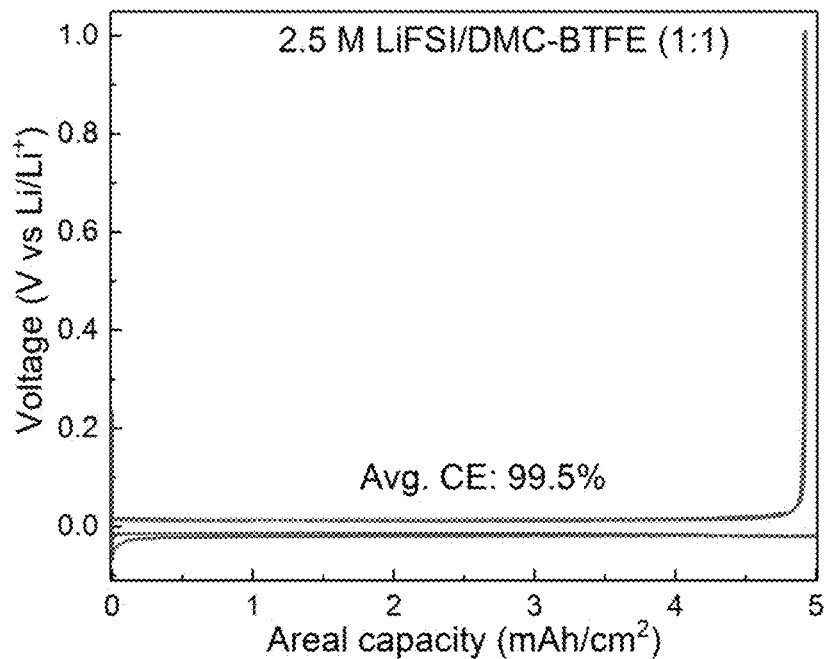
Figure 11C:
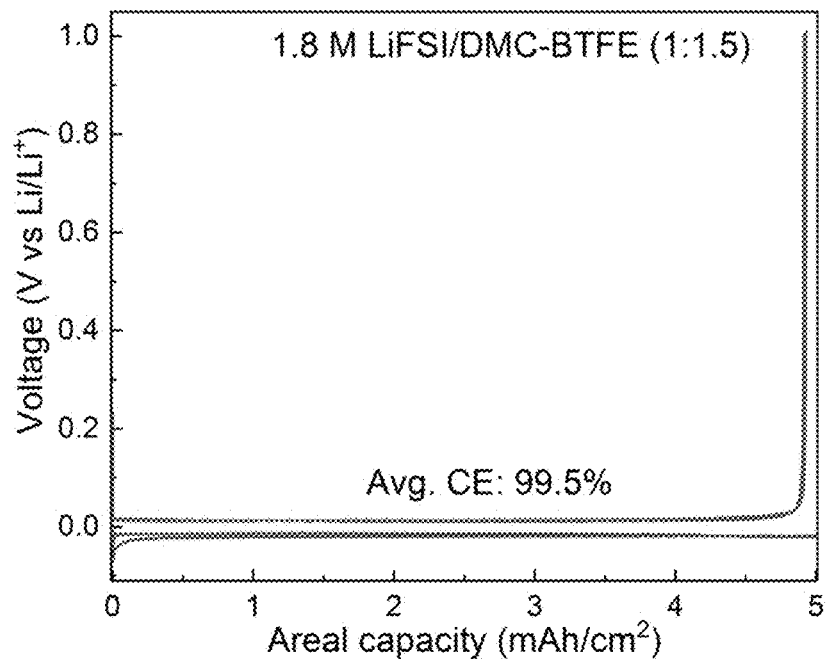
Figure 11D:
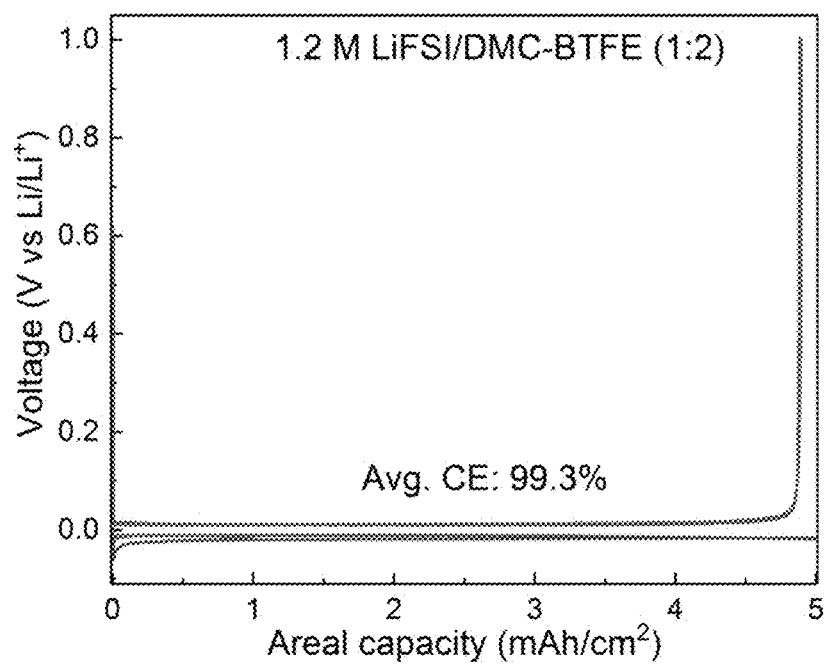
Figure 12C:
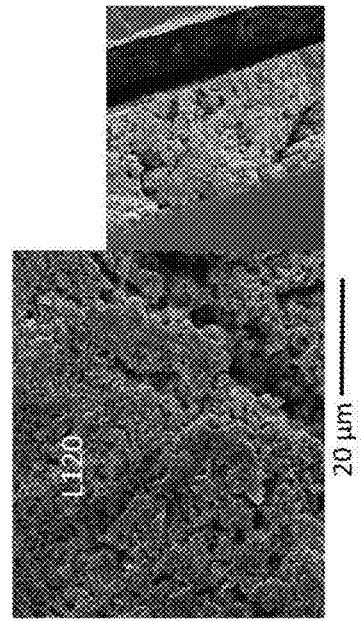
FIGS. 12A-12D are scanning electron microscopy images of Li plated onto copper substrates after 100 cycles (1 mA/cm$^2$ to 0.5 mAh/cm$^2$) from 1.0 M LiPF$_6$/EC-EMC (FIG. 12A), 5.5 M LiFSI/DMC (FIG. 12B), 3.7 M LiFSI/DMC (FIG. 12C), and 1.2 M LiFSI/DMC-BTFE (1:2) (FIG. 12D) electrolytes.
Figure 12D:
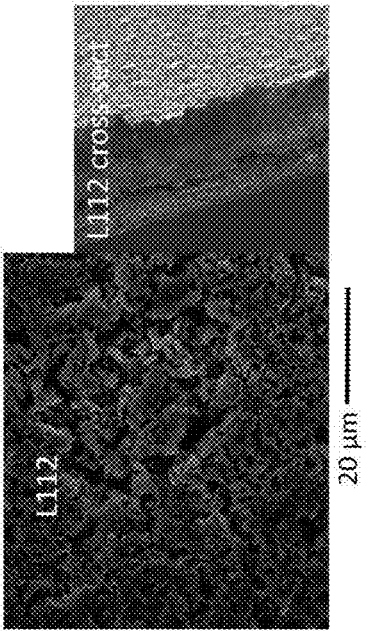
Figure 12A:
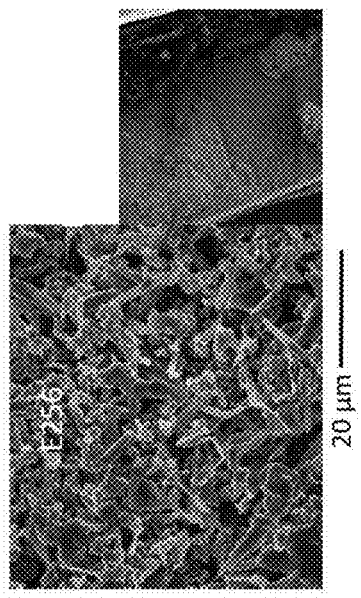
Figure 12B:
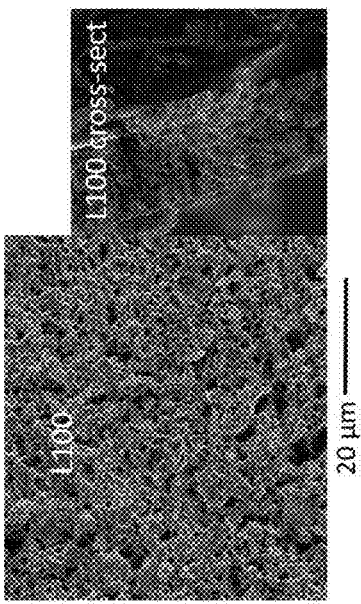

Not all salt/solvent combinations provide such excellent results. $LiBF_4$ was evaluated in propylene carbonate (PC). The cycling performances of 7.5 mol/kg $LiBF_4$ in PC and 2.5 mol/kg $LiBF_4$ in PC-TTE (2:1 v:v) were compared in Li∥Cu cells having a lithium areal deposition capacity of 0.5 mAh/$cm^2$. The initial two cycles were performed at 0.2 mA/$cm^2$ with further cycles at 1 mA/$cm^2$. The results are shown in FIGS. 9A and 9B. The $LiBF_4$/PC electrolyte had an initial CE of approximately 50%. When diluted with TTE, the electrolyte had an average CE over 50 cycles of less than 50%. This is in sharp contrast to the LiFSI/EMC, LiFSI/EMC-BTFE, and LiFSI-EMC-TTE electrolytes with CE values up to 98.95%. LiTFSI-tetraglyme also produces poor CE results.

Example 2

LiFSI/DMC-BTFE Electrolyte Performance in Lithium Metal Batteries

The concept of dilution and formation of the localized concentrated electrolyte solution structure was proven in DMC solvent-based electrolytes. The electrolyte formulations of various concentrations of LiFSI/DMC-BTFE solutions are listed in Table 2. With addition of BTFE, the concentration of 5.5 M LiFSI/DMC electrolyte was diluted to as low as 1.2 M.

TABLE 2

Electrolyte number, formulations and viscosity.

| Electrolyte | | Molar Ratio | Mass Ratio | Density g $cm^{-3}$ | Molarity mol $L^{-1}$ | Molality mol $kg^{-1}$ | Viscosity mPa s 30° C. | 5° C. |
|---|---|---|---|---|---|---|---|---|
| LiFSI/DMC-BTFE | E11 | 0.51:1.1:2.2 | 0.95:0.99:4.0 | 1.38 | 1.18 | 1.02 | 2.7 | 4.8 |
| | E10 | 0.64:1.1:1.65 | 1.20:0.99:3.0 | 1.44 | 1.77 | 1.60 | 3.9 | 9.1 |
| | E9 | 0.75:1.1:1.1 | 1.40:0.99:2.0 | 1.48 | 2.52 | 2.51 | 10.2 | 31.9 |
| | E8 | 0.94:1.1:0.55 | 1.76:0.99:1.0 | 1.53 | 3.83 | 4.72 | 45.9 | 206.4 |
| LiFSI/DMC | E7 | 1.0:1.1 | 1.87:0.99 | 1.57 | 5.49 | 10.09 | 180.0 | >1200 |
| | E6 | 1.0:2.0 | 1.87:1.80 | 1.37 | 3.74 | 5.55 | 13.6 | 52.8 |
| | E5 | 1.0:9.0 | 1.87:8.11 | 1.21 | 1.21 | 1.23 | 1.3 | 2.6 |
| $LiPF_6$/EC-EMC | E4 | 2.19:1.0:1.27 | 1.42:4.0:6.0 | 1.22 | 1.0 | 0.93 | 3.5 | 7.0 |

Li plating/stripping profiles of Li∥Cu cells using 1.0 M $LiPF_6$/EC-EMC (E4), 1.2 M LiFSI/DMC (E5), 3.7 M LiFSI/DMC (E6), and 5.5 M LiFSI/DMC (E7) are presented in FIGS. 10A-10D, respectively. The profiles were obtained using the following protocol: 1) one initial formation cycle with Li plating of 5 mAh $cm^{-2}$ on Cu at 0.5 mA $cm^{-2}$; and then Li stripping at 0.5 mA $cm^{-2}$ to 1 V; 2) plate 5 mAh $cm^{-2}$ Li on Cu at 0.5 mA $cm^{-2}$ as Li reservoir; 3) strip/plate Li with 1 mAh $cm^{-2}$ with 20% depth for 9 cycles; 4) strip all Li at 0.5 mA cm$^{-2}$ to 1 V. The average CE is calculated by dividing the total Li stripping capacity by the total Li plating capacity. With 1.0 M LiPF$_6$/EC-EMC electrolyte, as well as the 1.2 M LiFSI/DMC electrolyte, the Li metal cycling efficiency is so low (<50%) that significant overpotential arises for stripping within only couples of cycles. The CEs can reach >99.0% for 3.7 M and 5.5 M LiFSI/DMC.

The average CEs of diluted LiFSI/DMC-BTFE electrolytes were also measured using the same protocol as shown in FIGS. 11A-11D. The BTFE-diluted LSEs exhibited CEs that were even higher than the superconcentrated 5.5 M LiFSI/DMC (CE 99.2%) with CEs ranging from 99.3 to 99.5%. The results illustrate that the dilution with BTFE does not alter the localized superconcentrated structures and minimizes the presence of free DMC solvent molecules, therefore maintaining the high stability of the electrolyte toward Li metal anode during repeated plating/stripping processes.

Figure 13:
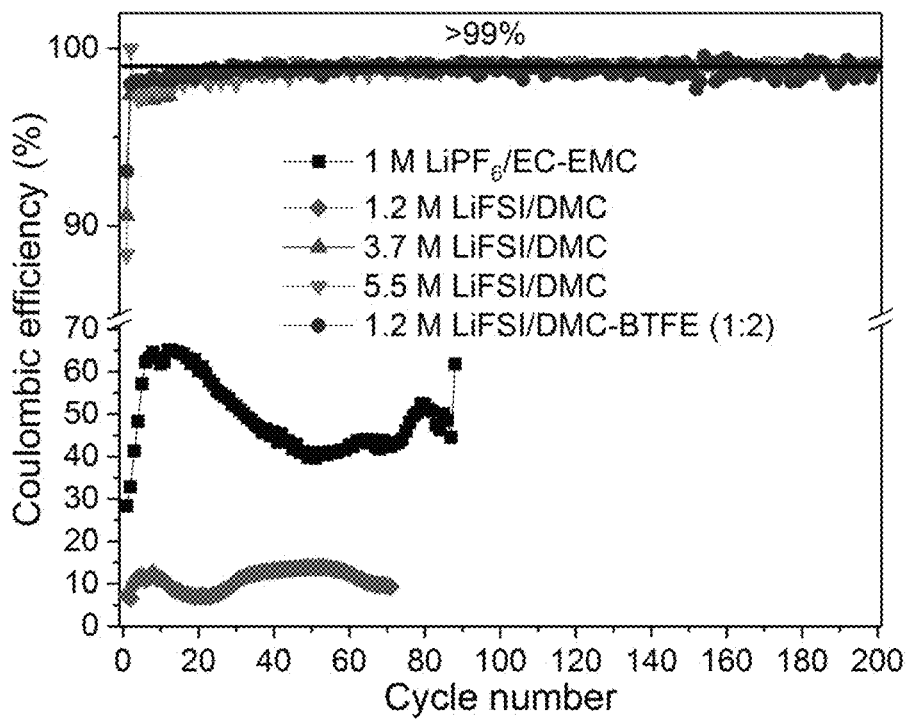
FIG. 13 is a graph of CE vs. cycle number for conventional electrolyte, dilute LiFSI/DMC electrolytes, superconcentrated LiFSI/DMC electrolyte, and an electrolyte comprising 1.2 M LiFSI/DMC-BTFE (1:2).
Figure 14:
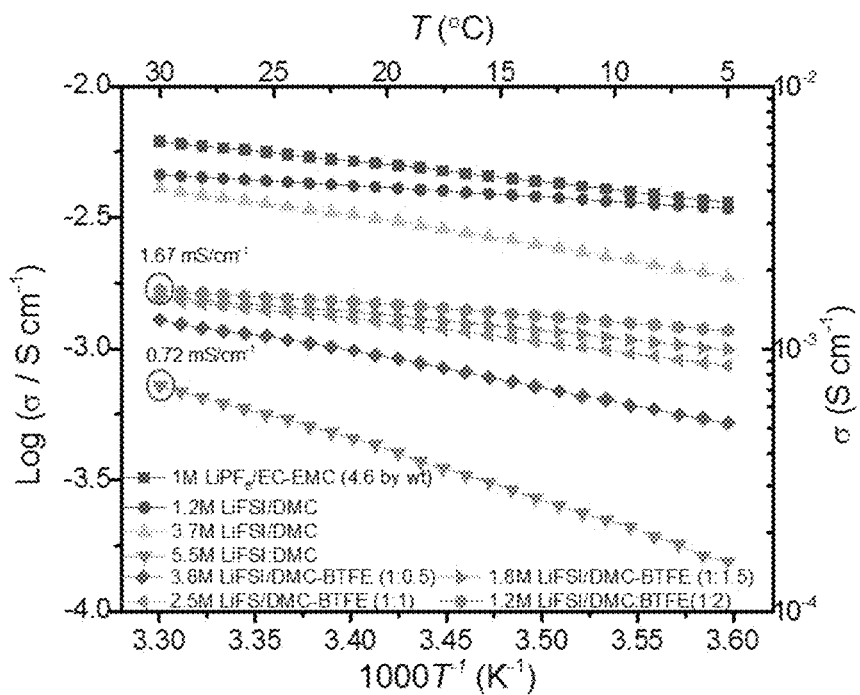
FIG. 14 is a graph of conductivity vs. temperature for conventional electrolyte, dilute LiFSI/DMC electrolytes, superconcentrated LiFSI/DMC electrolyte, and certain electrolyte embodiments as disclosed herein.
Figure 15A:
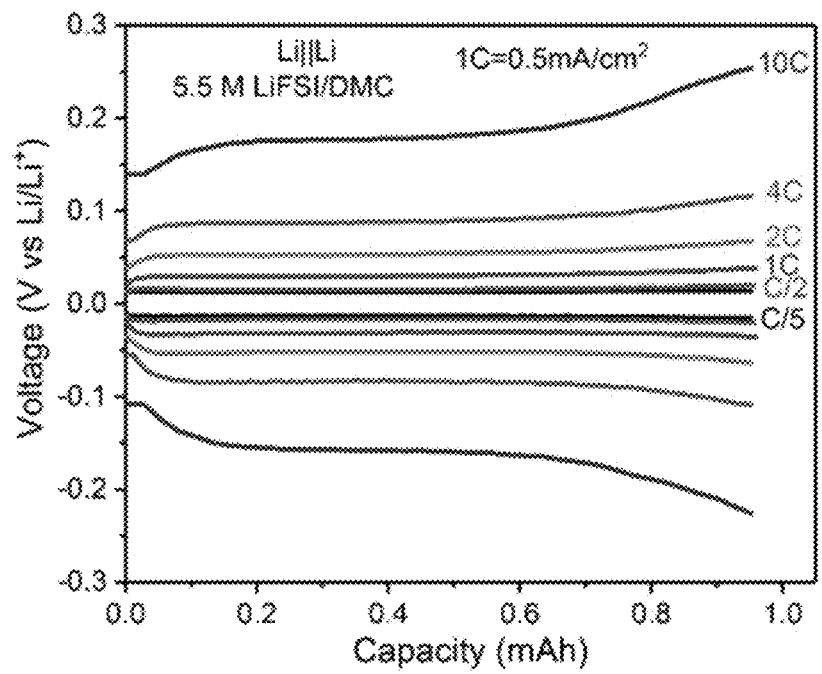
FIGS. 15A and 15B are graphs demonstrating the performance (voltage vs. capacity) of Li||Li symmetric cells in SE of 5.5 M LiFSI/DMC (FIG. 15A) and an electrolyte comprising 1.2 M LiFSI/DMC-BTFE (1:2) (FIG. 15B) at varying current densities.
Figure 15B:
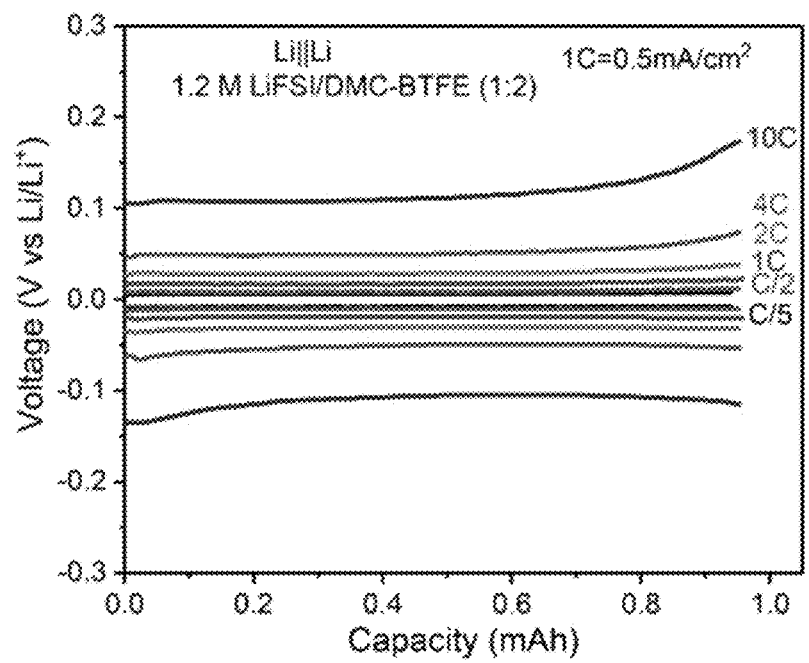

The evolution of Li plating/stripping profiles and CE during long-term cycling in different electrolytes was also examined by repeated plating/stripping cycles in Li∥Cu cells. The cells were cycled at a current density of 0.5 mA·cm$^2$; the working area of the Cu electrode was 2.11 cm$^2$. FIGS. 12A-12D are scanning electron microscopy images of lithium plated onto copper substrates at the 100th cycle (1 mA/cm$^2$ to 0.5 mAh/cm$^2$) from 1.0 M LiPF$_6$/EC-EMC (4:6, w) (FIG. 12A), 5.5 M LiFSI:DMC (1:1) (FIG. 12B), 3.7 M LiFSI/DMC (1:2) (FIG. 12C), and 1.2 M LiFSI/DMC-BTFE (0.51:1.1:2.2) (FIG. 12D) electrolytes. Cells with the highly concentrated 5.5 M LiFSI/DMC and highly diluted 1.2 M LiFSI/DMC-BTFE (1:2) electrolytes were stably cycled for >200 cycles (FIG. 13) with average CE of ~99%. Due to better conductivity and lower viscosity (FIG. 14, Table 2), the cell polarization during charge-discharge in the diluted electrolyte was much smaller than that in the highly concentrated electrolyte, and this difference became more obvious with increasing current densities (FIGS. 15A, 15B).

Example 3

Lithium Ion Batteries with LiFSI/DMC-BTFE Electrolytes

Figure 16:
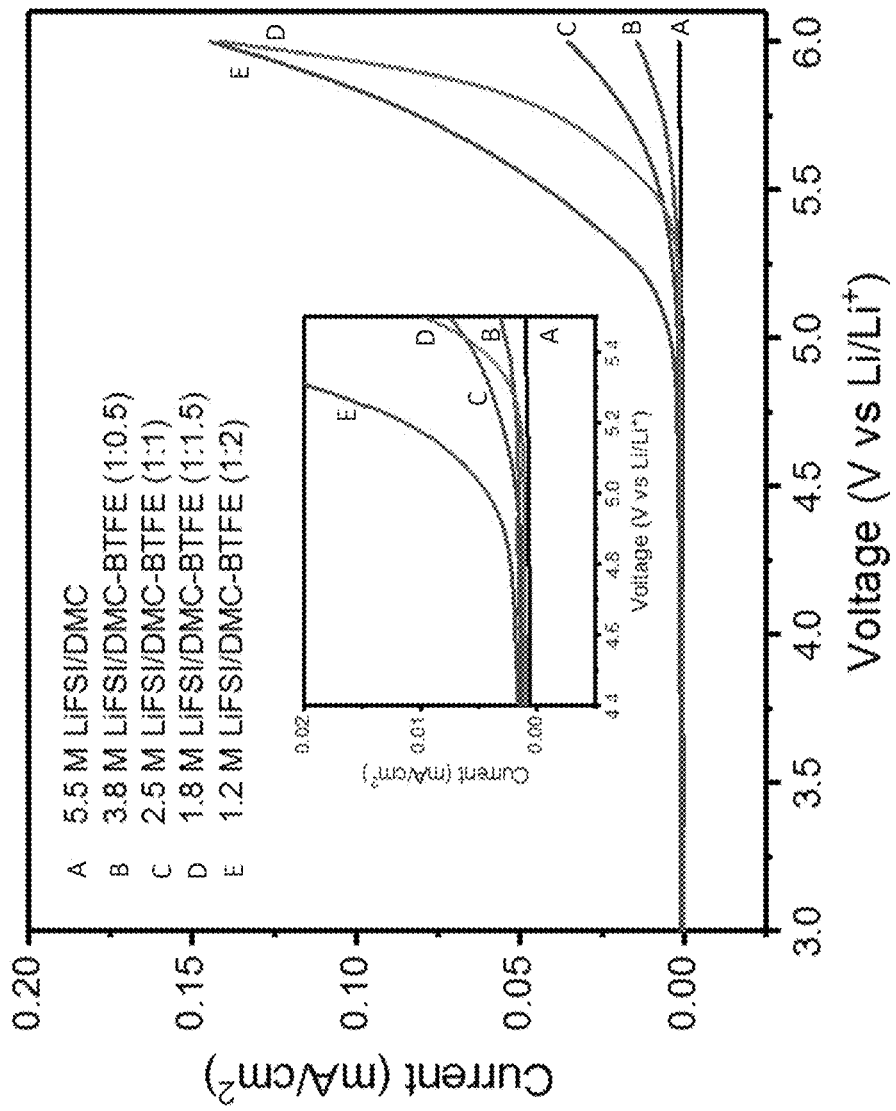
FIG. 16 is a graph of current vs. voltage illustrating the anodic stability of SE of 5.5 M LiFSI/DMC and certain electrolytes as disclosed herein.
Figure 17A:
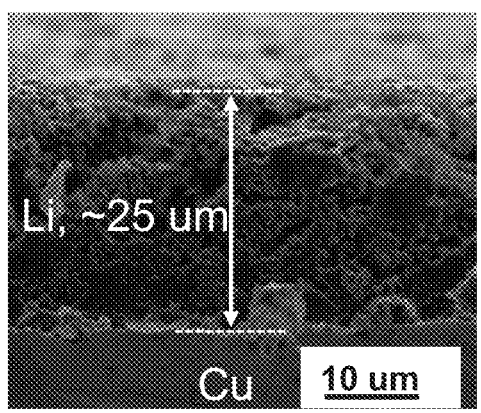
FIGS. 17A-17D are SEM images showing Li plated onto copper substrates from 1.2 M LiFSI/DMC (FIGS. 17A, 17B) and 3.7 M LiFSI/DMC (FIGS. 17C, 17D)
Figure 17C:
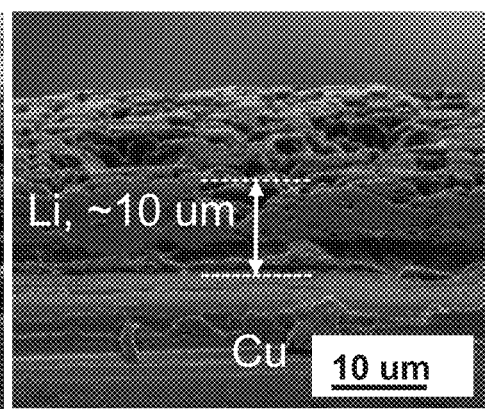
Figure 17B:
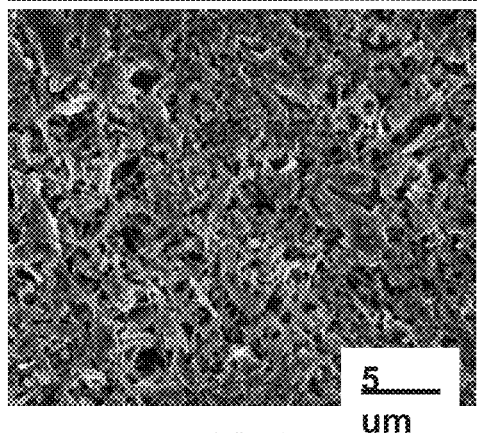
Figure 17D:
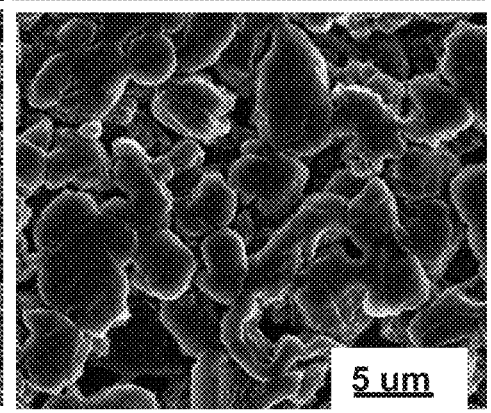

The stability of the concentrated and BTFE diluted electrolytes at high voltages was first studied in cells with Al as working electrodes via linear sweep voltammetry (LSV) at a scan rate of 0.2 mV/s. The results show that, although there was less stability at high voltage with increasing BTFE concentrations, the BTFE-diluted electrolytes all exhibited an anodic stability to 4.5 V or higher (FIG. 16). FIGS. 17A-17D are photomicrographs showing the morphology of lithium metal after plating on Cu substrates in low and moderate concentration electrolytes of LiFSI in DMC—1.2 M LiFSI/DMC (FIGS. 17A, 17B) and 3.7 M LiFSI/DMC (FIGS. 17C, 17D).

Next, Li∥NMC cells were assembled to evaluate the performance of a dilute 1.2 M LiFSI/DMC-BTFE electrolyte, by using NMC electrodes of high areal capacity of ~2.0 mAh/cm$^2$. Li∥NMC cells with concentrated 5.5 M LiFSI/DMC and conventional 1.0 M LiPF$_6$/EC-EMC were also assembled and tested for comparison. FIGS. 18A-18D show the long-term cycling performance and corresponding voltage profile evolution of the Li∥NMC cells. After 3 formation cycles at 0.67 mA/cm$^2$ (1/3 hour rate), all the cells were subjected to cycling at a high current density of 2.0 mA/cm$^2$ (1 hour rate), in order to reveal the stability of these electrolytes with Li metal anodes at this harsh condition. During the formation cycles, the Li∥NMC cells delivered similar specific discharge capacities of ca. 160 mAh g$^{-1}$ of NMC, corresponding to a normal areal capacity of 2.0 mAh/cm$^2$. When cycled at 2.0 mA/cm$^2$, the Li∥NMC cell with the 1.0 M LiPF$_6$/EC-EMC electrolyte showed a drastic increase of electrode polarization and fast capacity degradation with <30% retention after 100 cycles (FIGS. 18A, 18B), which is attributed to the severe corrostion reactions between Li metal and the electrolyte. When using the concentrated 5.5 M LiFSI/DMC, the stability with Li metal was greatly improved, as reflected by the much higher CE of Li metal itself. However, the Li∥NMC cell with concentrated 5.5 M LiFSI/DMC still showed continuous capacity fading and increase of electrode polarization, retaining ~70% of its capacity after 100 cycles (FIG. 18C). The unsatisfactory cycling performance of concentrated 5.5 M LiFSI/DMC is attributed to the sluggish electrode reaction kinetics resulted from the high viscosity, low conductivity and poor wetting ability of the superconcentrated electrolyte. In sharp contrast, with the BTFE-diluted 1.2 M LiFSI/DMC-BTFE electrolyte, the significantly improved long-term cycling stability and limited increase of electrode polarization could be achieved (FIG. 18D). The cell shows a high capacity retention of >95% after 300 cycles at high current density of 2.0 mA/cm$^2$, which is among the best performances ever reported for Li metal batteries. This finding indicates that the LSE with a low Li salt concentration could enable the fast charging and stable cycling of Li metal batteries (LMBs).

Figure 19:
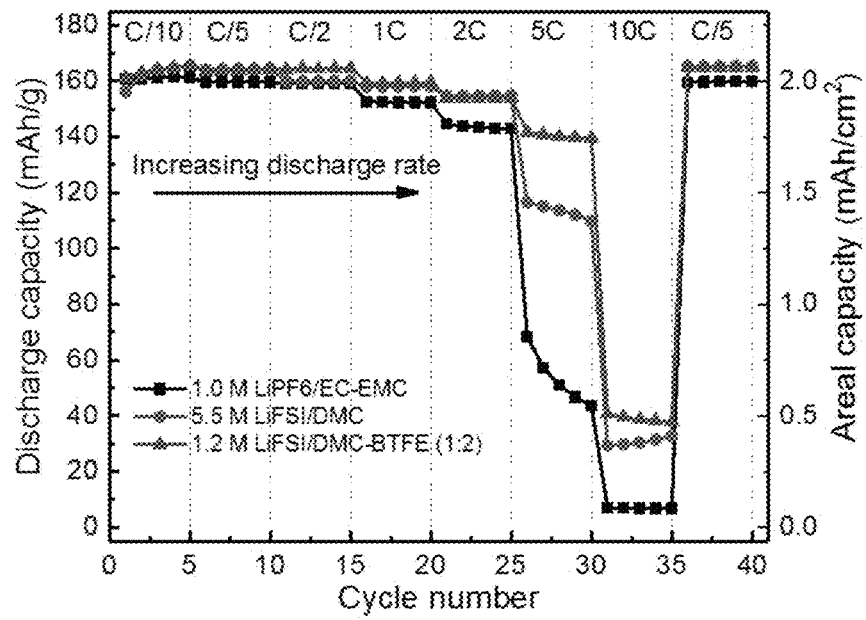
FIG. 19 shows the rate performance of Li||NMC batteries using different electrolytes; the batteries were charged at a constant C/5 rate but discharged at an increasing C rate; 1C=2.0 mA/cm$^2$.
Figure 20:
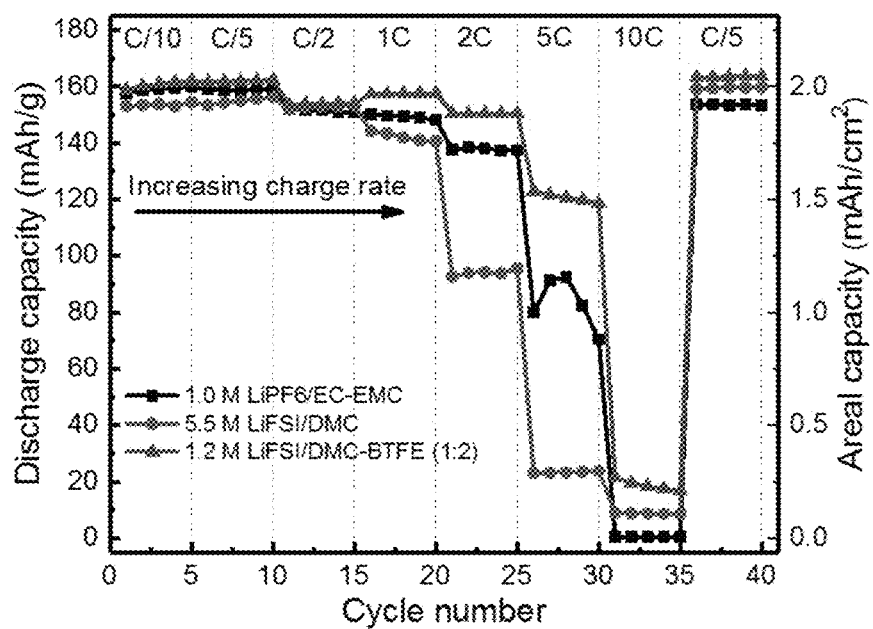
FIG. 20 shows the rate performance of Li||NMC batteries using different electrolytes; the batteries were discharged at a constant C/5 rate but charged at an increasing C rate; 1C=2.0 mA/cm$^2$.

The rate performances of Li∥NMC cells were evaluated to determine the electrochemical reaction kinetics of the BTFE diluted electrolyte. The rate capability was tested using two charge/discharge protocols, i.e., (i) charge at same C/5 and discharge at increasing rate; (ii) charge at increasing rate and discharge at same C/5. As shown in FIGS. 19 and 20, the Li∥NMC cell with BTFE-diluted electrolyte (1.2 M LiFSI/DMC-BTFE) showed superior charging and discharging capability as compared to the concentrated 5.5 M LiFSI/DMC electrolyte and the baseline 1 M LiPF$_6$ dilute electrolyte. In particular, with protocol (i), when discharging at 5C (i.e. 10 mA/cm$^2$), the cell using 1.2 M LiFSI/DMC-BTFE electrolyte delivered a high discharge capacity of 141 mAh/g, significantly higher than 116 mAh/g for the concentrated 5.5 M LiFSI/DMC electrolyte and 68 mAh/g for the 1 M LiPF$_6$ dilute electrolyte. The enhanced rate capability of 1.2 M LiFSI/DMC-BTFE electrolyte as compared to concentrated 5.5 M LiFSI/DMC electrolyte is ascribed to the reduced viscosity, increased conductivity, improved electrode/separator wetting, as well as the improved interfacial reaction kinetics.

Example 4

Dendrite-Free Deposition on Li Metal Anode

Figure 21:
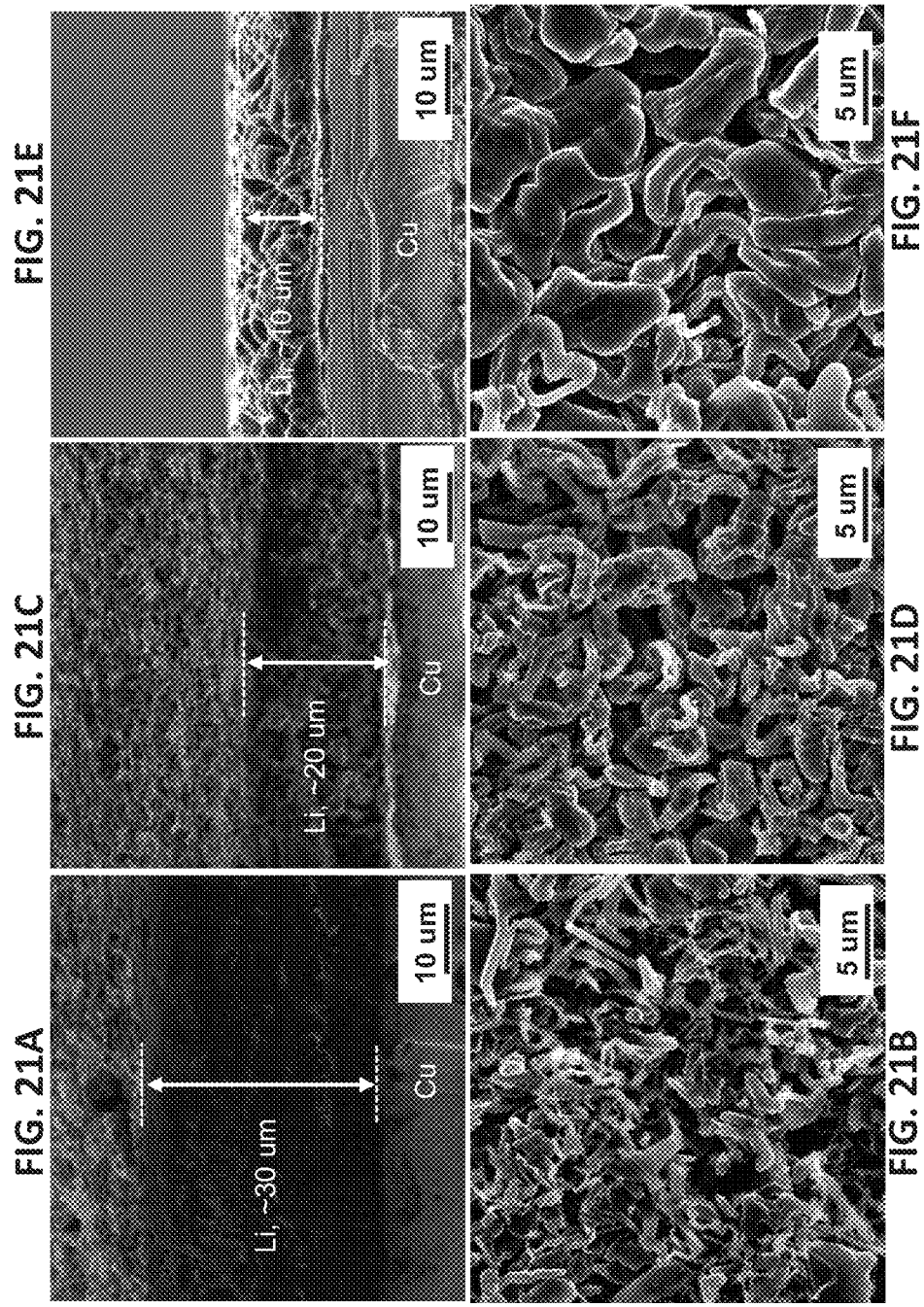
FIGS. 21A-21F are SEM images showing morphology of Li metal after plating on Cu substrates in different electrolytes.
Figure 22:
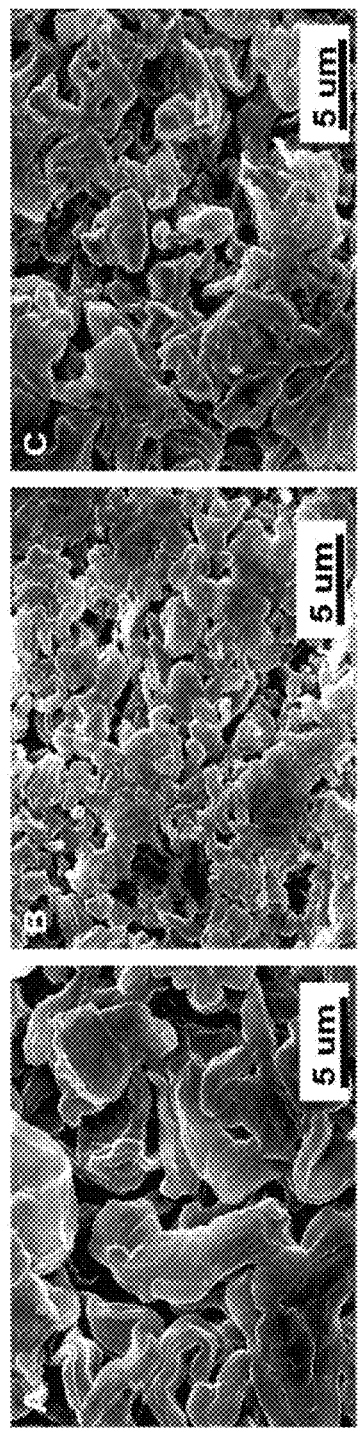
FIGS. 22A-22C are SEM images showing morphology of Li metal after plating on Cu substrates in 1.2 M LiFSI/DMC-BTFE (1:2) at current densities of 2 mA/cm$^2$ (FIG. 22A), 5 mA/cm$^2$ (FIG. 22B), and 10 mA/cm$^2$ (FIG. 22C).

To gain insight into the superior electrochemical properties of LSE (1.2 M LiFSI/DMC-BTFE), the morphology features of Li deposited in different electrolytes were evaluated. The current density was 1.0 mA/cm$^2$ and the deposition capacity was 1.5 mAh/cm$^2$. FIGS. 21A-21F show the cross-section and surface morphologies of Li films deposited on Cu substrates in different electrolytes at a current density of 1 mA/cm$^2$. The electrolytes were as follows: 1.0 M LiPF$_6$/EC-EMC (FIGS. 21A, 21B), 5.5 M LiFSI/DMC (FIGS. 21C, 21D), and 1.2 M LiFSI/DMC-BTFE (1:2) (FIGS. 21E, 21F). The plating of Li metal from the LiPF$_6$ electrolyte resulted in a highly porous/loose structure with extensive dendritic Li (FIGS. 21A, 21B). Dendritic Li deposition were also observed in both low (1.2 M) and moderate (3.7 M) concentrated LiFSI/DMC electrolytes as previously shown in FIGS. 17A-17D. In contrast, nodule-like Li deposits without dendrite formation were obtained in both highly concentrated 5.5 M LiFSI/DMC and diluted low concentration 1.2 M LiFSI/DMC-BTFE electrolytes (FIGS. 21C-21F). Compared to that in the concentrated electrolyte, larger primary Li particles (avg. ~5 μm) and a denser deposit layer (~10 μm, close to the theoretical thickness of 1.5 mAh cm$^{-2}$ (~7.2 μm) of bulk Li) were found in the LSE electrolyte (1.2 M LiFSI/DMC-BTFE). Moreover, with increasing current densities (2, 5, and 10 mA/cm$^2$), the Li deposits maintained a nodule-like nature in the 1.2 M LiFSI/DMC-BTFE electrolyte despite a slight decrease in particle size (FIGS. 22A-22C). Formation of nodule-like Li deposits of large particle size can significantly mitigate the interfacial reactions with the electrolyte, and reduce the risk of Li penetration through the separator, hence improving the cycle life and safety of LMBs using LSE (dilute 1.2 M LiFSI/DMC-BTFE). The dilute electrolyte also produced a more stable SEI layer than the highly concentrated 5.5 M LiFSI/DMC. In addition, deposition of high density Li is beneficial for reducing the volume variation of the LMBs during charge/discharge processes, and is highly desirable for the development of LMBs.

Example 5

Lithium Metal Batteries with LiFSI/DME-BTFE and LiFSI/DME-TTE Electrolytes

Dilution of concentrated electrolytes also works well with ether-based electrolytes, such as DME. Exemplary electrolyte formulations are shown in Table 3. With addition of BTFE or TTE, the concentration of 4 M LiFSI/DME electrolyte was diluted to 2 M or 1 M.

TABLE 3

Electrolyte number and formulations

| Electrolyte number | Electrolyte formulation | Concentration |
|---|---|---|
| E12 | 4M LiFSI/DME (LiFSI:DME 1:1.4) | 4 mol L$^{-1}$ |
| E13 | LiFSI/DME + BTFE (DME:BTFE = 3:5, v:v) | 2 mol L$^{-1}$ |
| E14 | LiFSI/DME + TTE (DME:TTE = 3:5, v:v) | 2 mol L$^{-1}$ |
| E15 | LiFSI/DME + BTFE (DME:BTFE = 3:8, v:v) | 1 mol L$^{-1}$ |
| E16 | LiFSI/DME + TTE (DME:TTE = 3:8, v:v) | 1 mol L$^{-1}$ |

Figure 23:
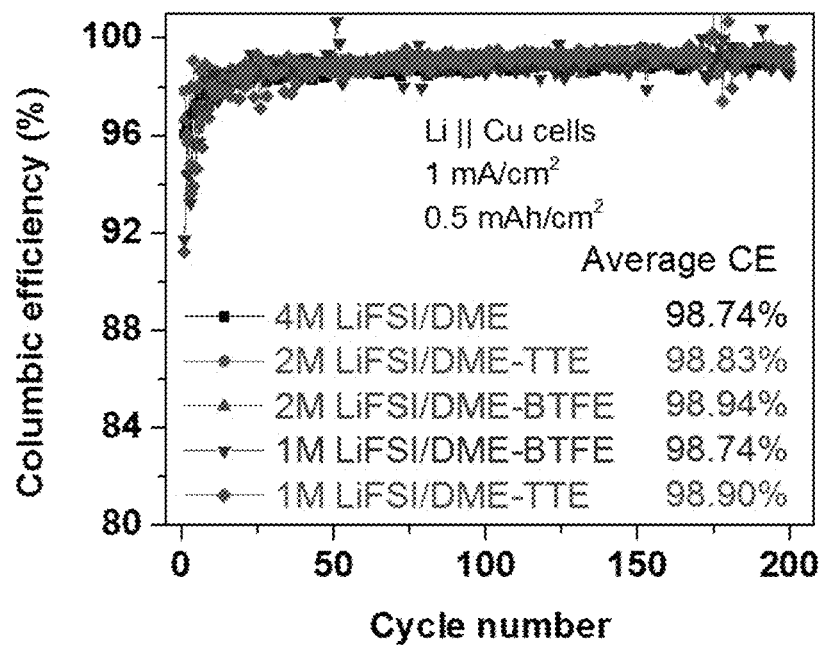
FIG. 23 shows the CE of Li∥Cu cells using concentrated LiFSI/DME electrolyte and those with TTE or BTFE diluent as a function of cycle number tested at 0.5 mA cm$^{-2}$ with Li deposition areal capacity of 1 mAh cm$^{-2}$. (DME: 1,2-dimethoxylethane)

FIG. 23 shows the CE of Li||Cu cells using concentrated LiFSI/DME electrolyte and those with TTE or BTFE diluent. All cells demonstrated very similar CE in the first cycle and during the long-term cycling. When the concentration of LiFSI/(DME+BTFE) and LiFSI/(DME+TTE) was diluted to 2M with the addition of fluoroalkyl ethers, i.e. TTE, BTFE as diluent, the average CEs of Li||Cu cells were 98.83% and 98.94% for TTE and BTFE diluted electrolyte, which is comparable to or even superior over that of the parent concentrated LiFSI/DME (98.74%). Even when the concentration of LiFSI/(DME+BTFE) and LiFSI/(DME+TTE) was diluted to 1M with the addition of TTE, BTFE as diluent, the average CEs of Li||Cu cells were 98.90% and 98.94% and 98.74 for TTE and BTFE diluted electrolyte, which is very comparable to or even superior over that of the parent concentrated LiFSI/DME (98.74%).

Figure 24:
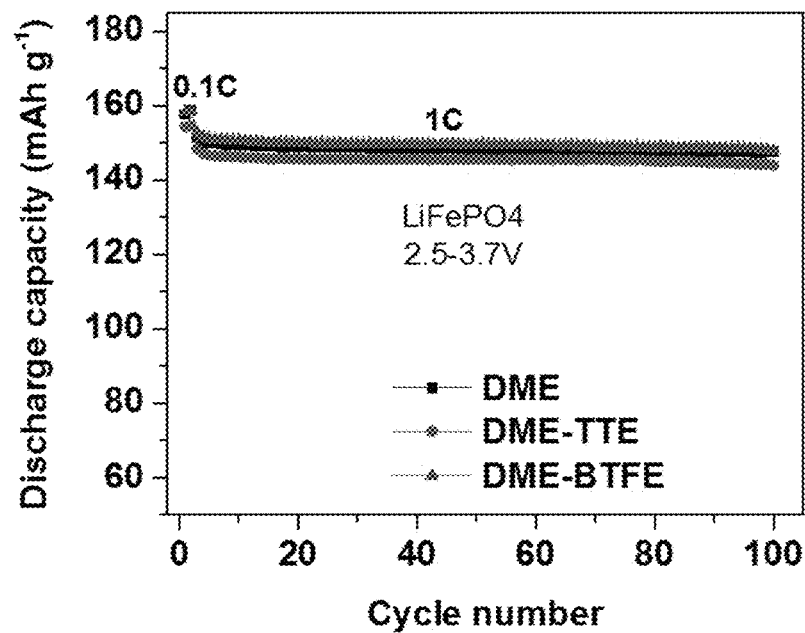
FIG. 24 shows the cycling stability of Li∥LiFePO$_4$ (LFP) cells containing concentrated 4 M LiFSI/DME electrolyte without and with TTE or BTFE diluent at 1C rate after 3 formation cycles at C/10, in the voltage range of 2.5~3.7 V.

The cycling performance for Li||LFP cells containing concentrated 4 M LiFSI/DME electrolyte without and with TTE or BTFE diluent is shown in FIG. 24. The Li||LFP coin cells were assembled using LFP cathode (Hydro-Quebec, 1 mAh cm$^{-2}$), lithium metal anode, one piece of polyethylene (PE) separator, and the concentrated ether based electrolyte before and after dilution. Diluting the concentrated LiFSI/DME electrolyte from 4 M to 2 M, the Li||LFP cells using 2 M LiFSI/(DME+BTFE) electrolyte and 2 M LiFSI/(DME+TTE) electrolyte show similar long-term cycling stability as compared to the cell using parent concentrated 4 M LiFSI/DME electrolyte. Results were obtained at a 1C rate after 3 formation cycles at C/10, in the voltage range of 2.5~3.7 V.

Example 6

Sodium Metal Batteries with NaFSI/DME-TTE and NaFSI-DME-BTFE Electrolytes

The concept of localized superconcentrated electrolytes also works well in sodium metal batteries. The evaluated electrolyte formulations are shown in Table 4. With addition of TTE, the concentration of the 5.2 M NaFSI/DME electrolyte was diluted to 1.5 M.

TABLE 4

Electrolyte number and formulations used this example

| Electrolyte number | Electrolyte formulation | Concentration |
|---|---|---|
| E17 | NaFSI/DME (NaFSI:DME, 1:1, molar ratio) | 5.2 mol L$^{-1}$ |
| E18 | NaFSI/DME + TTE (DME:TTE = 1:0.5, molar ratio) | 3.0 mol L$^{-1}$ |
| E19 | NaFSI/DME + TTE (DME:TTE = 1:1, molar ratio) | 2.3 mol L$^{-1}$ |
| E20 | NaFSI/DME + TTE (DME:TTE = 1:2, molar ratio) | 1.5 mol L$^{-1}$ |

For charge/discharge performance testing, Na||Na$_3$V$_2$(PO$_4$)$_3$ coin cells were constructed in an argon-filled glove box (MBraun, Inc.) using a Na$_3$V$_2$(PO$_4$)$_3$ cathode, Na metal as the anode, glass fiber as the separator, and NaFSI/DME electrolyte with and without TTE diluent. The Na$_3$V$_2$(PO$_4$)$_3$ cathode contains 80% Na$_3$V$_2$(PO$_4$)$_3$, 10% Super P® carbon black (available, e.g., from Fisher Scientific), and 10% PVDF (polyvinylidene fluoride).

Figure 25A:
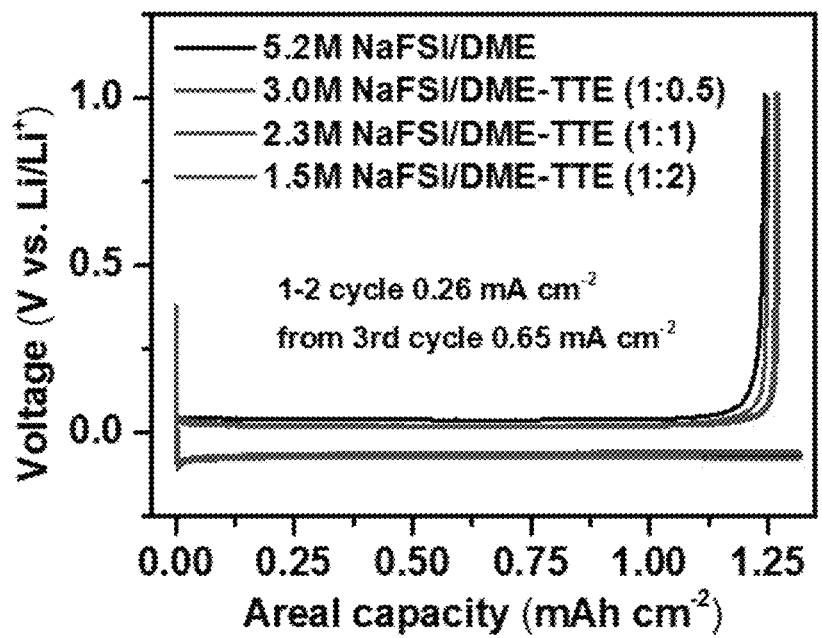
FIGS. 25A and 25B show initial sodium (Na) deposition/stripping voltage profiles (FIG. 25A) and CE of Na∥Cu cells as a function of cycle number tested at 0.65 mA cm$^{-2}$ after 2 formation cycles at 0.26 mA cm$^{-2}$, with Na deposition areal capacity of 1.3 mAh cm$^{-2}$ (FIG. 25B).
Figure 25B:
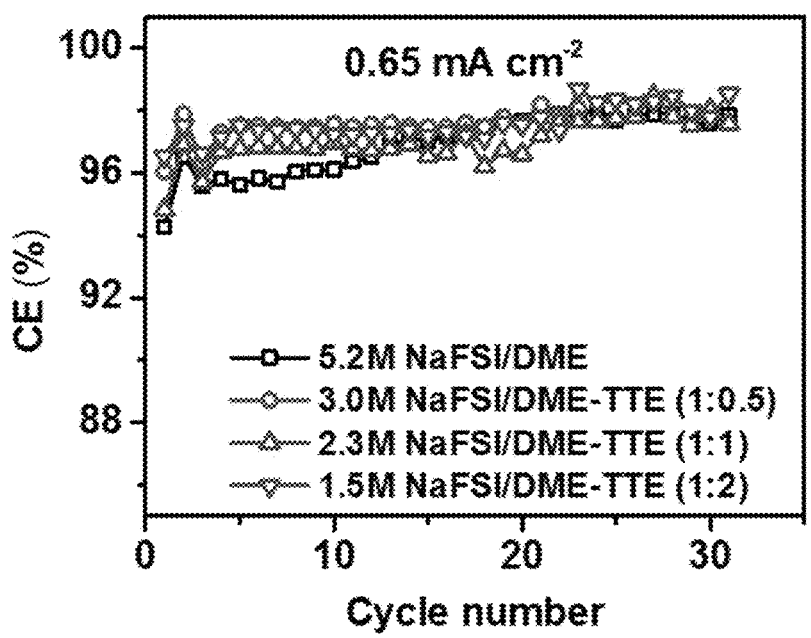

FIGS. 25A and 25B show the initial Na plating/stripping voltage profiles (FIG. 25A) and CE vs. cycle number of Na||Cu cells with Na deposition areal capacity of 1.3 mAh cm$^{-2}$ (FIG. 25B). CE was evaluated as a function of cycle number tested at 0.65 mA cm$^{-2}$ after two formation cycles at 0.26 mA cm$^{-2}$, with Na deposition areal capacity of 1.3 mAh cm$^{-2}$. The initial CEs for NaFSI/DME and NaFSI/DME-TTE electrolytes with 5.2 M, 3.0 M, 2.3 M and 1.5 M NaFSI salt were 94.3%, 96.1%, 94.8% and 96.5%, respectively. During the following cycling, the CEs of the diluted electrolytes were comparable or higher than that of the parent 5.2 M NaFSI/DME electrolyte.

Figure 26A:
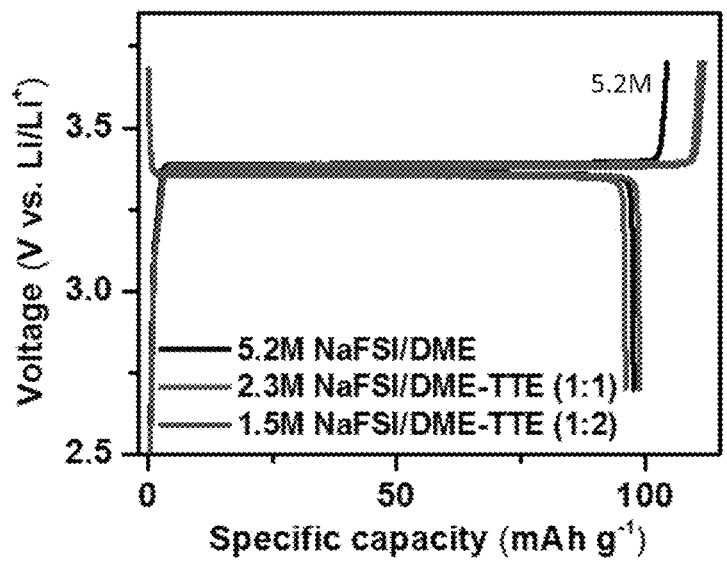
FIGS. 26A and 26B show initial charge/discharge voltage profiles (FIG. 26A) and cycling stability (FIG. 26B) of Na∥Na$_3$V$_2$(PO$_4$)$_3$ cells containing superconcentrated NaFSI/DME electrolyte and certain electrolytes with TTE diluent at C/3.
Figure 26B:
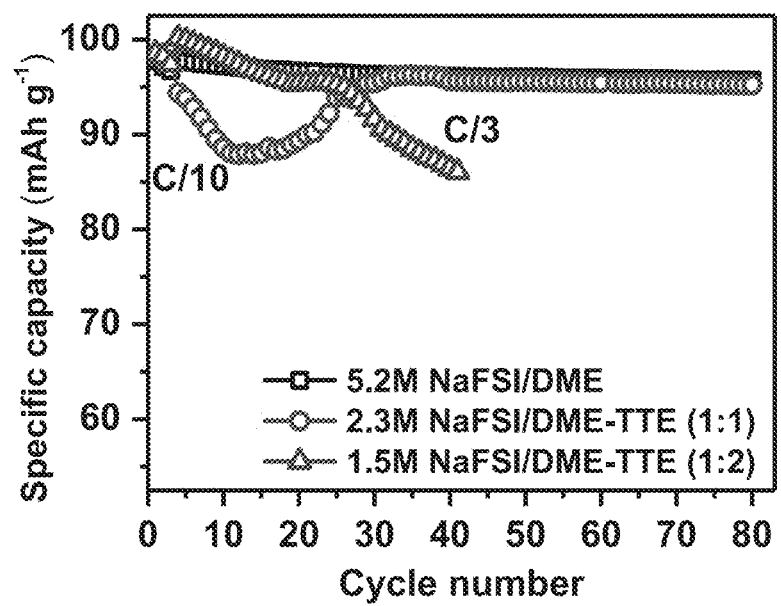
Figure 27A:
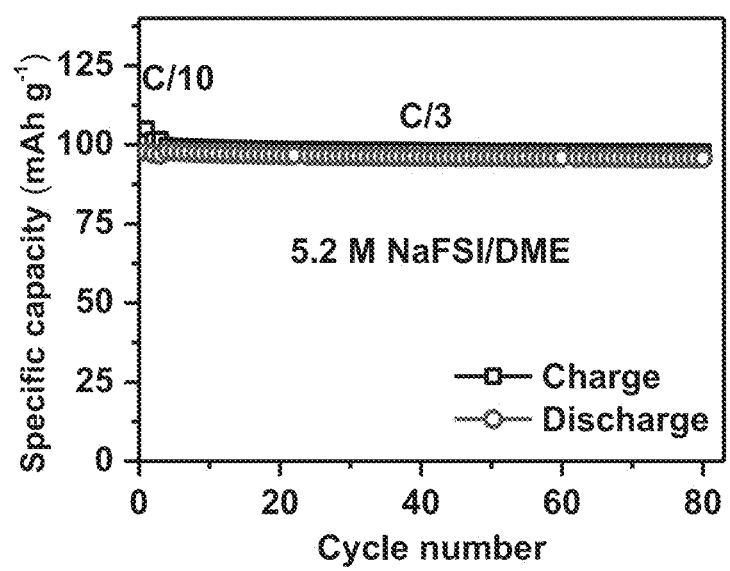
FIGS. 27A and 27B show the charge and discharge capacities of Na∥Na$_3$V$_2$(PO$_4$)$_3$ cells containing 5.2 M NaFSI/DME (FIG. 27A) and 2.3 M NaFSI/DME-TTE (DME:TTE molar ratio 1:1) (FIG. 27B) electrolytes.
Figure 27B:
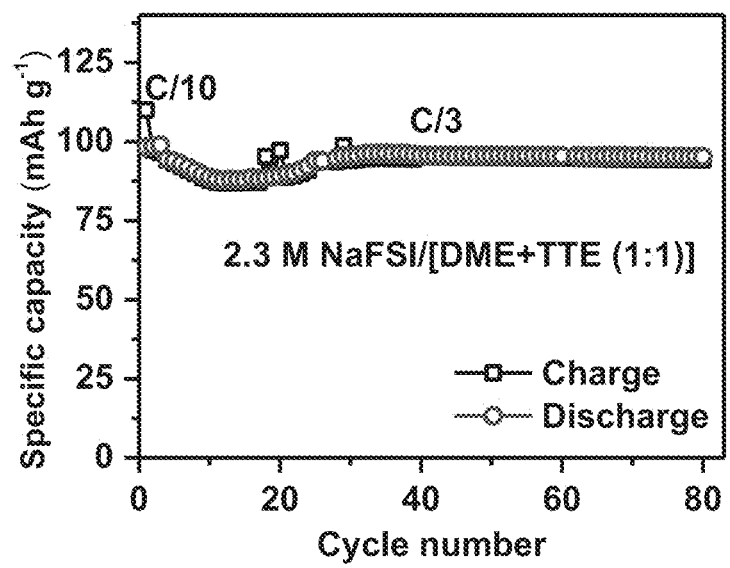

FIGS. 26A, and 26B show the electrochemical performance of Na||Na$_3$V$_2$(PO$_4$)$_3$ cells using concentrated 5.2 M NaFSI/DME electrolyte and TTE-diluted NaFSI/DME-TTE electrolytes (2.3 M and 1.5 M) at a rate of C/3. The cells using TTE diluted NaFSI/DME-TTE electrolytes showed similar initial specific discharge capacity of ca. 97 mAh g$^{-1}$ as compared to concentrated NaFSI/DME electrolyte (FIG. 26B). FIGS. 27A and 27B, respectively, show the charge and discharge capacities of the cells using 5.2 M NaFSI/DME electrolyte and 2.3 M NaFSI/DME-TTE electrolyte.

Figure 28A:
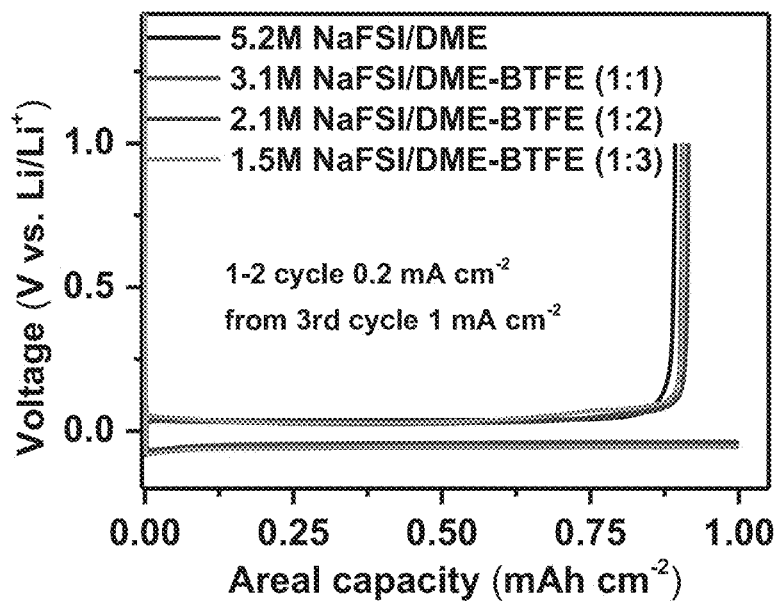
FIGS. 28A and 28B show initial Na deposition/stripping voltage profiles (FIG. 28A) and CE of Na∥Cu cells as a function of cycle number tested at 1 mA cm$^{-2}$ after 2 formation cycles at 0.2 mA cm$^{-2}$, (FIG. 28B) with 5.2 M NaFSI/DME, 3.1 M NaFSI/DME-BTFE (1:1), 2.1 M NaFSI/DME-BTFE (1:2), and 1.5 M NaFSI/DME-BTFE (1:3) electrolytes. The ratios in the parentheses indicate the molar ratios of DME:BTFE in different BTFE diluted electrolyte embodiments.
Figure 28B:
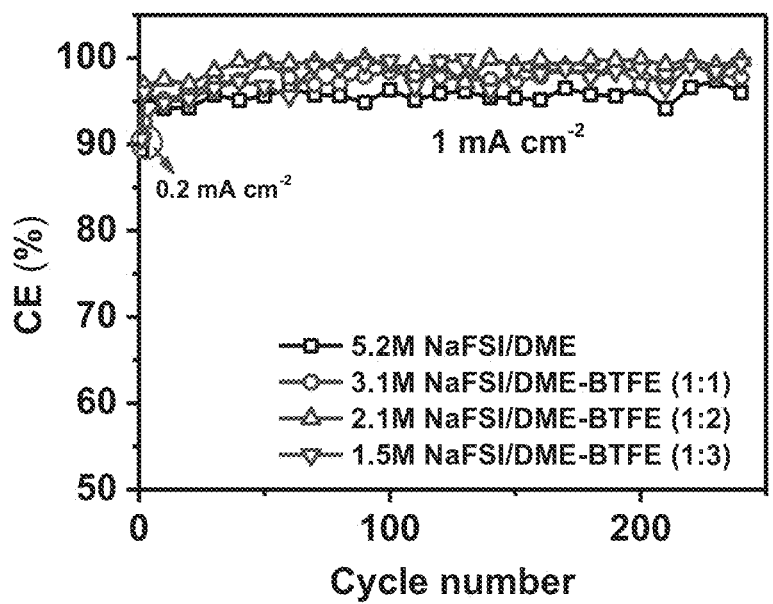

FIGS. 28A and 28B show the initial Na plating/stripping voltage profiles (FIG. 28A) and CE vs. cycle number of Na∥Cu cells with Na deposition areal capacity of 1.0 mAh cm$^{-2}$ (FIG. 28B) with 5.2 M NaFSI/DME, 3.1 M NaFSI/DME-BTFE (1:1), 2.1 M NaFSI/DME-BTFE (1:2), and 1.5 M NaFSI/DME-BTFE (1:3). The ratios in the parentheses are the mole ratios of DME:BTFE. CE was evaluated as a function of cycle number tested at 1 mA cm$^{-2}$ after two formation cycles at 0.2 mA cm$^{-2}$. As shown in FIG. 28B, the LSE, 2.1 M NaFSI/DME-BTFE (1:2), exhibited stable cycling with a CE of nearly 100% over 200+ cycles.

Figure 29A:
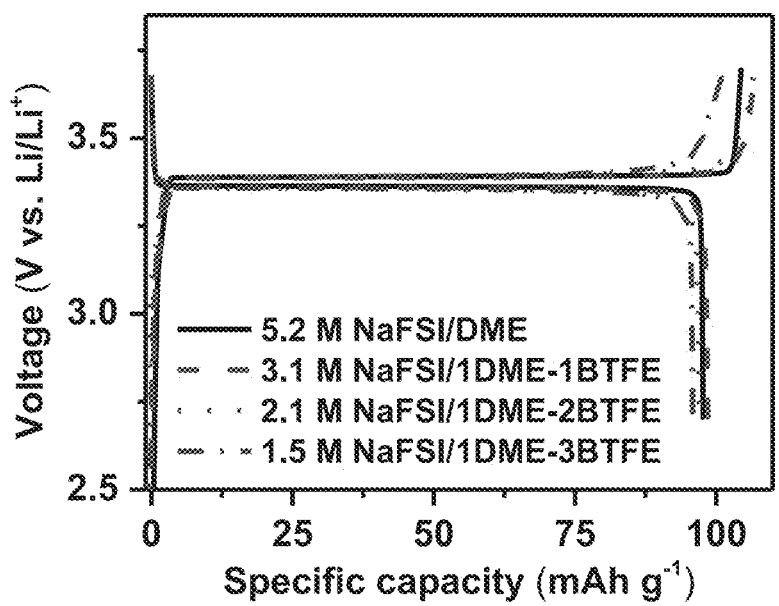
FIGS. 29A-29C show the electrochemical performance of Na∥Na$_3$V$_2$(PO$_4$)$_3$ cells using 5.2 M NaFSI/DME and BTFE-diluted NaFSI/DME-BTFE electrolytes.
Figure 29B:
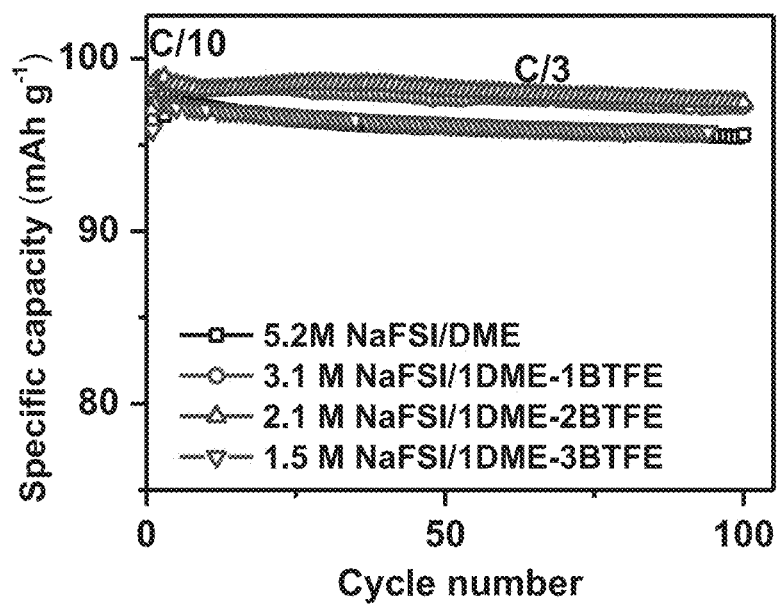
Figure 29C:
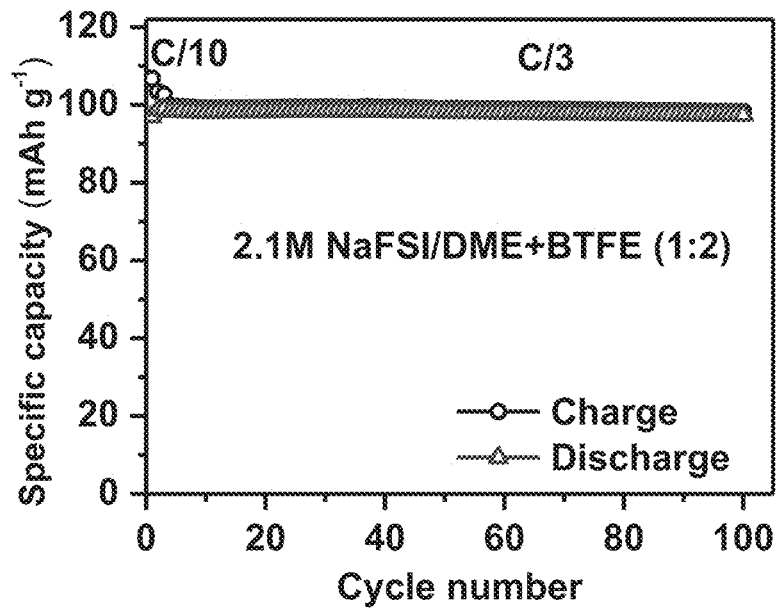

FIGS. 29A-29C show the electrochemical performance of Na∥Na$_3$V$_2$(PO$_4$)$_3$ cells using 5.2 M NaFSI/DME and BTFE-diluted NaFSI/DME-BTFE electrolytes—3.1 M NAFSI/DME-BTFE (1:1), 2.1 M NaFSI/DME-BTFE (1:2), and 1.5 M NaFSI/DME-BTFE (1:3). FIG. 29A shows the initial Na plating/stripping voltage profiles. FIG. 29B shows the cycling stability over 100 cycles at rates of C/10 and C/3. FIG. 29C shows the charge and discharge capacities of 2.1 M NaFSI/DME-BTFE (1:2 mol) over 100 cycles at rates of C/10 and C/3. The results indicate that BTFE is a superior diluent for concentrated NaFSI/DME electrolytes.

Example 7

Li—S Batteries with LiTFSI/DOL-DME-TTE Electrolyte

The concept of localized superconcentrated electrolyte also works well for lithium sulfur batteries. The electrolyte formulations evaluated in this example are shown in Table 5. With addition of TTE, the concentration of 3.3 M LiTFSI in DOL-DME (1:1, v:v) electrolyte was diluted to 1.06 M.

TABLE 5

Electrolyte number and formulations

| Electrolyte number | Electrolyte formulation | Concentration |
| --- | --- | --- |
| E21 | LiTFSI in DOL-DME (1:1, v:v) | 1 mol L$^{-1}$ |
| E22 | LiTFSI in DOL-DME (1:1, v:v) | 3.3 mol L$^{-1}$ |
| E23 | LiTFSI in DOL-DME-TTE (1:1:9, v:v:v) | 1.06 mol L$^{-1}$ |

For charge/discharge performance testing, Li—S coin cells were assembled in an argon-filled glove box (MBraun, Inc.) using a Ketjen black conductive carbon (KB)/S cathode, lithium metal as the anode, one piece of polyethylene as separator, and the LiTFSI/DOL-DME electrolytes with or without TTE diluent. The KB/S cathode was prepared by coating a slurry containing 80% KB/S composite, 10% PVDF and 10% Super P® conductive carbon. The KB/S composite was prepared by mixing 80% S and 20% KB, followed by heat treatment at 155° C. for 12 hrs.

Figure 30A:
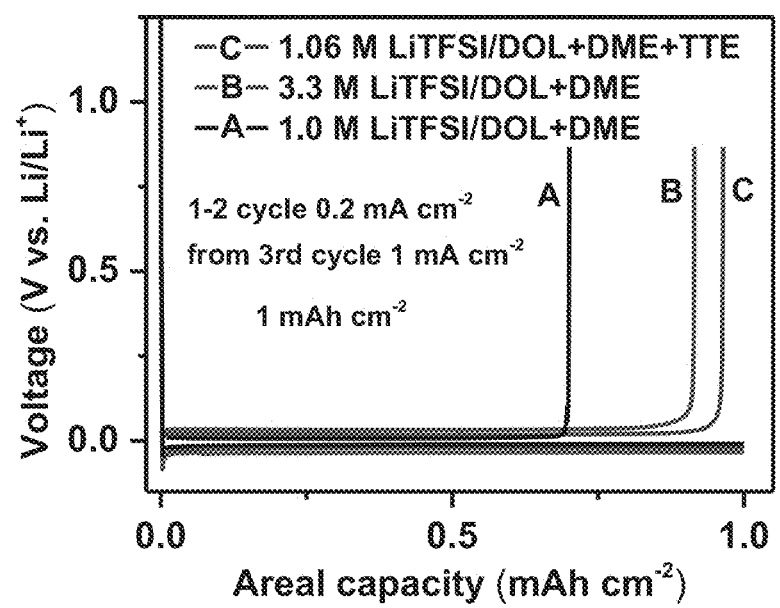
FIGS. 30A and 30B show initial Li deposition/stripping voltage profiles (FIG. 30A) and CE (FIG. 30B) of the Li∥Cu cells as a function of cycle number tested at 1 mA cm$^{-2}$ after 2 formation cycles at 0.2 mA cm$^{-2}$ with Li deposition areal capacity of 1 mAh cm$^{-2}$ using low concentration 1M LiTFSI/DOL-DME, concentrated 3.3M LiTFSI/DOL-DME electrolyte, and an electrolyte comprising 1.06 M LiTFSI/DOL-DME-TTE. (DOL: 1,3-dioxolane)
Figure 30B:
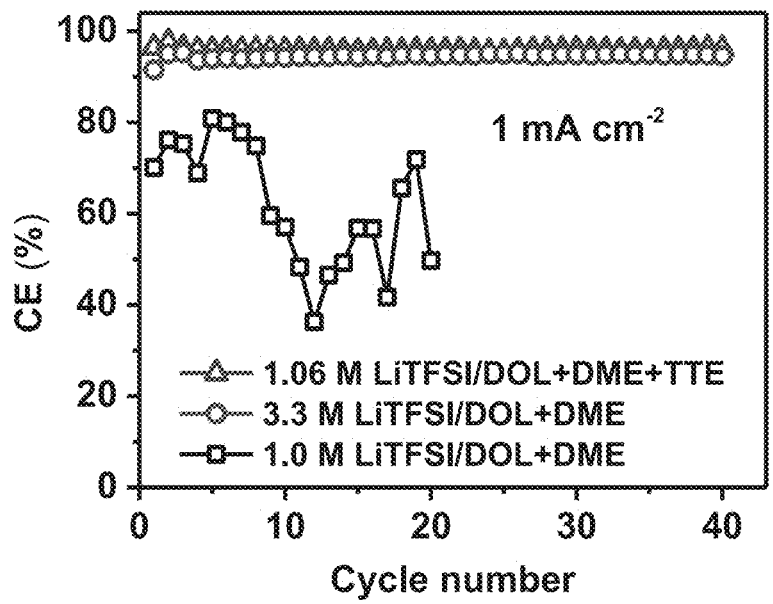

FIGS. 30A and 30B show the initial Li plating/stripping voltage profiles (FIG. 30A) and CE vs. cycle number (FIG. 30B) of Li∥Cu cells with a Li deposition areal capacity of 1 mAh cm$^{-2}$. The results were obtained at 1 mA cm$^{-2}$ after 2 formation cycles at 0.2 mA cm$^{-2}$ with a Li deposition areal capacity of 1 mAh cm$^{-2}$. The superconcentrated 3.3 M LiTFSI/DOL-DME electrolyte showed an initial CE of 91.6%, which was much higher than the 70.1% for the low concentration 1 M LiTFSI/DOL-DME electrolyte. With dilution the 3.3 M LiTFSI/DOL-DME electrolyte with TTE, the localized superconcentrated Li$^+$ solvation structure was maintained and the diluted 1.06 M LiTFSI in DOL-DME-TTE (1:1:9, v:v:v) electrolyte showed a higher CE of 96.4% during the initial plating/stripping process.

Figure 31A:
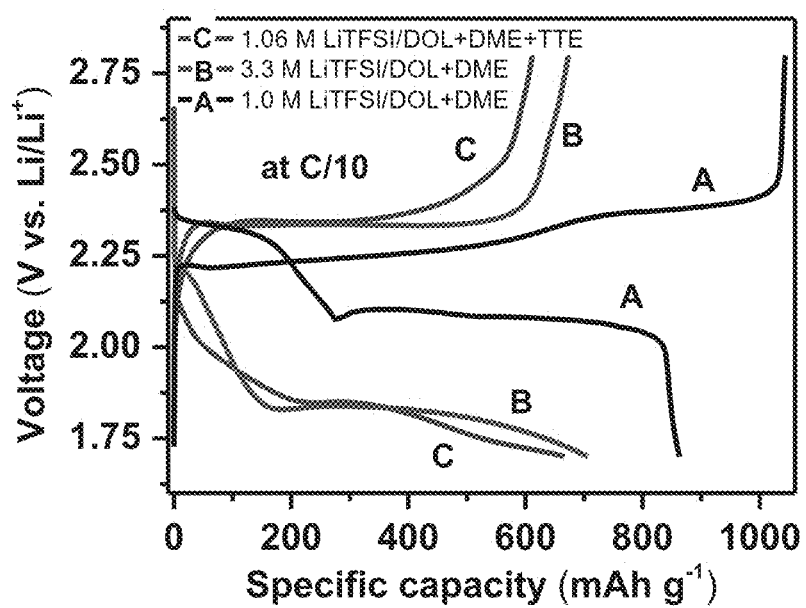
FIGS. 31A-31C show the electrochemical performance of Li-sulfur (S) cells containing low concentration 1M LiTFSI/DOL-DME, concentrated 3.3M LiTFSI/DOL-DME electrolyte and an electrolyte comprising 1.06 M LiTFSI/DOL-DME-TTE.
Figure 31B:
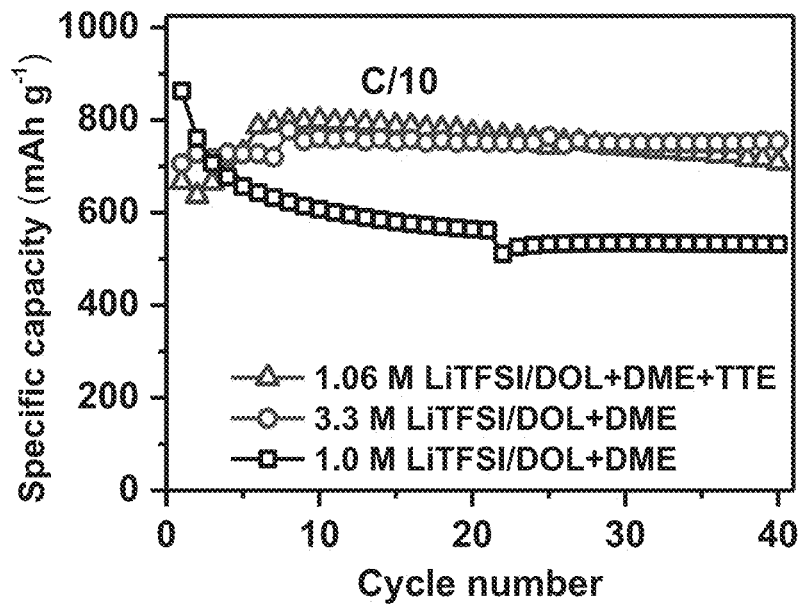
Figure 31C:
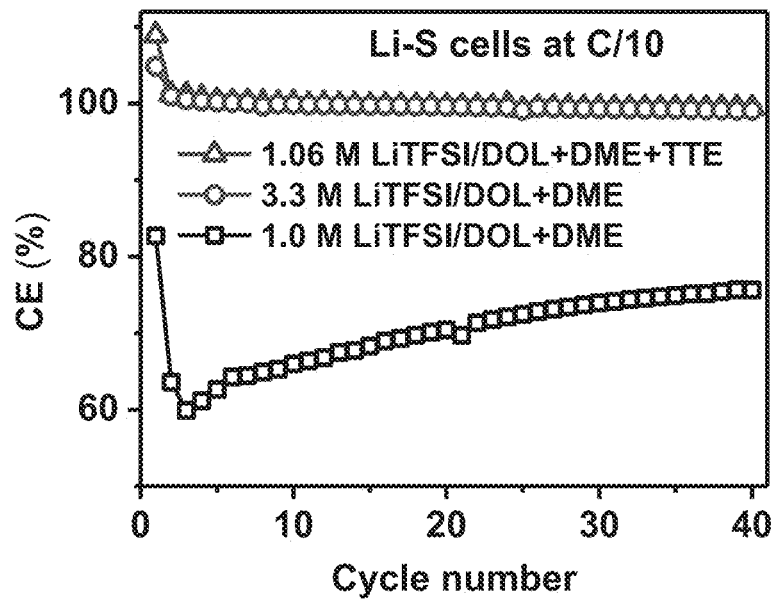

The electrochemical performance for Li—S cells containing regular low concentration 1 M LiTFSI/DOL-DME, concentrated 3.3 M LiTFSI/DOL-DME electrolyte, and diluted 1.06 M LiTFSI in DOL-DME-TTE electrolyte is shown in FIGS. 31A-31C. FIG. 31A shows the initial charge/discharge voltage profiles. In FIG. 31A, curves A were obtained with 1.0 M LiTFSI/DOL-DME, curves B were obtained with 3.3 M LiTFSI/DOL-DME, and curves C were obtained with 1.06 M LiTFSI/DOL-DME-TTE. The Li—S cells with electrolyte/sulfur ratio of 50 mL/g were cycled at a low current rate of C/10 (168 mA/g). Diluting the concentrated LiTFSI/DOL-DME electrolyte from 3.3 M to 1.06 M, the Li—S cells showed even better long-term cycling stability (FIG. 31B) and higher CE (FIG. 31C) as compared to the cell using parent concentrated 3.3M LiTFSI/DOL-DME electrolyte.

Example 8

Li—O$_2$ Batteries with LiTFSI/DMSO-TTE Electrolyte

The concept of localized superconcentrated electrolyte was also investigated in lithium oxygen battery. The electrolyte formulations evaluated are listed in Table 6. With addition of TTE, the concentration of 2.76 M LiTFSI in DMSO (LiTFSI:DMSO molar ratio 1:3) electrolyte was diluted to 1.23 M (LiTFSI:DMSO:TTE molar ratio 1:3:3).

TABLE 6

Electrolyte number and formulations

| Electrolyte number | Electrolyte denotation | Molar ratio of salt to solvent (LiTFSI:DMSO:TTE) | Concentration (mol/L) |
| --- | --- | --- | --- |
| E24 | LiTFSI-12DMSO | 1:12 | 1M |
| E25 | LiTFSI-3DMSO | 1:3 | 2.76M |
| E26 | LiTFSI-3DMSO-3TTE | 1:3:3 | 1.23M |

Figure 32:
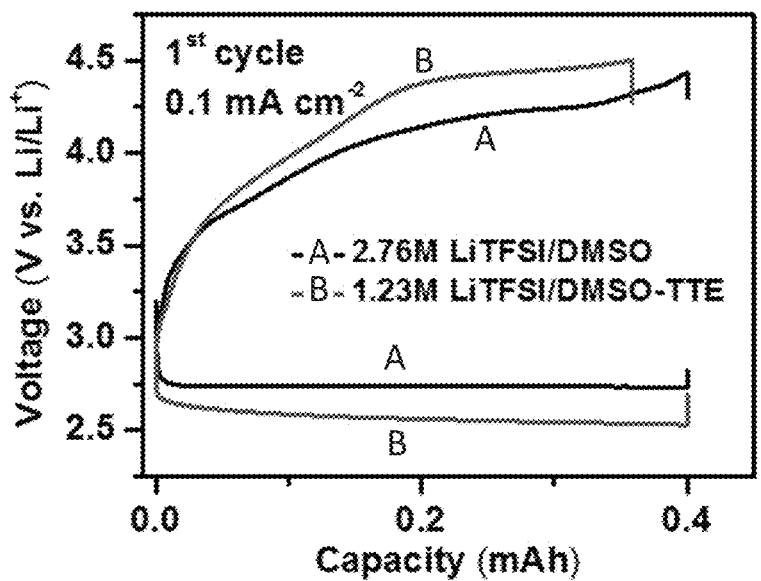
FIG. 32 shows charge/discharge profiles of Li—O$_2$ cells using LiTFSI-3DMSO (dimethyl sulfoxide) (2.76 M) and LiTFSI-3DMSO-3TTE (1.23 M) electrolytes with limited discharge capacity of 600 mAh g$^{-1}$ at a current density of 0.1 mA cm$^{-2}$.

FIG. 32 shows the charge/discharge profiles of Li—O$_2$ cells using LiTFSI-3DMSO (2.76 M) and LiTFSI-3DMSO-3TTE (1.23 M) electrolytes with limited discharge capacity of 600 mAh g$^{-1}$ at a current density of 0.1 mA cm$^{-2}$. After dilution of LiTFSI concentration from 2.76 M to 1.23 M, the Li—O$_2$ cells demonstrated similar capacity as those observed in the Li—O$_2$ cells using the highly concentrated electrolyte. For charge/discharge performance testing, Li—O$_2$ coin cells were assembled in the argon-filled glove box (MBraun, Inc.). A piece of separator (Whatman glass fiber B) soaked with 200 μL of LiTFSI-DMSO electrolyte with and without TTE diluent was placed between an air electrode disc and a Li metal chip. After crimping, the assembled cells were transferred into PTFE (polytetrafluoroethylene) containers and taken out of the glove box. The PTFE containers were filled with ultrahigh purity O$_2$. These Li—O$_2$ cells were allowed to rest for at least 6 h in O$_2$ atmosphere and then discharge/charge evaluations were performed at room temperature on an Arbin BT-2000 battery tester (Arbin Instruments, College Stations, Tex.) at a current density of 0.1 mA cm$^{-2}$.

Example 9

Aqueous Electrolytes with Bridge Solvents

Water based electrolytes with superconcentrated lithium salt LiTFSI (e.g., 21 mol LiTFSI in 1 kg of H$_2$O) have been reported to widen their electrochemical stability window to about 3.0 V (i.e. 1.9~4.9 vs. Li/Li$^+$). As demonstrated in the above examples, diluting this concentrated water based electrolyte while maintaining the wide electrochemical stability window could be a good strategy to reduce the cost of the electrolyte. However, the fluoroalkyl ethers having low dielectric constants and low donor numbers are not miscible with water. Therefore, the superconcentrated aqueous electrolyte (21 mol LiTFSI in 1 kg of H$_2$O) was diluted with TTE with the assistance of a 'bridge' solvent. The evaluated electrolyte formulations are shown in Tables 7 and 8. The 'bridge' solvents included DMC, PC, AN, and DMSO. By fixing the ratio of H$_2$O:TTE to be 1:1, the optimal content of 'bridge' solvent was carefully optimized. The optimal content is different for different solvents, depending on the strength of the interaction between 'bridge' solvent and H$_2$O and TTE diluent.

TABLE 7

Electrolyte number and formulations

| Electrolyte number | H$_2$O-solvent-TTE wt. ratio | m (mol/kg) | M (mol/L) |
|---|---|---|---|
| E27 | H$_2$O | 1 | 21 | 5.04 |
| E28 | H$_2$O-DMC-TTE | 1:0.85:1 | 7.37 | 3.78 |
| E29 | H$_2$O-PC-TTE | 1:1.05:1 | 6.89 | 3.69 |
| E30 | H$_2$O-AN-TTE | 1:0.5:1 | 8.4 | 3.87 |
| E31 | H$_2$O-DMSO-TTE | 1:1.15:1 | 6.67 | 3.69 |

Figure 33:
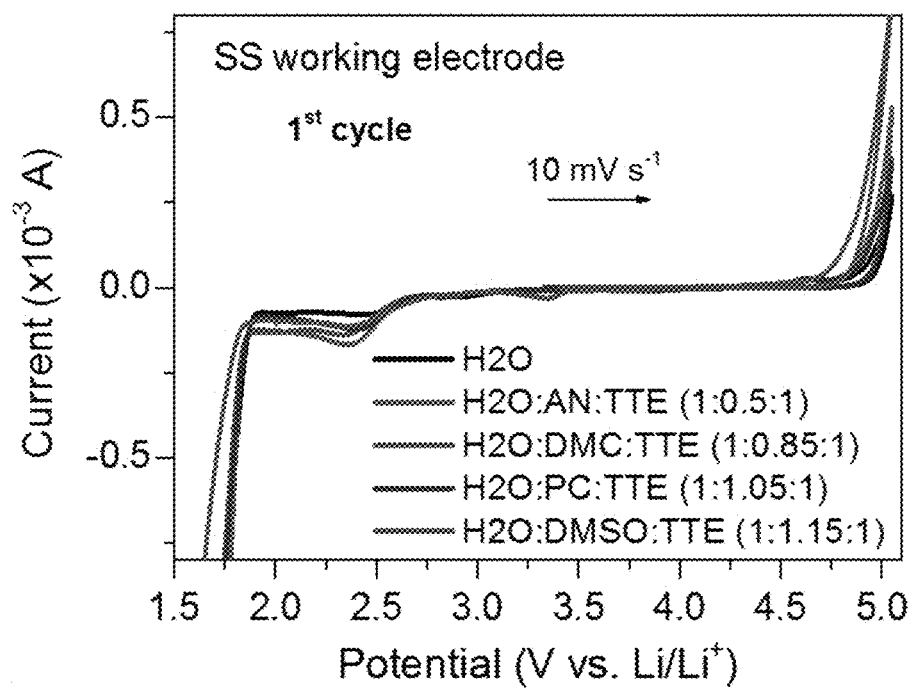
FIG. 33 shows cyclic voltammograms of concentrated aqueous electrolyte before and after dilution with TTE with the assistance of different 'bridge' solvents (acetonitrile (AN), DMC, PC, and DMSO), using a stainless steel working electrode and counter electrode, and Ag/AgCl as reference electrode at a scan rate of 10 mV s$^{-1}$. The potential was converted to those versus to Li/Li$^+$ redox couple.

FIG. 33 shows the cyclic voltammograms of concentrated aqueous electrolyte before and after dilution with TTE with the assistance of different 'bridge' solvents, including DMC, PC, AN, and DMSO, using a stainless steel working electrode and counter electrode, and Ag/AgCl as reference electrode at a scan rate of 10 mV s$^{-1}$. The potential was converted to those versus to Li/Li$^+$ redox couple. In comparison, it was found that the dilution with TTE using PC as the 'bridge' solvent did not compromise much of the oxidation and reduction stability. However, with a H$_2$O:TTE ratio of 1:1, the concentration of the LiTFSI/H$_2$O solution was only diluted from 5.04 M to 3.69 M.

To further dilute the concentrated LiTFSI/H$_2$O solution, more TTE was used with the addition of increased PC as 'bridge' solvent. The ratio between PC:TTE was very close to 1:1 in diluted electrolytes. With the increased addition of PC and TTE, the concentration of the concentrated LiTFSI/H$_2$O solution was diluted from 5.04 M to 2.92 M.

TABLE 8

Electrolyte number and formulations

| Electrolyte number | H$_2$O-solvent-TTE wt. ratio | m (mol/kg) | M (mol/L) |
|---|---|---|---|
| E32 | H$_2$O | 1 | 21 | 5.04 |
| E33 | H$_2$O-PC-TTE | 1:0.55:0.5 | 10.3 | 4.30 |
| E34 | H$_2$O-PC-TTE | 1:1.05:1 | 6.89 | 3.69 |
| E35 | H$_2$O-PC-TTE | 1:1.5:1.5 | 5.25 | 3.27 |
| E36 | H$_2$O-PC-TTE | 1:2:2 | 4.29 | 2.92 |

Figure 34A:
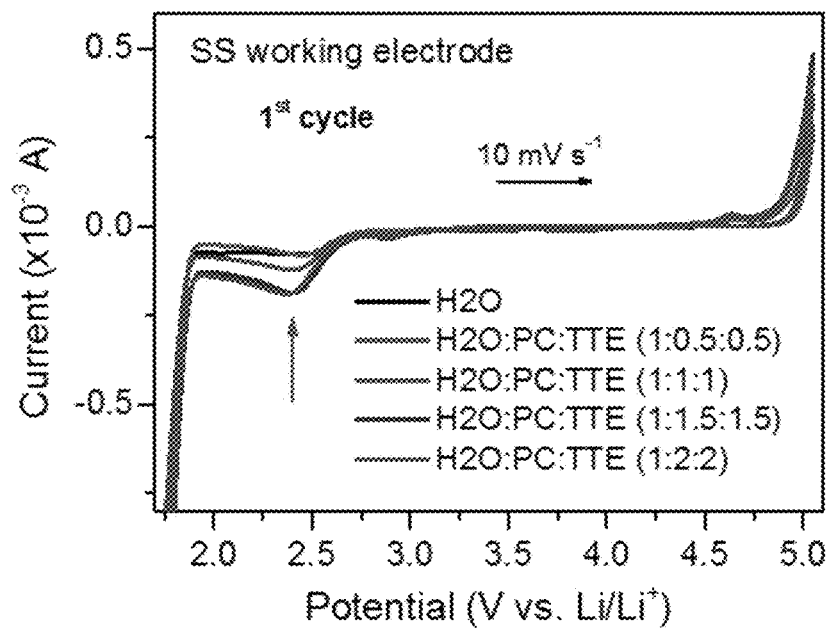
FIGS. 34A and 34B, respectively, show first cycle and second cycle cyclic voltammograms of concentrated aqueous electrolyte diluted with different amounts of TTE with the assistance of PC. Stainless steel was the working electrode and counter electrode, and Ag/AgCl was the reference electrode. Scan rate of 10 mV s$^{-1}$. The potential was converted to those versus to Li/Li$^+$ redox couple.
Figure 34B:
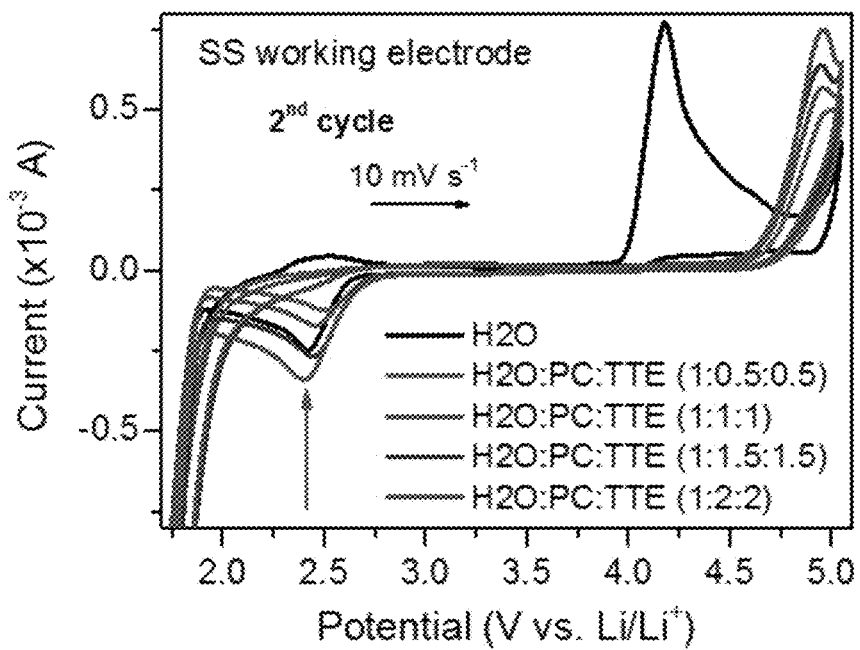

FIGS. 34A and 34B show the first and second cycle cyclic voltammograms, respectively, of concentrated aqueous electrolyte diluted with different amounts of TTE with the assistance of PC. Stainless steel was the working electrode and counter electrode, and Ag/AgCl was the reference electrode; scan rate of 10 mV s$^{-1}$. The potential was converted to those versus to Li/Li$^+$ redox couple. In the first cycle (FIG. 34A), the increased addition of PC-TTE leads to a slight increase in the reduction instability at ~2.35V (arrow), as reflected by the higher current response during the negative scan. However, dilution of an appropriate amount of PC-TTE improves the reduction stability and oxidation stability, probably due to the formation of an enhanced SEI layer on the working electrode (FIG. 34B). The optimum dilution of the concentrated electrolyte is identified as H$_2$O:PC:TTE ratio of 1:1.5:1.5.

Molecular Simulations

Without wishing to be bound by a particular theory of operation, the exceptional electrochemical performances of LMBs achieved in the BTFE diluted LiFSI/DMC-BTFE electrolytes is believed to stem from its unique highly localized superconcentrated Li salt solvation structure. First-principles density functional theory (DFT) and ab initio molecular dynamics (AIMD) simulations were used to characterize the DMC-LiFSI solvation structure in localized superconcentrated electrolyte. All calculations were performed using the Vienna ab Initio Simulation Package (VASP) (Kresse et al., *Phys Rev B* 1996, 54:11169-11186; Kresse et al., *Phys Rev* 81993, 47:558-561; Kresse et al., *Phys Rev* 81994, 49:14251-14269). Electron-ion interactions were described by the projector-augmented wave (PAW) pseudopotentials with the cutoff energy of 400 eV (Blochl, *Phys Rev B* 1994, 50:17953-17979; Kresse et al., *Phys Rev B* 1999, 59:1758-1775). The exchange-correlation functional was represented using the Perdew-Burke-Ernzerhof generalized gradient approximation (GGA-PBE) (Perdew et al., *Phys Rev Lett* 1996, 77:3865-3868). The exchange-correlation functional with a Gaussian smearing width term of 0.05 eV was used in the calculations of electrolytes and LiFSI salt interacting with Li metal anode surface systems. The Monkhorst-Pack k-point mesh grid scheme (4×4×1) was used to obtain the optimized Li anode surface and adsorption of electrolyte and salt molecules in the ground state. The convergence criteria for electronic self-consistent iteration and ionic relaxation were set to 1×10$^{-5}$ eV and 1×10$^{-4}$ eV, respectively. AIMD simulations of electrolyte-salt mixtures were performed in the canonical (NVT) ensemble at 303 K. The constant temperature of AIMD simulation systems was controlled using the Nose thermostat method with a Nose-mass parameter of 0.5. The time step of 0.5 fs was used in all AIMD simulations. A Monkhorst-Pack k-point mesh grid scheme (2×2×2) was used in AIMD simulations. The total AIMD simulation time for each electrolyte/salt system was 15 ps. The AIMD trajectory of final 5 ps was used to obtain radial distribution functions of Li—O pairs.

Figure 35:
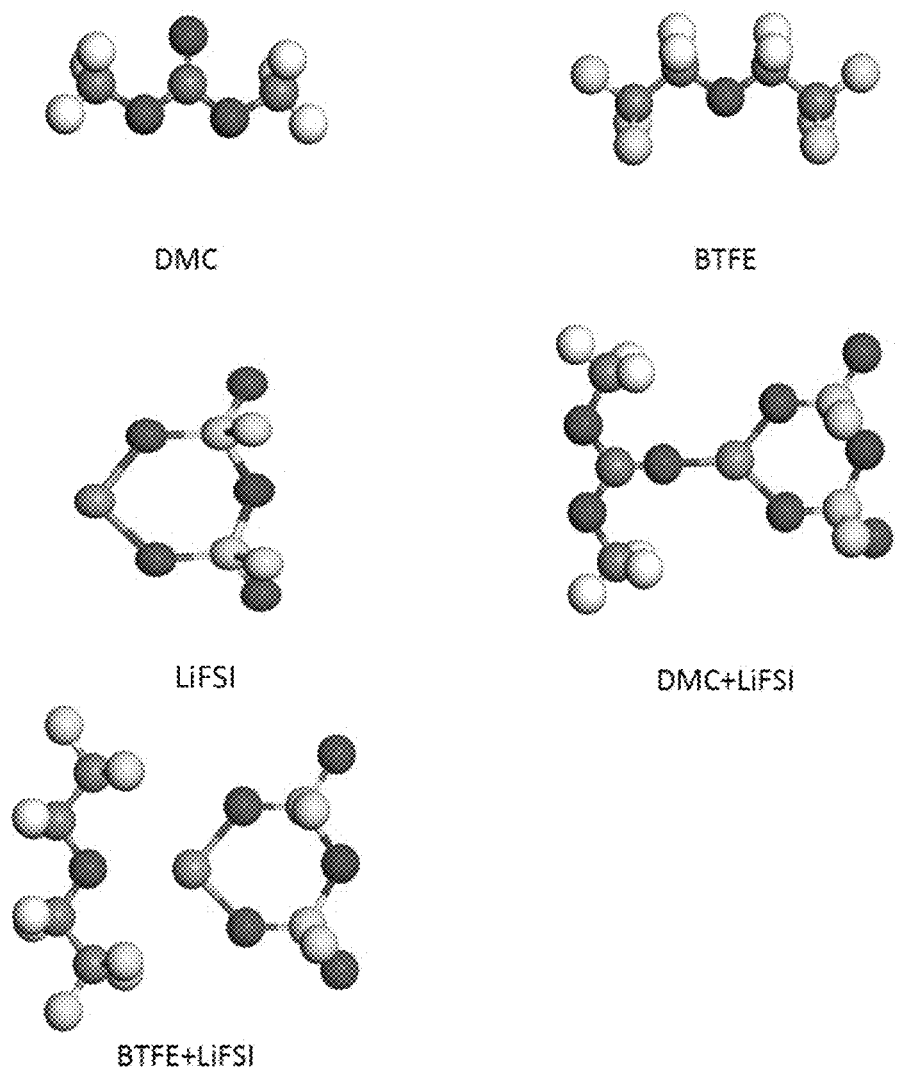
FIG. 35 shows optimized molecular structures of DMC and BTFE solvent molecules, LiFSI salt, and DMC+LiFSI and BTFE+LiFSI solvent-salt pairs. The Li, O, C, H, S, N, and F atoms are colored as magenta, red, gray, white, yellow, blue, and light blue, respectively.

FIG. 35 shows the optimized geometries of DMC, BTFE, LiFSI, and pairs of DMC/LiFSI, BTFE/LiFSI in vacuum using VASP. The Li, O, C, H, S, N, and F atoms are colored as magenta, red, gray, white, yellow, blue, and light blue, respectively. Only r-centered k-point mesh was used for above calculations. Similar results were also obtained using the Gaussian 09 package with PBE and the 6-311++G(p,d) basis set (Frisch et al., *Gaussian* 09, 2009, Gaussian Inc., Wallingford, Conn.), Table 10. It was found that LiFSI salt is preferentially coordinated with DMC via the Li—O$_{DMC}$ bond, with an optimized Li—O$_{DMC}$ bond length of 1.85 Å and strong interaction between LiFSI and DMC (−88.7 kJ/mol). On the other hand, the interaction between LiFSI and another electrolyte solvent BTFE is comparatively weak as reflected by the Li—O$_{BTFE}$ bond distance of 2.70 Å, which is much longer than the optimized Li—O$_{DMC}$ bond, and much weaker interaction of −41.4 kJ/mol between LiFSI and BTFE.

As suggested by previous theoretical work of Li bulk and surfaces (Camacho-Forero et al., *J Phys Chem C* 2015, 119:26828-26839; Doll et al., *J Phys Condens Matter* 1999, 11:5007-5019), the most stable (100) surface among three low index surface structures, i.e., (100), (110), and (111) crystallographic planes, was used to model the Li anode surface. The periodic Li(100) surface has a p(4×4) super cell with seven atomic Li layers. The optimized structures of DMC, BTFE, LiFSI and the DMC/LiFSI pair on the Li(100) surface are shown in FIGS. 36A-36F.

Bader charge analyses (Henkelman et al., *Comput. Mater. Sci.* 2006, 36:354-360) were performed to obtain the possible charge transfer between the electrolytes and the salt species upon adsorption. DFT calculated adsorption energies and Bader charges of each species were summarized in Table 9. Compared with DMC, LiFSI and the DMC/LiFSI pair, the interaction between BTFE and the Li anode surface is very weak and barely reductive. This indicates that BTFE molecule is nearly inert and barely being reduced. While DMC and the DMC/LiFSI pair are slightly reduced by obtaining the fractional charges of −0.19 and −0.40|e|, respectively, implying that both are reduced thus leading to possible decomposition. In summary, BTFE is found to be more stable than DMC and the DMC/LiFSI pair on the Li anode.

Figure 37B:
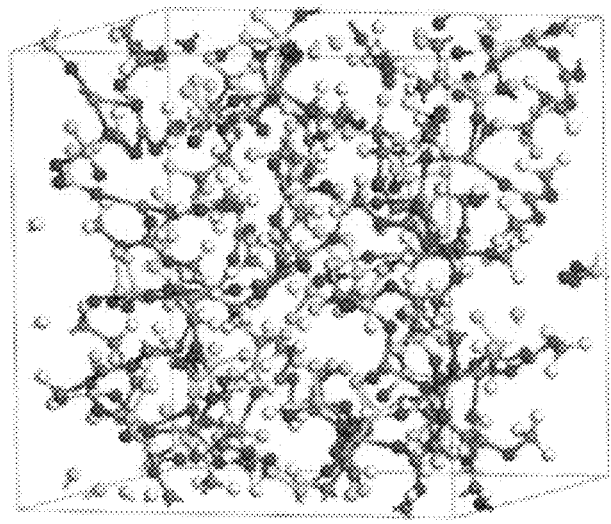
Figure 37C:
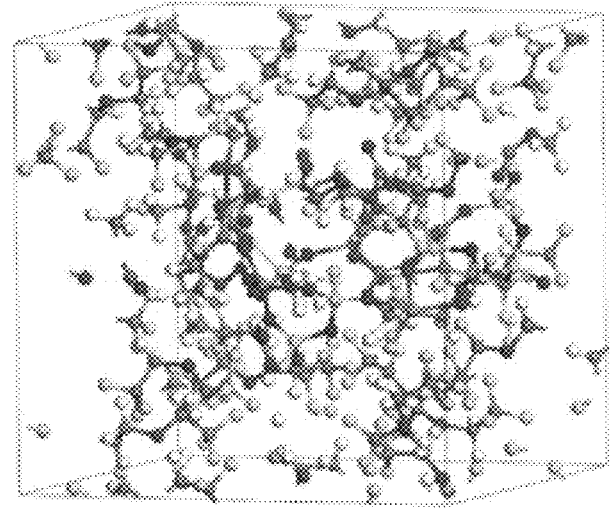
Figure 38:
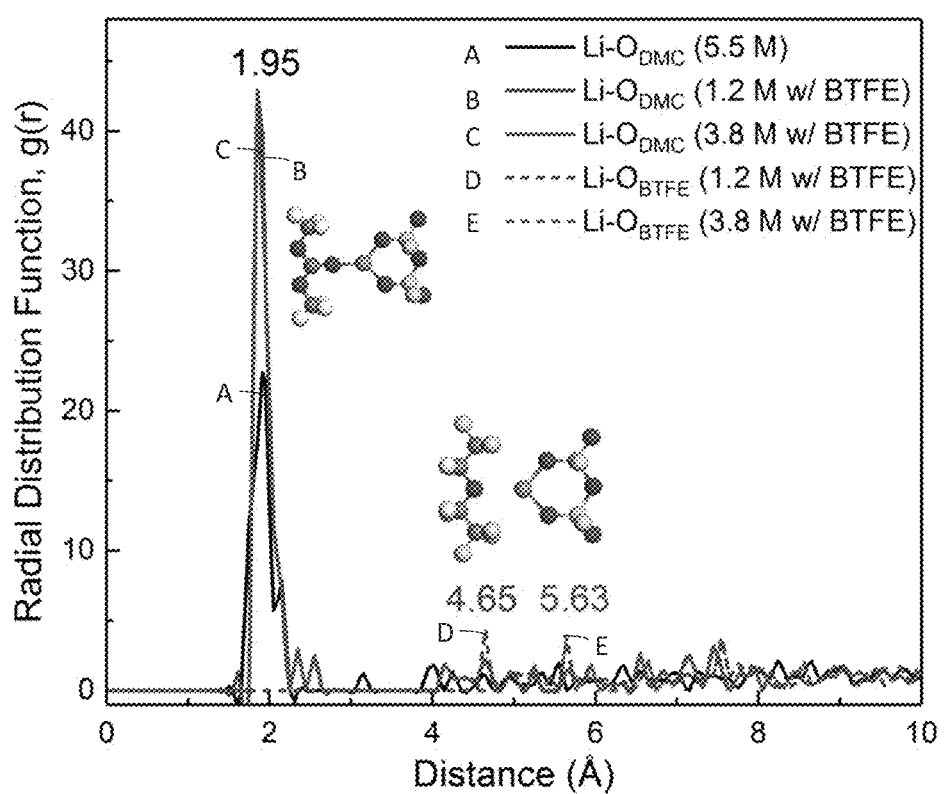
FIG. 38 is a graph of the radial distribution functions of Li—O$_{DMC}$ and Li—O$_{BTFE}$ pairs calculated from AIMD simulation trajectories at 303 K.

To understand the effect of adding the second electrolyte solvent BTFE on the microscopic structures of DMC/LiFSI mixtures, three electrolyte/salt mixture systems, i.e., one binary DMC/LiFSI mixture and two ternary DMC/BTFE/LiFSI mixtures with two different molar ratios, were investigated using AIMD simulations. The initial structure of each liquid electrolyte/salt mixture system was set up by randomly placing the numbers of DMC, BTFE and LiFSI molecules on the basis of experimental densities and molar ratios (concentration). The size of simulation system is 20 Å×20 Å×20 Å. These initial structures were firstly relaxed using a house-made classical molecular dynamics simulation method with the flexible force field (Han et al., *J. Electrochem. Soc.* 2014, 161:A2042-2053; Soetens et al., *J. Phys. Chem. A* 1998, 102:1055-1061). Upon quasi-equilibration of the system, a total of 15 ps AIMD simulations were carried out for each mixture system. The snapshots of three electrolyte/salt mixture systems from AIMD summations are shown in FIGS. 37A-37C. FIG. 38 shows the radial distribution functions of Li—O$_{DMC}$ and Li—O$_{BTFE}$ pairs calculated from AIMD simulation trajectories at 303 K. It is clearly seen from the snapshots (FIGS. 37A-37C) of the three electrolyte/salt mixture systems and the radial distribution functions of Li—O$_{DMC}$ and Li—O$_{BTFE}$ pairs (FIG. 38) that all LiFSI salt molecules are closely coordinated with DMC instead of BTFE. The last 5 ps AIMD simulation trajectories were used to calculate the radial distribution functions of Li—O$_{DMC}$ and Li—O$_{BTFE}$ pairs. As shown in FIG. 38, a sharp peak of the Li—O$_{DMC}$ pair is identified at 1.95 Å for all three studied systems, indicating that all LiFSI salts are surrounded by DMC solvent molecules as the first coordination shell. This is due to the strong attractive interaction between DMC and LiFSI. Two small peaks of the Li—O$_{BTFE}$ pair at 4.65 and 5.63 Å are found for two ternary mixture systems with high and low BTFE concentrations. This suggests that BTFE is not coordinated to LiFSI in the two DMC/BTFE/LiFSI mixtures, clearly indicative of the existence of the localized superconcentration of DMC/LiFSI pairs, independent of the concentration of the BTFE diluent molecules.

Figure 39A:
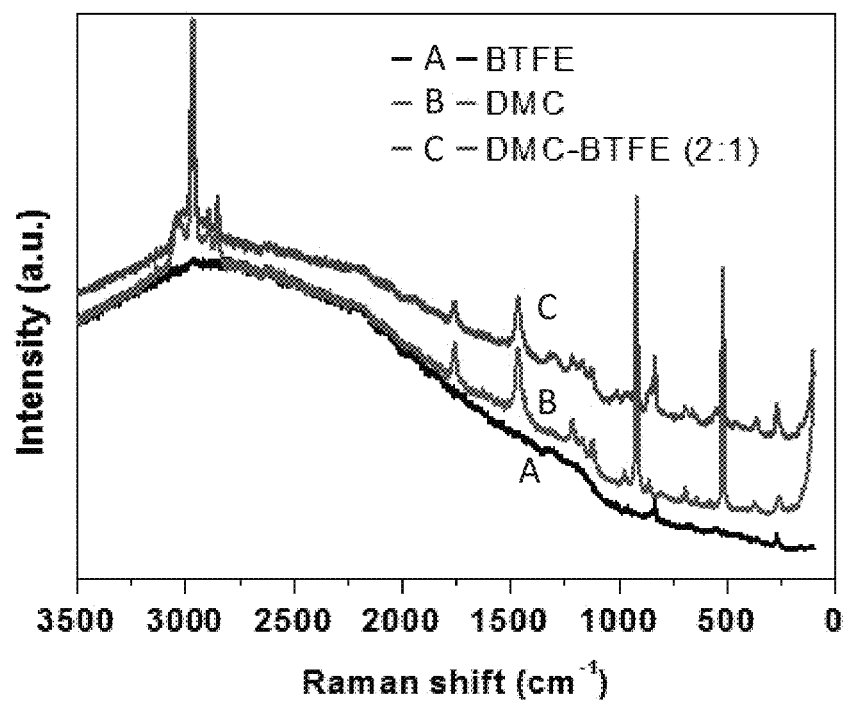
FIGS. 39A and 39B are Raman spectra of pure DMC solvent, pure BTFE solvent, and solvent mixture of DMC-BTFE (2:1)
Figure 39B:
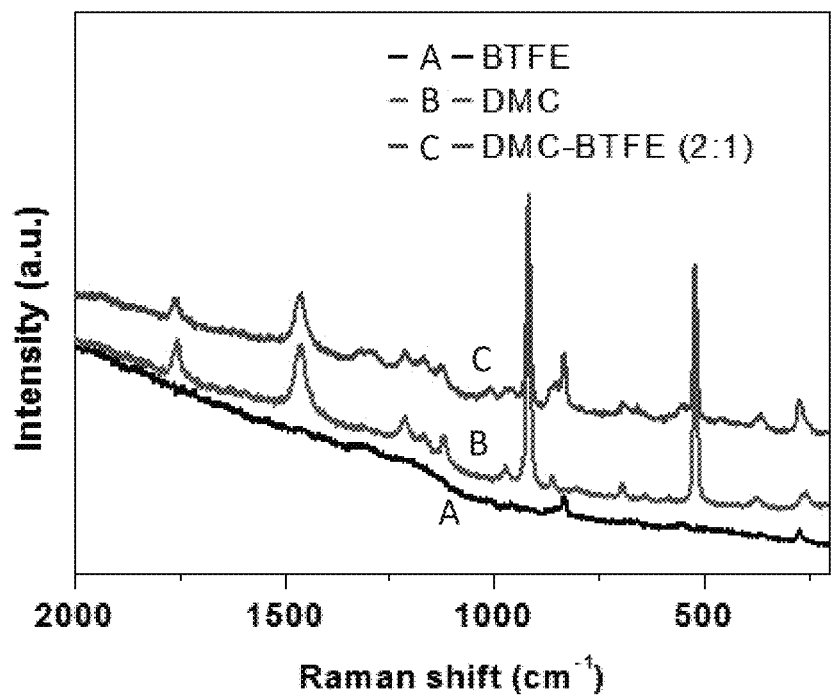

Raman spectroscopy and NMR spectroscopy were employed to investigate the solvation structures of concentrated LiFSI/DMC electrolyte and BTFE diluted LiFSI/DMC-BTFE electrolytes. FIGS. 39A and 39B show Raman spectra of pure DMC, BTFE, and a DMC-BTFE (2:1) solvent mixture. There is no observable Raman shift in the peak locations of DMC and BTFE in the mixture of DMC and BTFE. This result indicates that there is no significant interaction between DMC and BTFE.

Figure 40A:
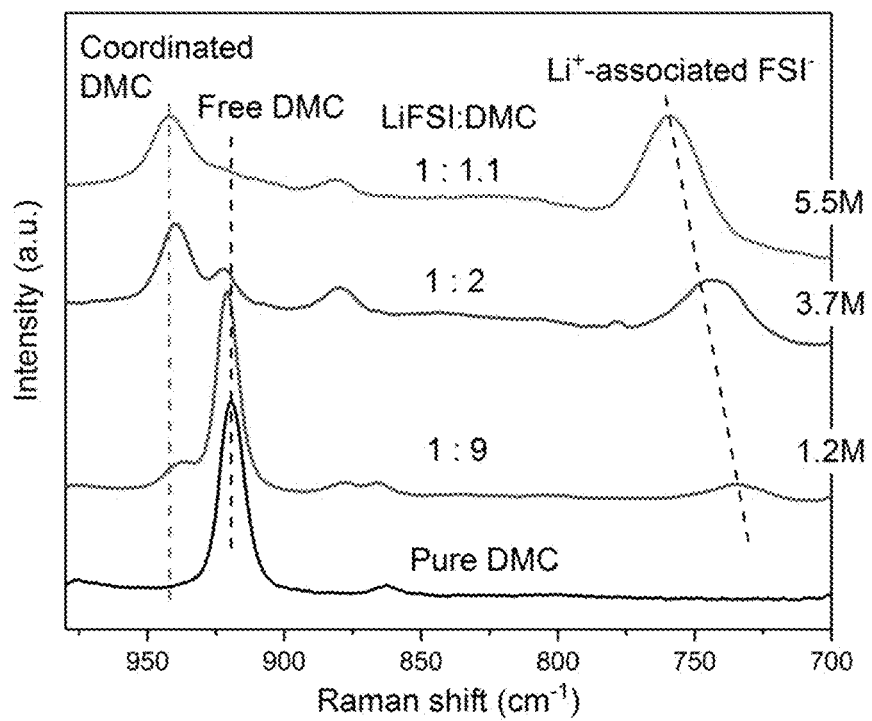
FIGS. 40A and 40B are Raman spectra of different concentrations of LiFSI/DMC solutions (FIG. 40A) and different concentrations of BTFE diluted LiFSI/DMC-BTFE solutions (FIG. 40B).
Figure 40B:
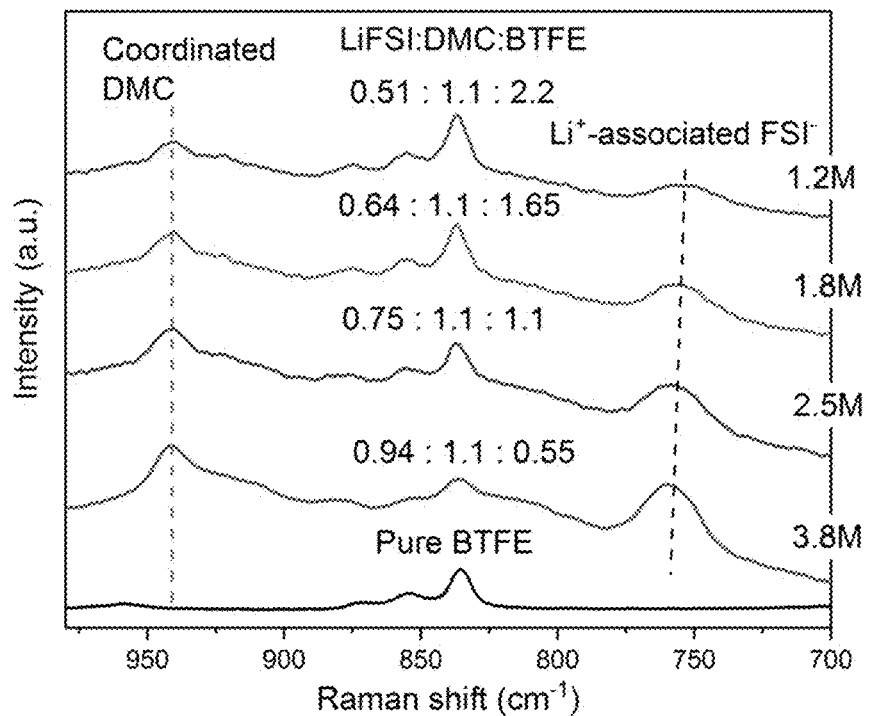

In the Raman spectra of different concentrations of LiFSI/DMC solutions, as presented in FIG. 40A, the dilute LiFSI/DMC (1:9) solution is featured by the dominating O—CH$_3$ stretching vibration band at ~920 cm$^{-1}$ for free DMC solvent molecules and the minor vibration band at ~940 cm$^{-1}$ for Li$^+$-coordinated DMC. As the LiFSI concentration is increased (higher LiFSI:DMC molar ratio), the free DMC diminishes and disappears to form the contact ion pairs (CIPs, FSI$^-$ coordinating to single Li$^+$ ion) and aggregates (AGGs, FSI$^-$ coordinating to two or more Li$^+$ ions). Formation of CIPs and AGGs in concentrated 5.5 M LiFSI/DMC is also proved by the obvious upshift of the FSI$^-$ Raman band at 710~780 cm$^{-1}$. FIG. 40B shows the Raman spectra of different concentrations of BTFE diluted LiFSI/DMC solutions. With dilution by BTFE, it is found that the Li$^+$-coordinated DMC solvation structure is well preserved, without any shift of the vibration band at ~940 cm$^{-1}$ being observed. Moreover, the vibration band of BTFE at 830~840 cm$^{-1}$ does not change in different LiFSI/DMC-BTFE solutions. The result suggests that the diluent BTFE is not involved in the solvation of Li$^+$ cation because of its low dielectric constant and low donor number, confirming the LSE solvation structures. One feature of note is that the dilution with BTFE weakens slightly the association between the Li$^+$ cation and FSI-anion, as evidenced by the downshift of the FSI$^-$ Raman band (710~780 cm$^{-1}$), which would be beneficial for enhancing the Li$^+$ ion diffusion and improving the kinetic properties of the LMBs.

Figure 41:
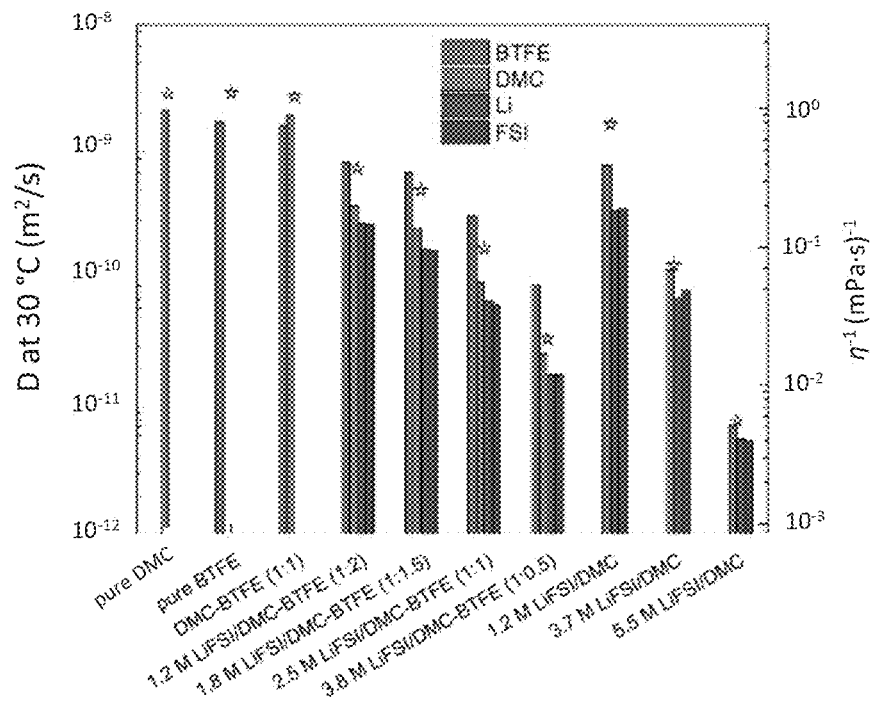
FIG. 41 shows diffusion coefficients (Ds) of Li$^+$, FSI$^-$ and solvent molecules (DMC and BTFE) at 30° C. across the samples plotted with the inverse of viscosity ($\eta^{-1}$), which is denoted with stars. The bars, from left to right, indicate the following species where present—BTFE, DMC, Li, FSI.

The LSE solvation structure is also confirmed by NMR characterization. NMR data (FIG. 41) shows that all diffusion coefficients (Ds) are globally proportional to the inverse of viscosity ($\eta^{-1}$) of solutions while its variations are slightly different depending on the ion-ion and ion-solvent interactions as predicted by the Stokes-Einstein theory of diffusion (Pregosin et al., *Chemical Reviews* 2005, 105: 2977-2998)). It is found D$_{DMC}$>D$_{BTFE}$ in pure DMC, BTFE solvent and their mixture, but with introduction of LiFSI salt, D$_{DMC}$ and D$_{BTFE}$ become smaller and larger than $\eta^{-1}$, respectively. This strongly suggests that the Li$^+$ cation solvation occurs mainly by DMC molecules, with BTFE interaction to other electrolyte components being quite weak. It also indicates that Li$^+$ cation diffusion is enhanced (D$_{Li}$≥D$_{FSI}$) by addition of BTFE, which is in line with Raman observation, while is reversed in the LiFSI/DMC electrolytes (D$_{Li}$≥D$_{FSI}$).

Figure 42:
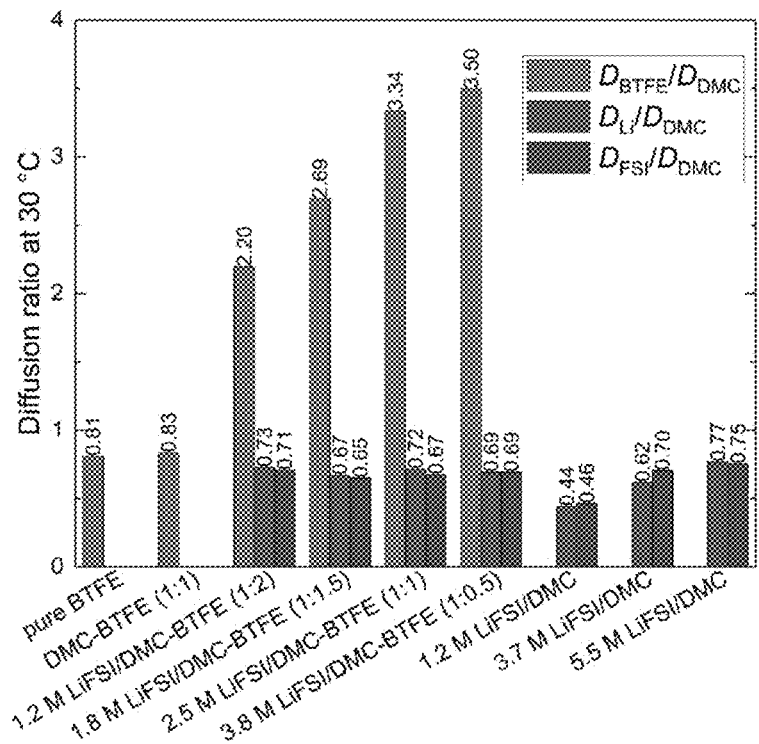
FIG. 42 shows diffusion ratios of BTFE, Li, and FSI in DMC—$D_{BTFE}/D_{DMC}$, $D_{Li}/D_{DMC}$ and $D_{FSI}/D_{DMC}$ at 30° C.

The stable diffusion ratios D$_{Li}$/D$_{DMC}$ and D$_{FSI}$/D$_{DMC}$ suggest that the LSE solvation structure composed of Li$^+$ cation, FSI$^-$ anion and DMC solvent is not sensitive to the population of BTFE in the LiFSI/DMC-BTFE electrolytes (FIG. 42). The temperature dependent Ds appears to obey the Stokes-Einstein theory of diffusion, D=k$_B$T/6πη$r_s$, where D is diffusion coefficient, k$_B$ is the Boltzmann constant, T is the absolute temperature, η is the viscosity and $r_s$ is the hydrodynamic radius of diffusing molecule. The D$_{Li}$/D$_{DMC}$ and D$_{FSI}$/D$_{DMC}$ values are closer to unity and $D_{BTFE}/D_{DMC}$ values are much larger than the unity due to the preferential solvation of Li$^+$ cation by DMC molecules. Relatively constant $D_{Li}/D_{DMC}$ and $D_{FSI}/D_{DMC}$ values in DMC:BTFE electrolytes suggests that the solvation structure composed of Li$^+$ cation, FSI$^-$ anion and DMC is less sensitive to the concentration of LiFSI and the ratio between DMC:BTFE. It can be concluded that the ion-ion and ion-solvent interactions, which depend strongly on the concentration of Li salt, are less likely to change as a function of LiFSI concentration in a DMC:BTFE binary electrolyte system.

Figure 43A:
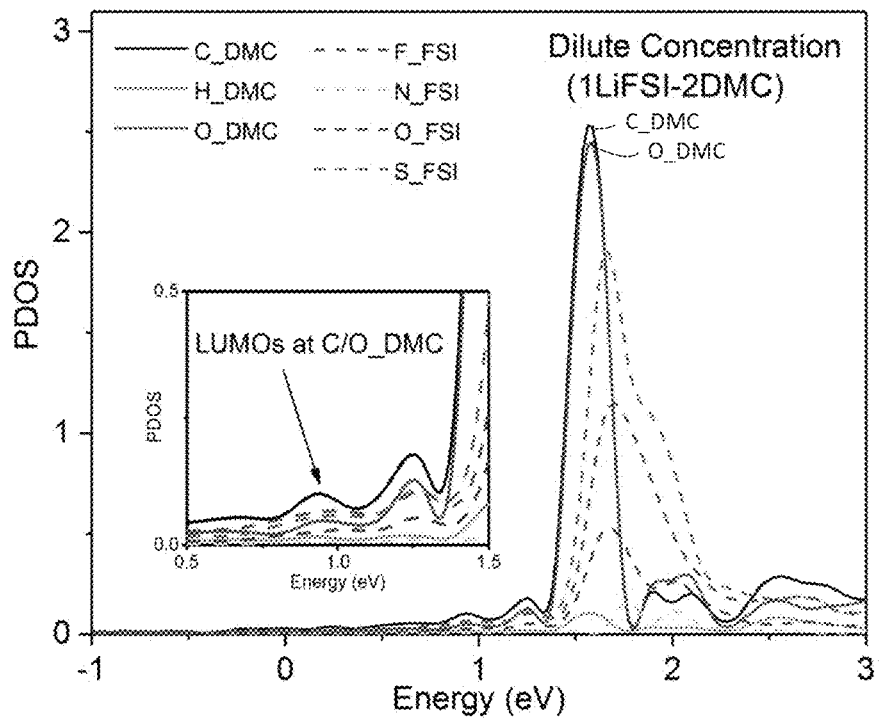
FIGS. 43A-43C are graphs showing projected density of states (PDOS) for dilute electrolyte (LiFSI/DMC, LiFSI:DMC molar ratio 1:2) (FIG. 43A), superconcentrated electrolyte (5.5M LiFSI/DMC, LiFSI:DMC molar ratio 1:1) (FIG. 43B), and BTFE-diluted electrolyte (LiFSI/DMC-BTFE, LiFSI:DMC:BTFE molar ratio 1:2:4) (FIG. 43C) on the Li anode surface.
Figure 43B:
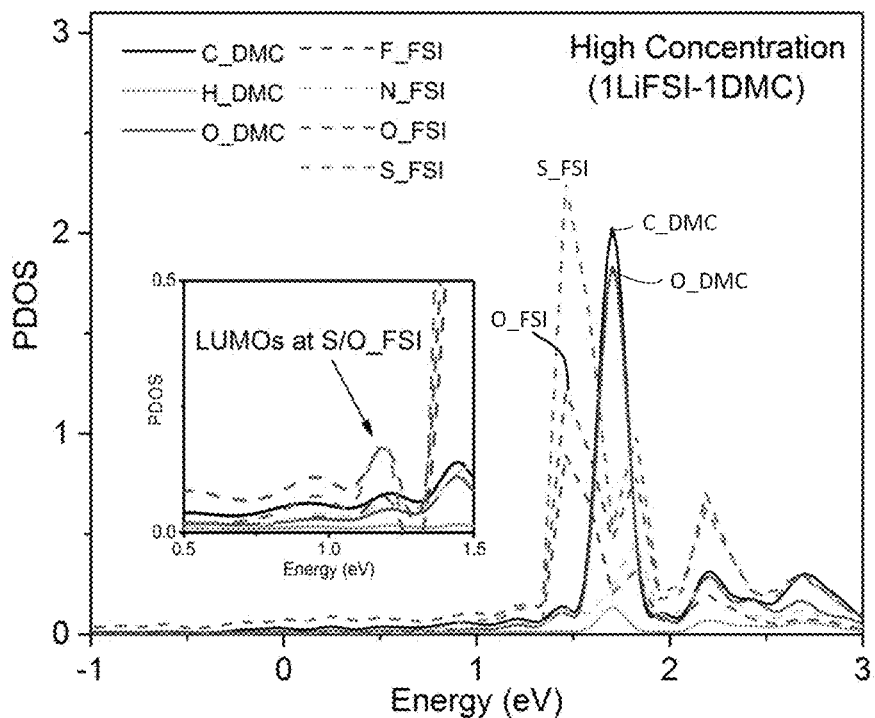
Figure 43C:
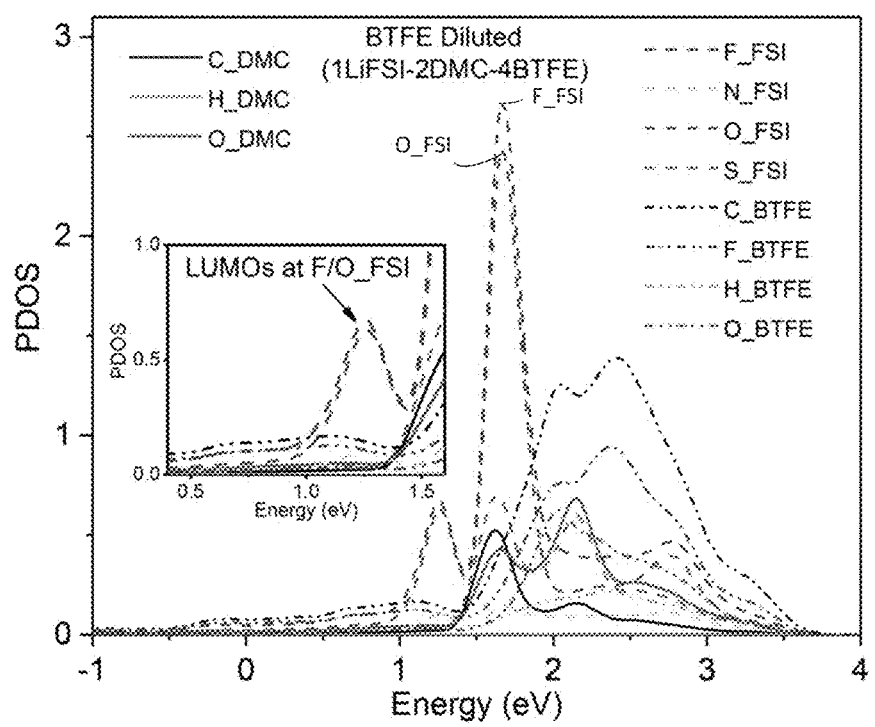

To gain insight into the stability of electrolyte components with Li metal, the moderately dilute 3.7 M LiFSI/DMC, SE (5.5 M LiFSI/DMC), and LSE (1.2 M LiFSI/DMC-BTFE (1:2)) are modeled by using solution of 1 LiFSI: 2 DMC, 1 LiFSI: 1 DMC, and 1 LiFSI: 2 DMC: 4 BTFE as three types of adsorption configurations on the most stable Li (100) surface. For the moderately dilute solution, the LiFSI adsorbs with two DMC molecules (FIG. 36F) while only the DMC-LiFSI pair adsorbs the Li (100) surface (FIG. 36D) in the case of the high concentration of LiFSI. As suggested by the previous work (Yamada et al., *J Am Chem Soc* 2014, 136:5039-5046), the reduction of LiFSI and DMC on the Li anode is examined using the lowest unoccupied molecular orbital (LUMO) energies. FIGS. 43A-43C show projected density of states (PDOS) of each atom in adsorbed LiFSI and DMC molecules for the three configurations. Clearly, in the dilute LiFSI/DMC solution (FIG. 43A), the LUMOs of the conduction bands are located at the DMC molecules. As a result, DMC molecules are reductively decomposed over the Li anode, leading to continuous corrosion of Li metal anode and fast capacity degradation of LMBs upon cycling. In contrast, for the 5.5 M LiFSI concentrated solution (FIG. 43B), the new LUMOs peaks associated with the FSI$^-$ anion appear. The lowest energy level of conduction bands of FSI$^-$ then is lower than those of DMC, indicating the FSI$^-$ anions instead of DMC solvents will be decomposed as the dominant reduction reaction, forming a FSI-derived surface film. Importantly, with dilution with inert BTFE to 1.2 M (FIG. 43C), the Li$^+$-DMC-FSI$^-$ solvation structures are well maintained, and the LUMOs of the conduction bands are still located on the FSI$^-$ anion, rather than the DMC or BTFE molecules. In this regard, FSI$^-$ anions are still preferentially reduced to form a robust FSI-derived surface film on Li metal, hence enabling improved stability of LMBs in such a low concentration electrolyte (1.2 M LiFSI/DMC-BTFE).

TABLE 9

DFT calculated adsorption energies and Bader charges of DMC, BTFE, and LiFSI on the Li(100) anode surface.

| Solvent/salt | Adsorption energy (kJ · mol$^{-1}$) | Bader charge (\|e\|) |
| --- | --- | --- |
| DMC | −54.9 | −0.19 |
| BTFE | −2.9 | −0.06 |
| LiFSI | −87.4 | −1.97 |
| DMC − LiFSI | −148.9 | −0.40 |
| 2DMC + LiFSI | −198.3 | −2.14 |
| DMC + DMC-LiFSI | −223.2 | −2.03 |

TABLE 10

Mullikan charges of LiFSI salt, DMC and BTFE electrolytes calculated using Gaussian 09

| | LiFSI | | | DMC | | | BTFE | |
| --- | --- | --- | --- | --- | --- | --- | --- | --- |
| 1 | O | −0.513511 | 1 | O | −0.302932 | 1 | O | −0.484765 |
| 2 | O | −0.583827 | 2 | O | −0.302935 | 2 | C | −0.008499 |
| 3 | O | −0.583829 | 3 | O | −0.350118 | 3 | H | 0.119682 |
| 4 | O | −0.513513 | 4 | C | 0.404178 | 4 | H | 0.119680 |
| 5 | S | 1.275462 | 5 | C | −0.452945 | 5 | F | −0.253411 |
| 6 | S | 1.275462 | 6 | C | −0.452947 | 6 | C | 0.789574 |
| 7 | N | −0.486613 | 7 | H | 0.242245 | 7 | F | −0.271213 |
| 8 | F | −0.371232 | 8 | H | 0.244359 | 8 | F | −0.253404 |
| 9 | F | −0.371232 | 9 | H | 0.242246 | 9 | C | −0.008475 |
| 10 | Li | 0.872833 | 10 | H | 0.244359 | 10 | H | 0.119652 |
| | | | 11 | H | 0.242245 | 11 | H | 0.119655 |
| | | | 12 | H | 0.242245 | 12 | F | −0.253424 |
| | | | | | | 13 | C | 0.789568 |
| | | | | | | 14 | F | −0.271221 |
| | | | | | | 15 | F | −0.253400 |

| | LiFSI + DMC | | | LiFSI + BTFE | | | LiFSI + DMC + BTFE | |
| --- | --- | --- | --- | --- | --- | --- | --- | --- |
| 1 | O | −0.512027 | 1 | O | −0.353656 | 1 | O | −0.349474 |
| 2 | O | −0.568559 | 2 | C | −0.206384 | 2 | C | −0.209249 |
| 3 | O | −0.573433 | 3 | C | 0.469200 | 3 | C | 0.475247 |
| 4 | O | −0.513097 | 4 | C | −0.206491 | 4 | C | −0.208819 |
| 5 | S | 1.269010 | 5 | C | 0.469573 | 5 | C | 0.474330 |
| 6 | S | 1.270952 | 6 | H | 0.267227 | 6 | H | 0.268250 |
| 7 | N | −0.486903 | 7 | H | 0.268456 | 7 | H | 0.266506 |
| 8 | F | −0.369713 | 8 | H | 0.269107 | 8 | H | 0.267816 |
| 9 | F | −0.370487 | 9 | H | 0.266375 | 9 | H | 0.266573 |
| 10 | Li | 0.713270 | 10 | F | −0.190602 | 10 | F | −0.187169 |
| 11 | O | −0.278551 | 11 | F | −0.193998 | 11 | F | −0.194059 |
| 12 | O | −0.275832 | 12 | F | −0.191335 | 12 | F | −0.195904 |
| 13 | O | −0.386995 | 13 | F | −0.190062 | 13 | F | −0.194621 |
| 14 | C | 0.465780 | 14 | F | −0.194829 | 14 | F | −0.193822 |
| 15 | C | −0.451501 | 15 | F | −0.190852 | 15 | F | −0.188438 |
| 16 | C | −0.453985 | 16 | O | −0.513004 | 16 | O | −0.514689 |
| 17 | H | 0.253230 | 17 | O | −0.575146 | 17 | O | −0.554408 |
| 18 | H | 0.251398 | 18 | O | −0.570364 | 18 | O | −0.552391 |
| 19 | H | 0.253073 | 19 | O | −0.514274 | 19 | O | −0.515485 |
| 20 | H | 0.253083 | 20 | S | 1.270093 | 20 | S | 1.252134 |
| 21 | H | 0.255599 | 21 | S | 1.268717 | 21 | S | 1.251197 |
| 22 | H | 0.255689 | 22 | N | −0.488169 | 22 | N | −0.486900 |
| | | | 23 | F | −0.370392 | 23 | F | −0.372415 |
| | | | 24 | F | −0.371383 | 24 | F | −0.371326 |
| | | | 25 | Li | 0.772192 | 25 | Li | 0.657434 |
| | | | | | | 26 | O | −0.279513 |
| | | | | | | 27 | O | −0.280496 |
| | | | | | | 28 | O | −0.377120 |
| | | | | | | 29 | C | 0.448938 |
| | | | | | | 30 | C | −0.469410 |
| | | | | | | 31 | C | −0.461821 |
| | | | | | | 32 | H | 0.256012 |
| | | | | | | 33 | H | 0.248965 |
| | | | | | | 34 | H | 0.262868 |
| | | | | | | 35 | H | 0.249022 |
| | | | | | | 36 | H | 0.254477 |
| | | | | | | 37 | H | 0.257759 |
| LiFSI: −0.14e | | | LiFSI: −0.09 | | | LiFSI: −0.20 | | |
| DMC: +0.14e | | | BTFE: +0.09 | | | DMC: +0.11 | | |
| | | | | | | BTFE: +0.09 | | |

Example 10

In this example, performances of a control electrolyte comprising a conventional carbonate solvent mixture (1 M LiPF$_6$ in EC-EMC (3:7 wt)), a superconcentrated electrolyte comprising an active salt, a solvent A (but no diluent), and an embodiment of an electrolyte according to the present disclosure comprising an active salt, a solvent A, and a diluent (1.2 M LiFSI-1.2DME-3TTE (in molar ratios)) were evaluated. Formulations and other information of the different electrolytes are provided in Table 11.

TABLE 11

Electrolyte number and formulations

| Electrolyte | Electrolyte formulation | M (mol L$^{-1}$) | Viscosity (cP, 25° C.) | Conductivity (mS cm$^{-1}$) |
|---|---|---|---|---|
| E-control-1 | 1M LiPF$_6$ in EC-EMC (3:7 wt) | 1 | 3.83 | 8.31 (25° C.) |
| E-37 | LiFSI-1.2DME-3TTE | 1.2 | 4.8 | 2.44 |
| E-38 | LiFSI-1.4DME | 4.4 | 48.0 | 4.18 |

Figure 44:
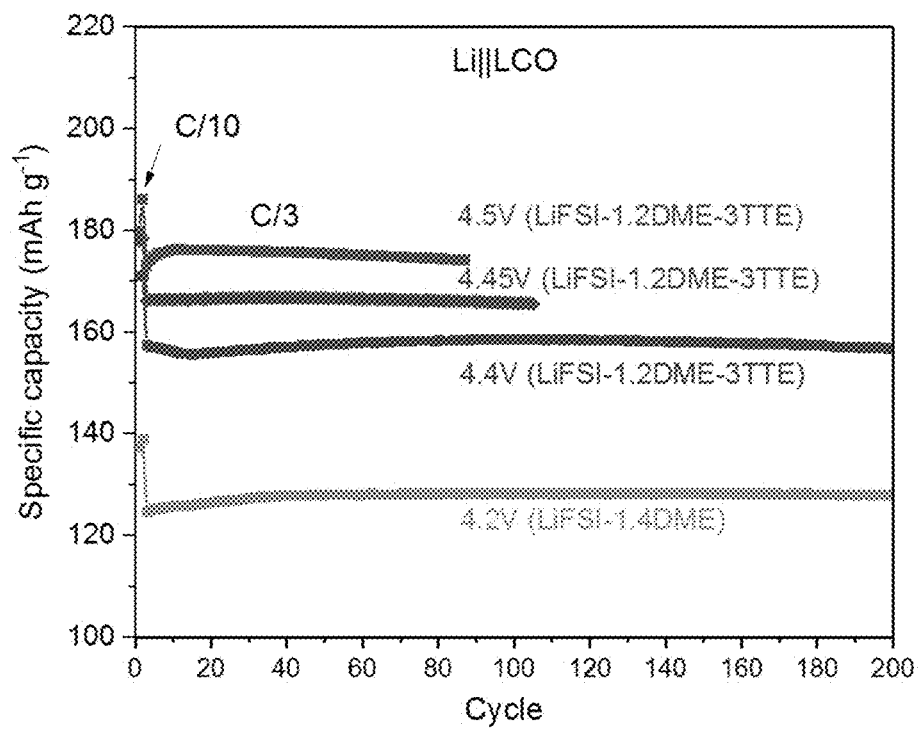
FIG. 44 shows the electrochemical performance of Li∥LCO cells containing 1.2M LiFSI-1.2DME-3TTE and 4M LiFSI-1.4DME at different cut-off charge voltages.

Li‖LCO cells were assembled and cycled under high voltages. Compared to the superconcentrated electrolyte, which comprised 4 M LiFSI-1.4DME, the addition of TTE greatly decreased the salt concentration and the electrolyte viscosity. Although the conductivity was lower, the low viscosity of the LiFSI-1.2DME-3TTE electrolyte could support efficient Li$^+$ transport for high rate cycling as evidenced by FIG. 44. As shown in FIG. 44, the cycling performance of Li‖LCO cells (LCO active material loading–13-14 mg cm$^{-2}$) were tested in the LiFSI-1.2DME-3TTE electrolyte under different charge cut-off voltages (4.4 V, 4.45 V, and 4.5 V). With the increase of charge cut-offs, the LCO capacity apparently increases from 140 mAh g$^{-1}$ (4.2 V, in 4 M LiFSI-1.4DME electrolyte) to 190 mAh g$^{-1}$ (4.5 V) at C/10. Nevertheless, the cycling stabilities are still well maintained in the LiFSI-1.2DME-3TTE electrolyte. A very stable cycling was observed even at a cut-off as high as 4.5 V.

Example 11

Figure 45:
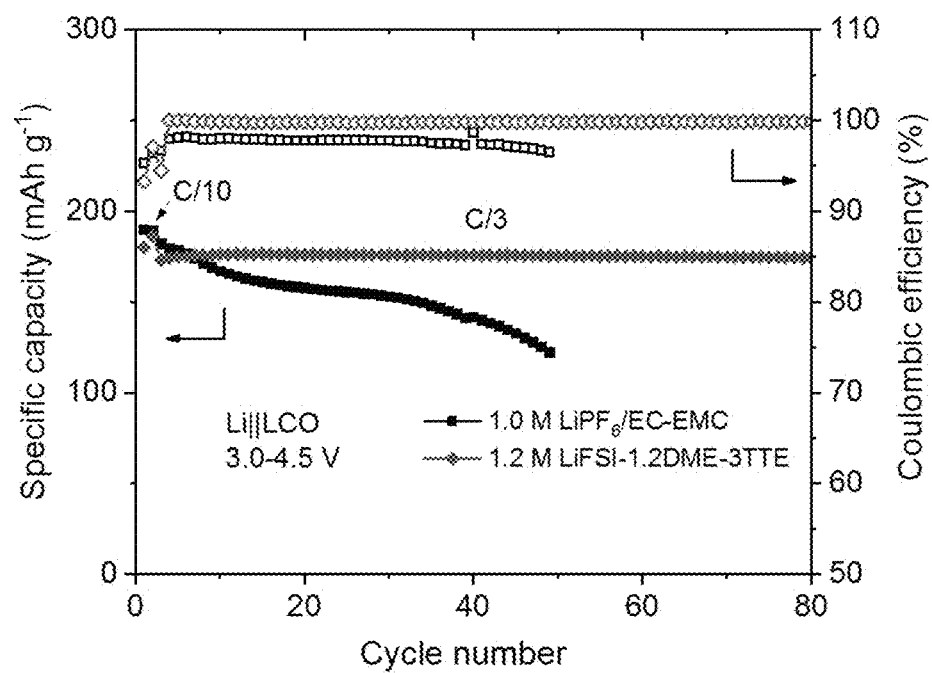
FIG. 45 shows the electrochemical performance of Li∥LCO cells containing 1.2M LiFSI-1.2DME-3TTE and 1M LiPF$_6$ in EC-EMC (3:7 wt) under cut-off charge voltages as high as 4.5 V.

In this example, the cycling performance of Li‖LCO cells in a control carbonate electrolyte (1 M LiPF$_6$/EC-EMC in Table 11) was compared with that in the LiFSI-1.2DME-3TTE electrolyte from Example 10. The results are shown in FIG. 45. The cell in the E-control-1 electrolyte shows a fast capacity fading and only 66% of initial capacity was kept after just 50 cycles. Meanwhile, the average cell CE is only about 97.5%, which indicates serious side reactions are taking place at the LCO/electrolyte interface. In contrast, the cell in the LiFSI-1.2DME-3TTE electrolyte exhibited a highly stable cycling with a very high cell CE over 99.8%, which confirms that the LiFSI-1.2DME-3TTE electrolyte is extremely stable with LCO cathode under high voltage.

Example 12

Figure 46A:
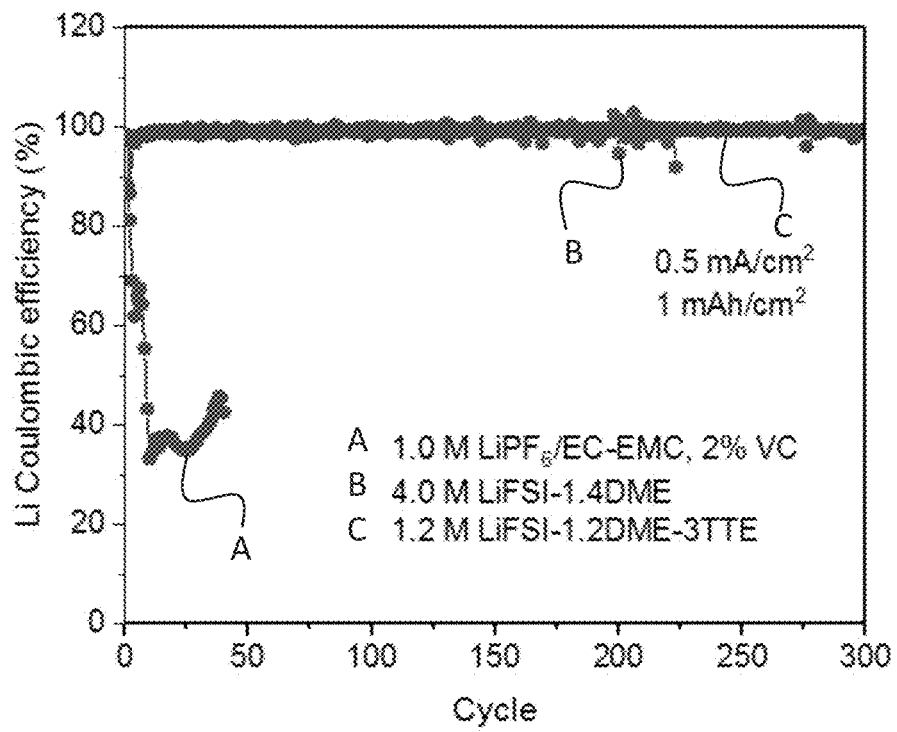
FIGS. 46A-46D show the electrochemical performance (particularly, CE % as a function of cycle) of an electrolyte comprising 1 M LiPF$_6$ in EC-EMC (3:7 wt) with 2% VC, an electrolyte comprising LiFSI-1.2DME, and an electrolyte comprising 1.2 M LiFSI-1.2DME-3TTE; and the initial Li deposition/stripping voltage profiles of Li∥Cu cells as a function of cycle number after a formation cycle at 0.5 mA cm$^{-2}$ for and using the 1 M LiPF$_6$ in EC-EMC (3:7 wt) with 2% VC electrolyte (FIG. 46B), the LiFSI-1.2DME electrolyte (FIG. 46C), and the LiFSI-1.2DME-3TTE electrolyte (FIG. 46D).
Figure 46B:
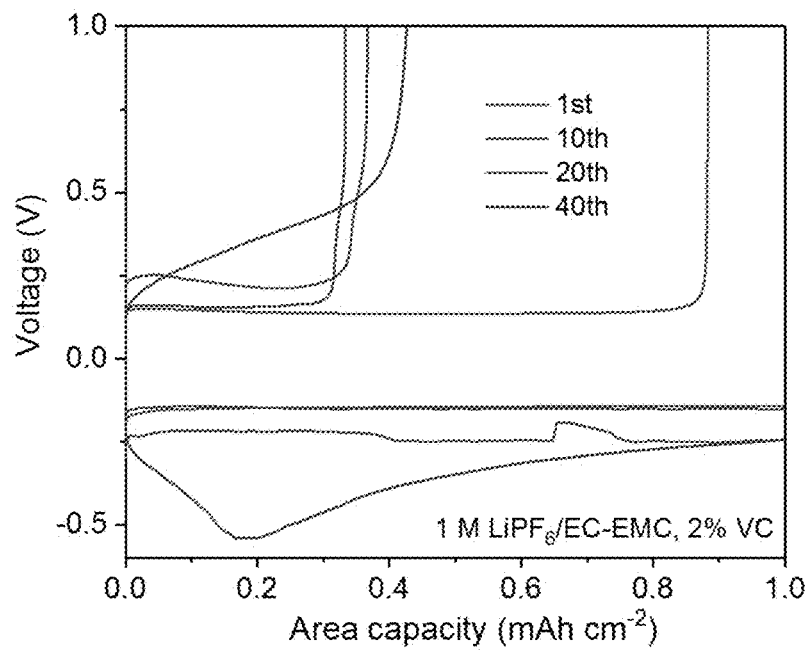
Figure 46C:
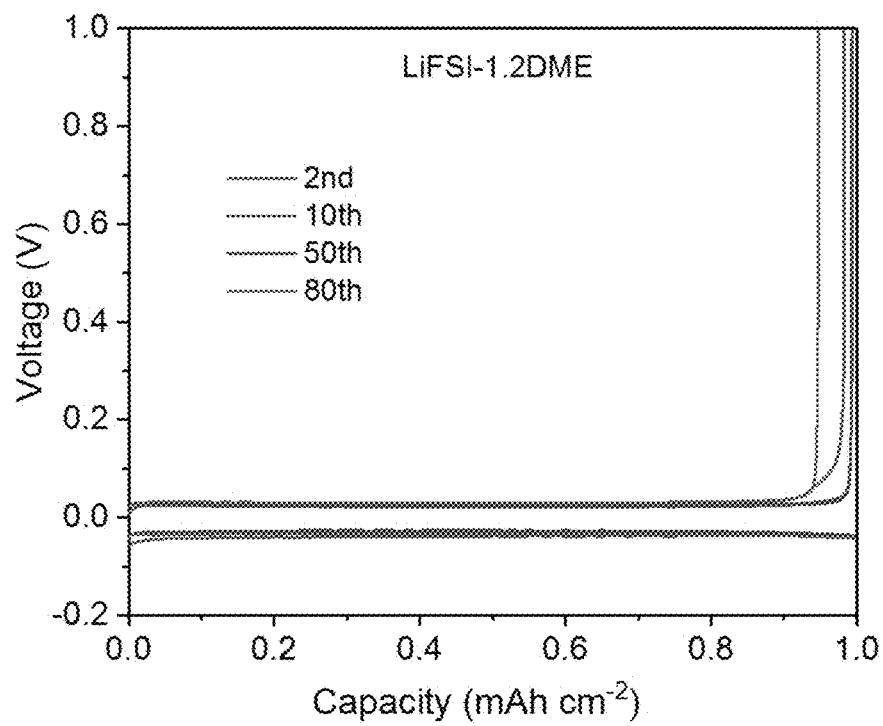
Figure 46D:
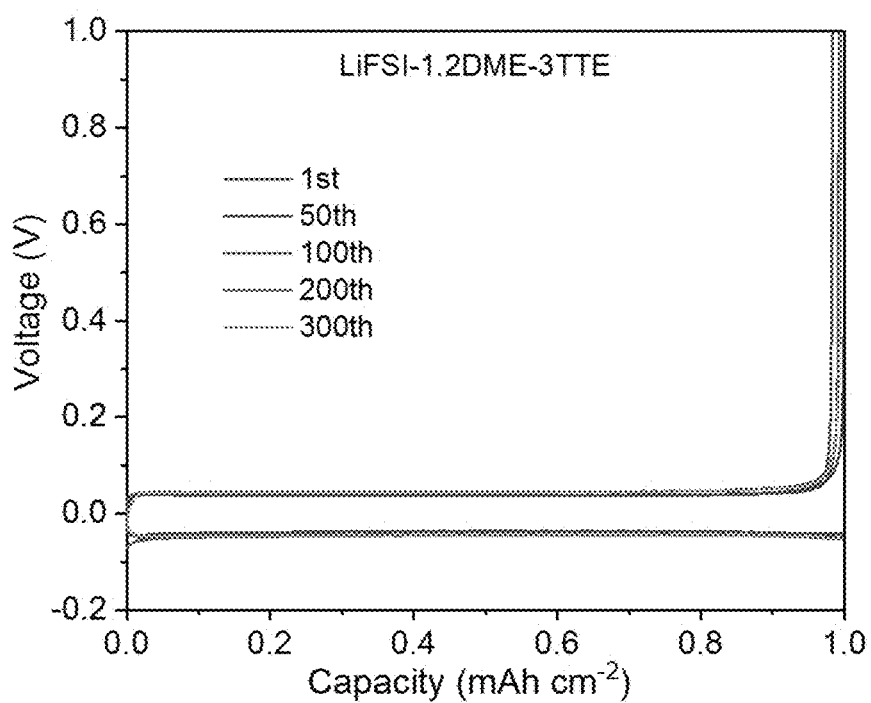

In this example, the stability of Li metal anode in different electrolytes was evaluated. Results are shown in FIGS. 46A-46D. The Li metal CEs over cycling were measured in Li‖Cu cells. In each cycle, a fixed amount of Li metal (area capacity of 1.0 mAh cm$^{-2}$) was electrodeposited onto the bare Cu substrate at a current density of 0.5 mA cm$^{-2}$, and then fully stripped until a cut-off voltage of 1 V. The ratio between the stripped capacity and the deposited capacity is the Li metal CE of a specific cycle, indicating the amount of electrochemically active Li metal. As shown in FIG. 46A, the Li CEs in another carbonate electrolyte (which comprises 1 M LiPF$_6$/EC-EMC and 2% VC), drop below 50% in just a few cycles, averaging 44.4% in the first 40 cycles. In addition, the voltage hysteresis keeps increasing upon deposition/stripping cycles. These data illustrate the high reactivity of conventional carbonate electrolytes with Li metal and the influence of side reaction product accumulations on the cell internal resistance.

When using the high concentration LiFSI-1.2DME electrolyte, however, an improved Li CE was observed, which averaged >99.1% over 220 cycles, along with stable voltage profiles during cycling. Nevertheless, Li CE fluctuations were found towards longer cycling as shown by FIG. 46A. It is likely that although the side reactions between the LiFSI-1.2DME electrolyte and the deposited Li metal are minimized, the build-up of the porous surface layer on Cu arises, increasing difficulties of uniform mass transport, which induces non-uniform Li deposition/stripping processes.

With an inventive electrolyte (LiFSI-1.2DME-3TTE), such fluctuations were largely mitigated over extended cycles (over 300 cycles) and the average Li CE were further improved to >99.3% as can be seen in FIG. 46A. Without being limited to a single particular theory, it currently is believed that the performance enhancement could be attributed to the further minimized side reaction products, the lower viscosity and better wettability of LHCE for fullfilling the porous surface layer, or both.

Example 13

In this example, the differences of Li metal growths in the electrolytes described in Example 12 were also studied after depositing a Li metal film of 4 mAh cm$^{-2}$. The optical images of the Li metal films are shown in FIGS. 47A-47C. In the carbonate electrolyte (1 M LiPF$_6$/EC-EMC and 2% VC), a non-uniform film with grey color was obtained (FIG. 47A). This so-called "Elton's grey layer" suggests the extensive side reactions between the electrolyte and Li metal. In contrast, quite uniform Li metal films with similar color to the pristine Li metal were deposited in both the LiFSI-1.2DME and LiFSI-1.2DME-3TTE electrolyte embodiments (FIGS. 47B and 47C, respectively), which indicates the greatly improved Li metal stability in the two electrolytes. Further SEM characterizations also confirms the highly dendritic Li metal growth behavior in the porous film. The uncontrollable extensive SEI formation induces the needle-like irregular Li metal growth. The cross-section image of the Li deposition in the LiFSI-1.2DME-3TTE electrolyte shows a thickness of 32 μm (FIG. 47C), which indicates the Li deposition is even denser than that in the LiFSI-1.2DME electrolyte (FIG. 47B).

Example 14

Figure 48A:
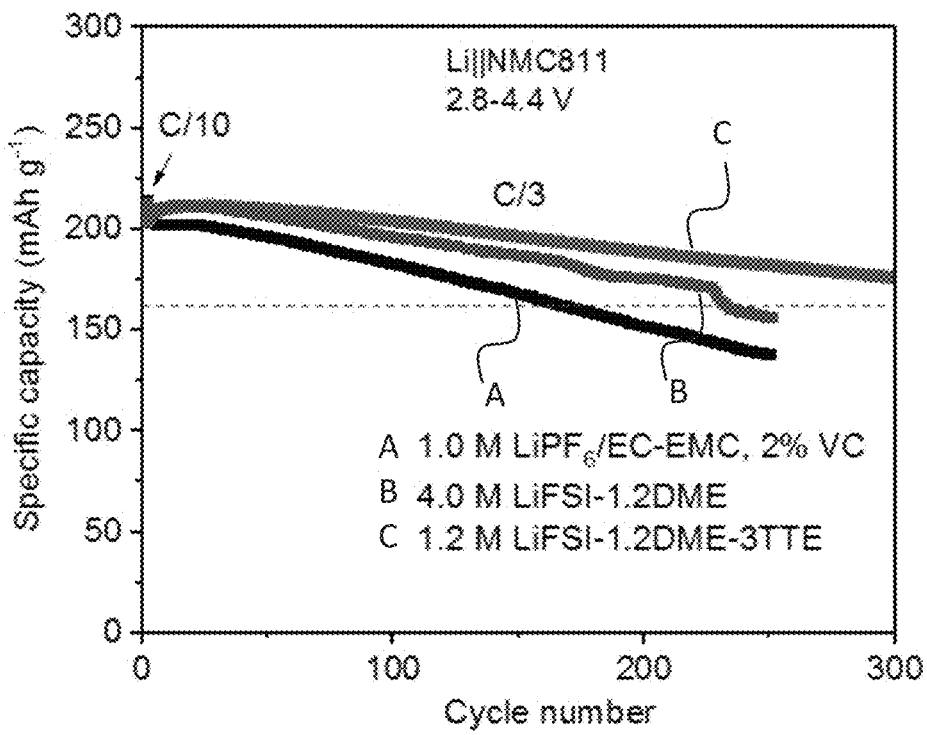
FIGS. 48A-48D show the electrochemical performance of the 1 M LiPF$_6$ in EC-EMC (3:7 wt) with 2% VC electrolyte, the LiFSI-1.2DME electrolyte, and the LiFSI-1.2DME-3TTE electrolyte in Li||NMC811 (LiNi$_{0.8}$Mn$_{0.1}$Co$_{0.1}$O$_2$) cells for 300 cycles at 4.4 V (the dash line shows 80% capacity) (FIG. 48A)
Figure 48B:
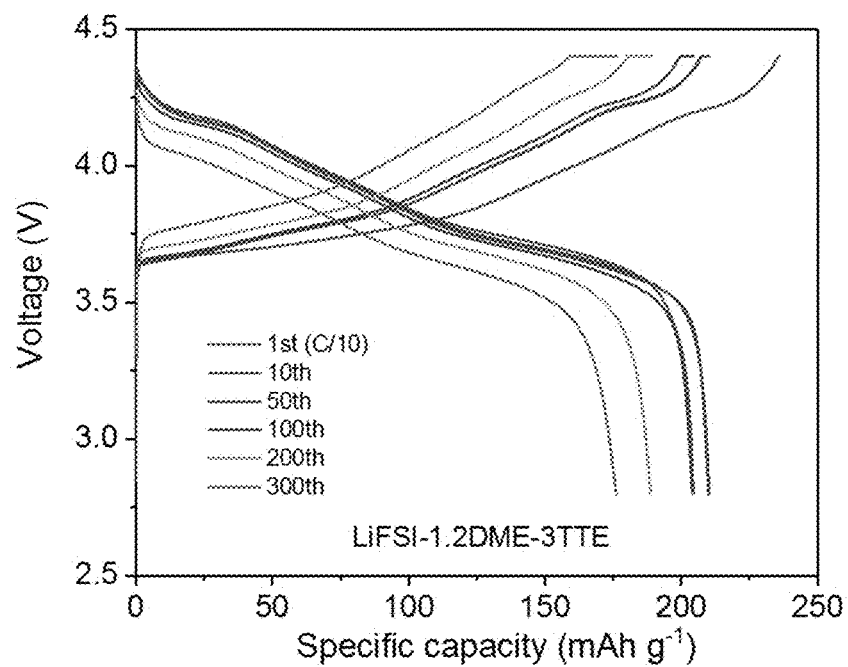
Figure 48C:
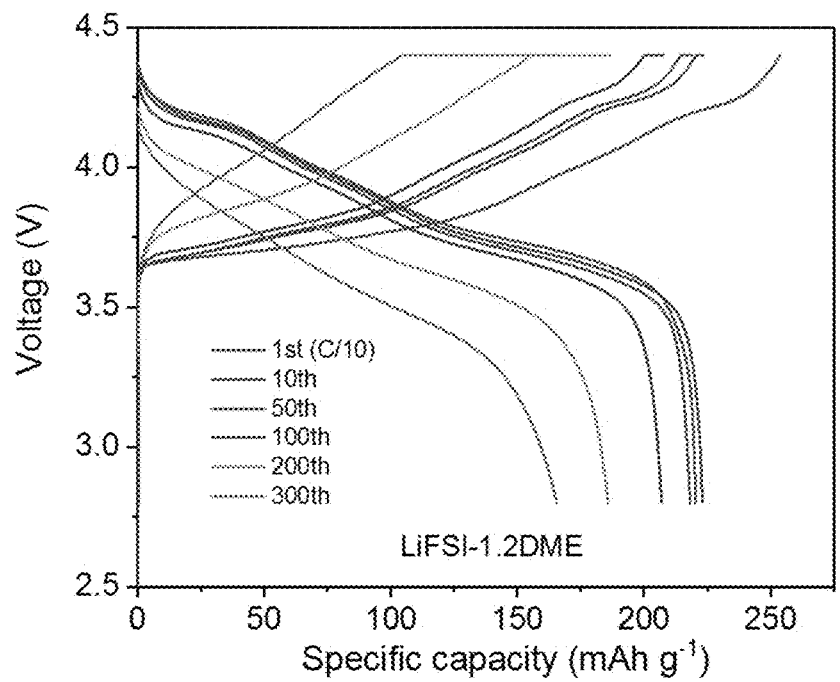
Figure 48D:
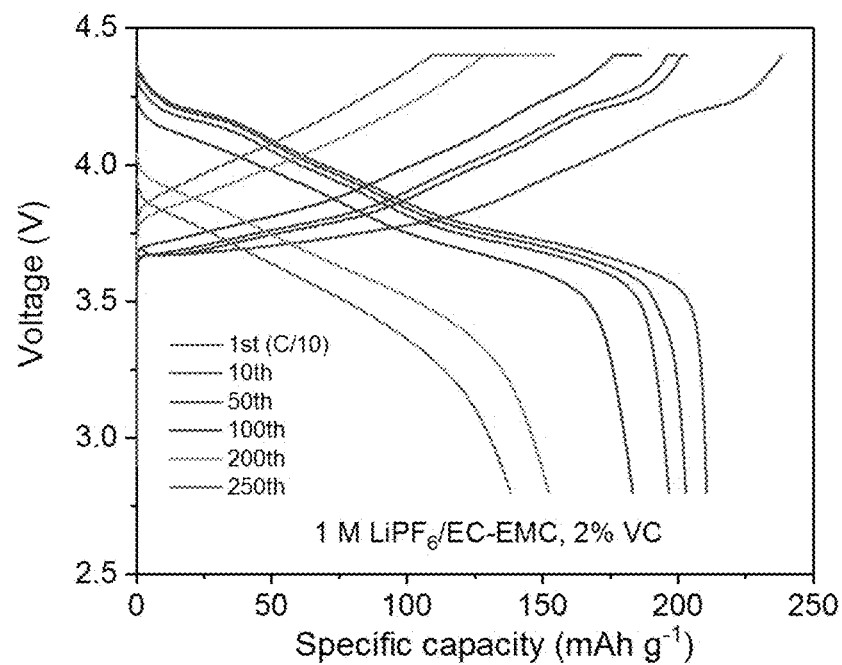
Figure 49A:
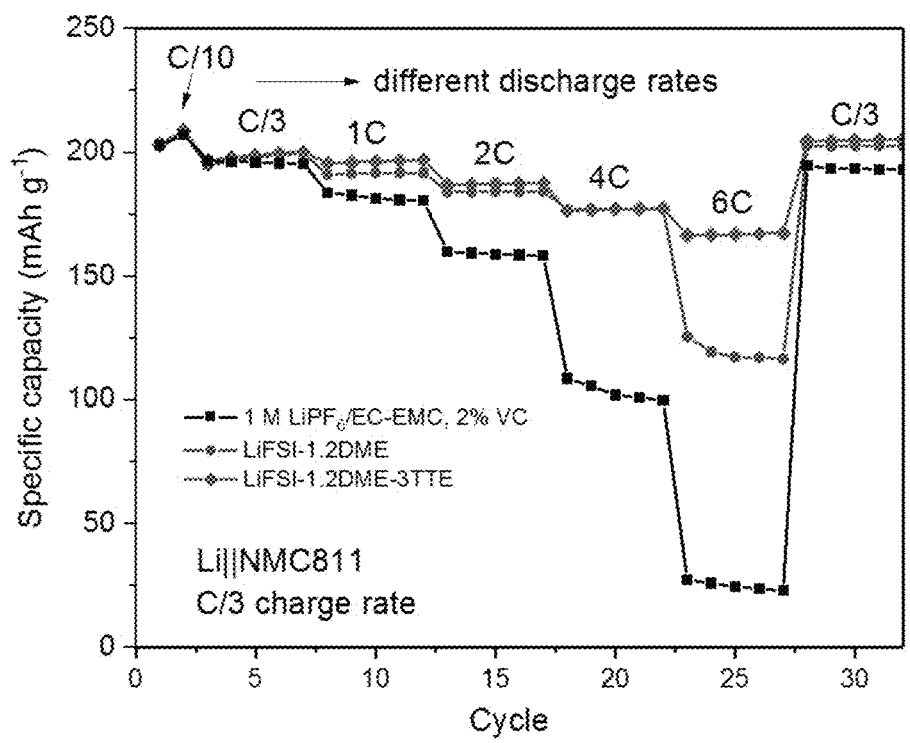
FIGS. 49A and 49B show the discharge rate capability (FIG. 49A) and charge rate capability (FIG. 49B) of the 1 M LiPF$_6$ in EC-EMC (3:7 wt) with 2% VC electrolyte, the LiFSI-1.2DME electrolyte, and the LiFSI-1.2DME-3TTE electrolyte in Li||NMC811 cells.
Figure 49B:
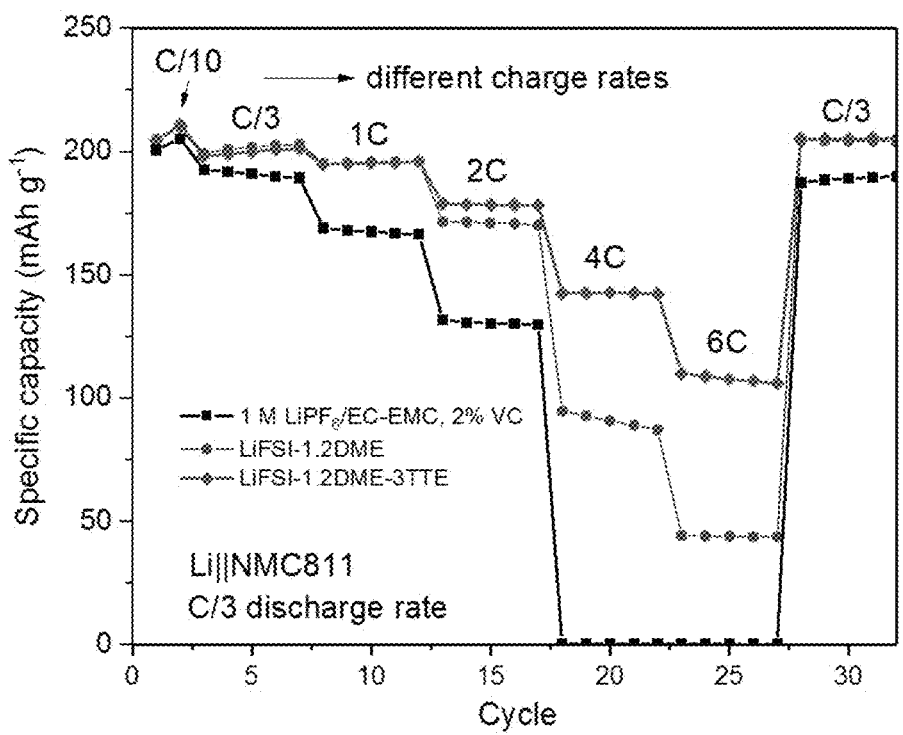

In this example, the cycling performance of the three electrolytes described in Example 12 were evaluated with a Li‖NMC811 cell. Li‖NMC811 cells were assembled and cycled under high voltages. After two formation cycles at C/10 (1C=200 mAh g$^{-1}$), the cells were galvanostatically charged at C/3 to specified cut-off voltages (4.4 V or 4.5 V) and held at the charge cut-off potential until the current drops below C/20 before the following galvanostatic discharge at C/3 to 2.8 V. NMC811 cathode with a relatively high area loading of 1.5 mAh cm$^{-2}$ was tested for better evaluation of the full cell performance. The results are shown in FIGS. 48A-48D. As can be seen in FIGS. 48A and 48B, the LiFSI-1.2DME-3TTE electrolyte exhibits a capacity retention of 86.5% after 300 cycles at 4.4 V, which is much higher than those in the LiFSI-1.2DME electrolyte (FIG. 48A and FIG. 48C) and the 1 M LiPF$_6$/EC-EMC and 2% VC electrolyte (FIG. 48A and FIG. 48D). The addition of TTE diluent greatly improves the cycling stability at high voltages. Additionally, the LiFSI-1.2DME-3TTE electrolyte exhibits much better discharge rate capacity (FIG. 49A) and charge rate capability (FIG. 49B) than the LiFSI-1.2DME electrolyte (FIG. 49A and FIG. 49B) and the 1 M LiPF$_6$/EC-EMC and 2% VC electrolyte (FIG. 49A and FIG. 49B).

Figure 50:
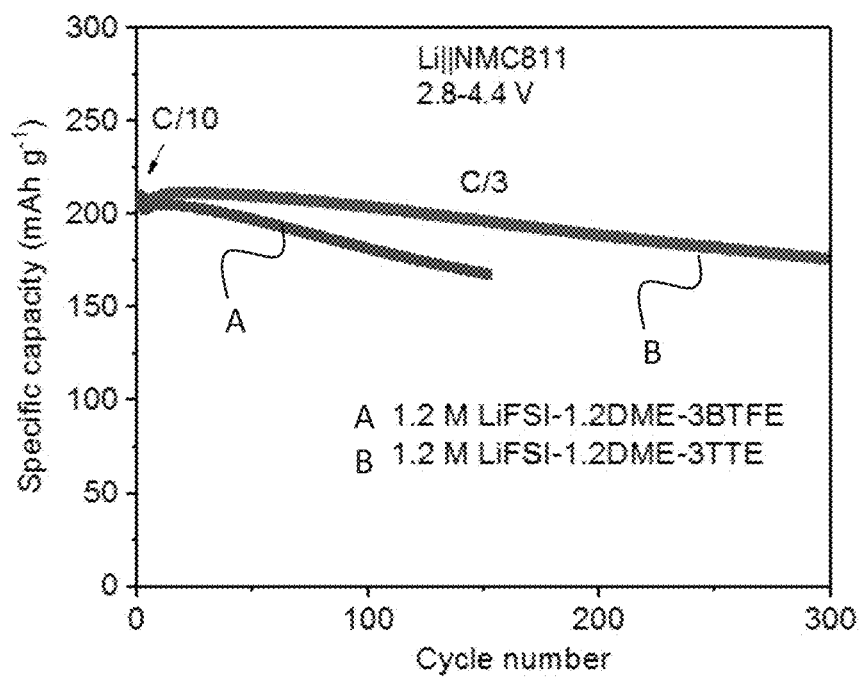
FIG. 50 shows the cycling performance of the 1 M LiPF$_6$ in EC-EMC (3:7 wt) with 2% VC electrolyte, the LiFSI-1.2DME electrolyte, an electrolyte comprising 1.2 M LiFSI-1.2DME-3BTFE, and the LiFSI-1.2DME-3TTE electrolyte in Li||NMC811 cells for 300 cycles at 4.4 V.
Figure 51:
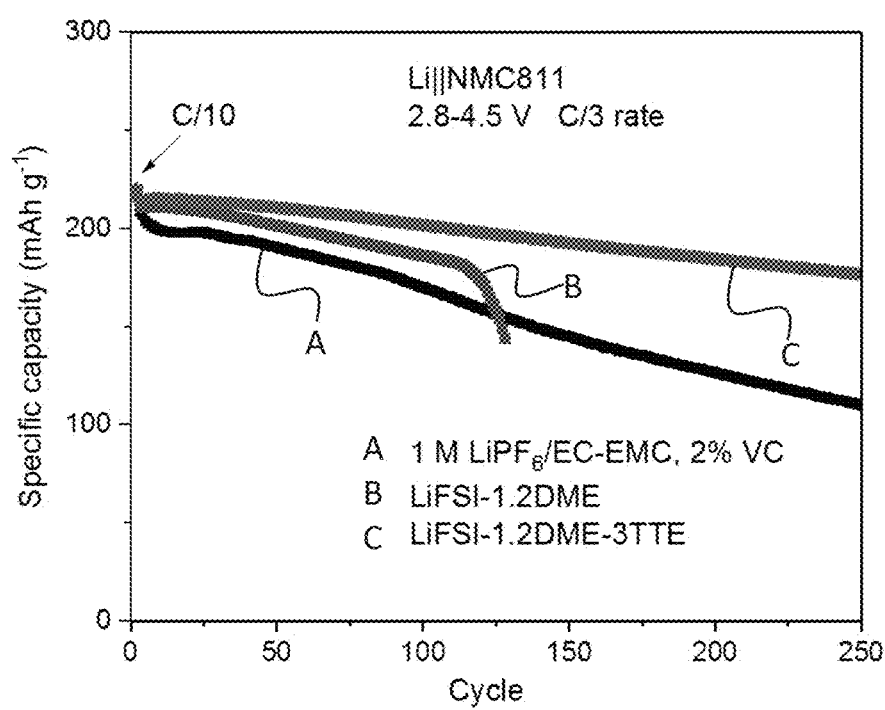
FIG. 51 shows the electrochemical performance of the 1 M LiPF$_6$ in EC-EMC (3:7 wt) with 2% VC electrolyte, the LiFSI-1.2DME electrolyte, and the LiFSI-1.2DME-3TTE electrolyte in Li||NMC811 cells for 250 cycles at 4.5 V.

In some examples, using TTE as the diluent exhibits superior performance to using BTFE as the diluent as illustrated in FIG. 50. Additionally, the LiFSI-1.2DME-3TTE electrolyte enabled cycling of Li||NMC811 even at 4.5 V (see FIG. 51). The conventional carbonate electrolyte (1 M LiPF$_6$/EC-EMC and 2% VC) and LiFSI-1.2DME electrolytes exhibited reduced cycling stability at this high voltage as can be seen in FIG. 51.

Example 15

Figure 52:
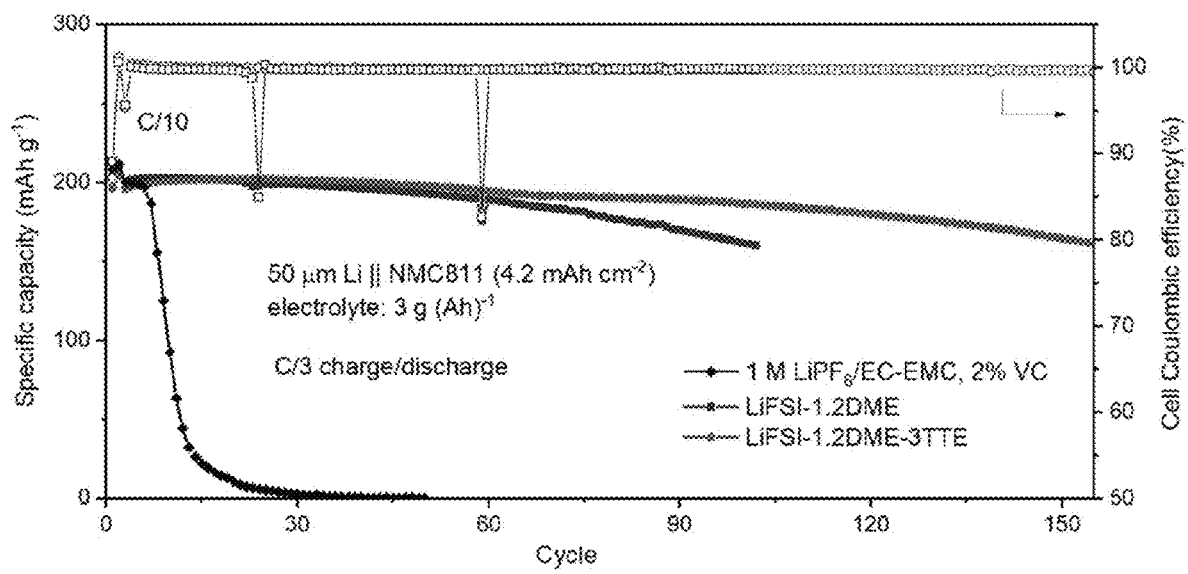
FIG. 52 shows the electrochemical performance of the 1 M LiPF$_6$ in EC-EMC (3:7 wt) with 2% VC electrolyte, the LiFSI-1.2DME electrolyte, and the LiFSI-1.2DME-3TTE electrolyte in Li||NMC811 cells for 160 cycles at 4.4 V and using a 50 µm Li and a 4.2 mAh cm$^{-2}$ NMC811 cathode along with a very limited amount of electrolyte.

In this example, the ability of an inventive electrolyte embodiment to enable cycling in cells with a high cathode loading was evaluated. As seen in FIG. 52, electrolyte embodiment LiFSI-1.2DME-3TTE enabled better cycling of Li||NMC811 cells having a high cathode loading, a very thin Li anode, and a limited amount of electrolyte as compared to LiFSI-1.2DME and 1 M LiPF$_6$/EC-EMC and 2% VC. The LiFSI-1.2DME electrolyte exhibited difficulties in fully wetting the growing Li anode surface layer with high porosity. The abrupt drops of the cell capacity may be attributed to soft-shorting in the battery. The cell using the conventional electrolyte could only run 6 cycles at C/3 (1.4 mA cm$^{-2}$) charge and discharge rates before a very quick capacity fading and battery failure. The cell with the inventive electrolyte greatly suppresses the voltage fluctuations during cycling with improved viscosity and wettability. Considering the pores inside the cathode and the separator as well as the surfaces inside the coin cell, the "active" electrolyte volume is less than 9 μL. In comparison, most lithium metal battery evaluations use close to 100 μL or even more electrolyte. It is even more challenging for the LiFSI-1.2DME-3TTE electrolyte, as only 42% of the molecules in the electrolyte (LiFSI-1.2DME vs. 3TTE) are mainly responsible for the SEI formation.

Figure 53:
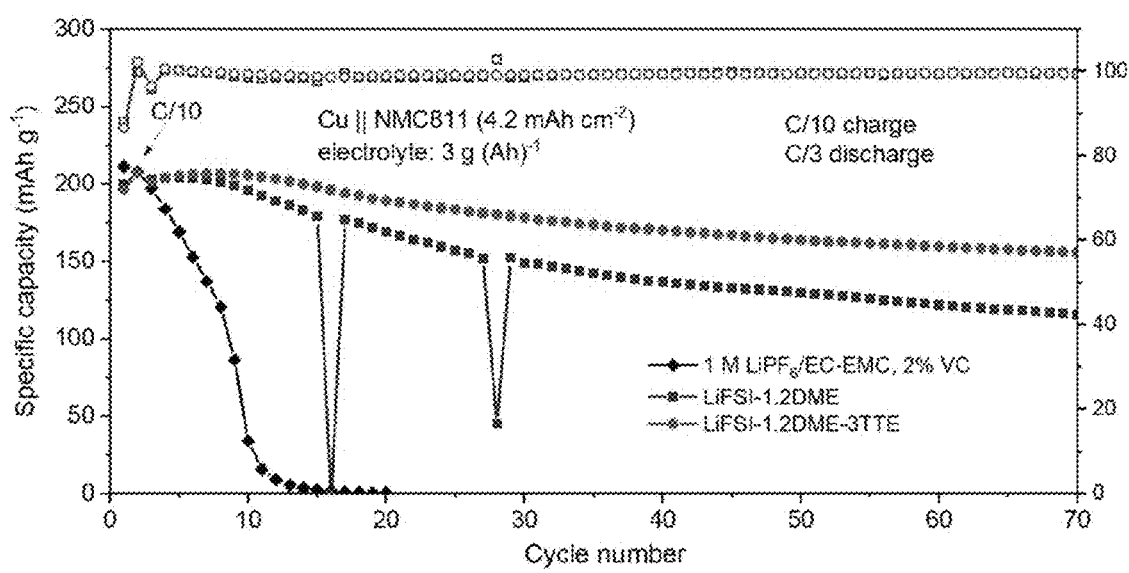
FIG. 53 shows the electrochemical performance of the 1 M LiPF$_6$ in EC-EMC (3:7 wt) with 2% VC electrolyte, the LiFSI-1.2DME electrolyte, and the 1.2 M LiFSI-1.2DME-3TTE electrolyte in Li-free Cu||NMC811 cells for 70 cycles.

Additional data is shown in FIG. 53, which illustrates performance of the LiFSI-1.2DME-3TTE electrolyte as compared to the LiFSI-1.2DME and the conventional carbonate electrolyte in a Li free Cu, NMC811 battery cell using low amounts of the electrolyte. A record-high capacity retention of 77% was achieved in the LiFSI-1.2DME-3TTE electrolyte after 70 cycles under highly demanding conditions.

Example 16

Figures 54A, 54B, 54C:
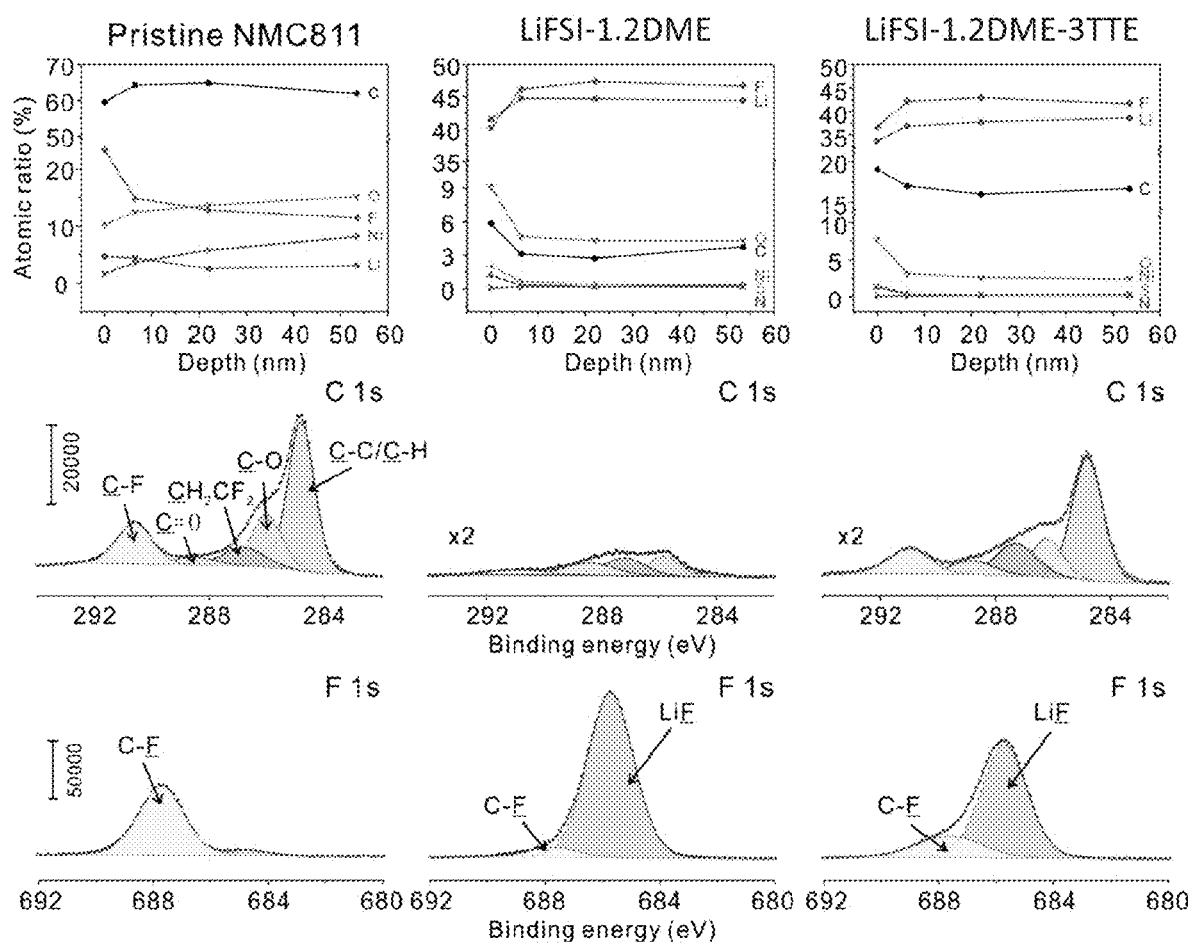
FIGS. 54A-54C show XPS data for the pristine NMC811 (FIG. 54A) and NMC811 cathodes after 50 cycles in the LiFSI-1.2DME electrolyte (FIG. 54B), and the 1.2 M LiFSI-1.2DME-3TTE electrolyte (FIG. 54C).

In this example, the carbon atomic ratio on the cycled NMC811 in a cell comprising the LiFSI-1.2DME-3TTE electrolyte (FIG. 54C) was examined and compared to results for the LiFSI-1.2DME electrolyte (FIG. 54B) and a pristine cathode (FIG. 54A). The results (see FIGS. 54A-54C) suggest that the diluent (e.g., TTE in this example, which was used for the LiFSI-1.2DME-3TTE electrolyte) and its decomposition products can have a beneficial impact on the cathode interphase formation. Without being limited to a single theory, it currently is believed that enrichments of LiF in the cathode-electrolyte interphase are beneficial for cathode protection in certain embodiments.

Example 17

Figure 55:
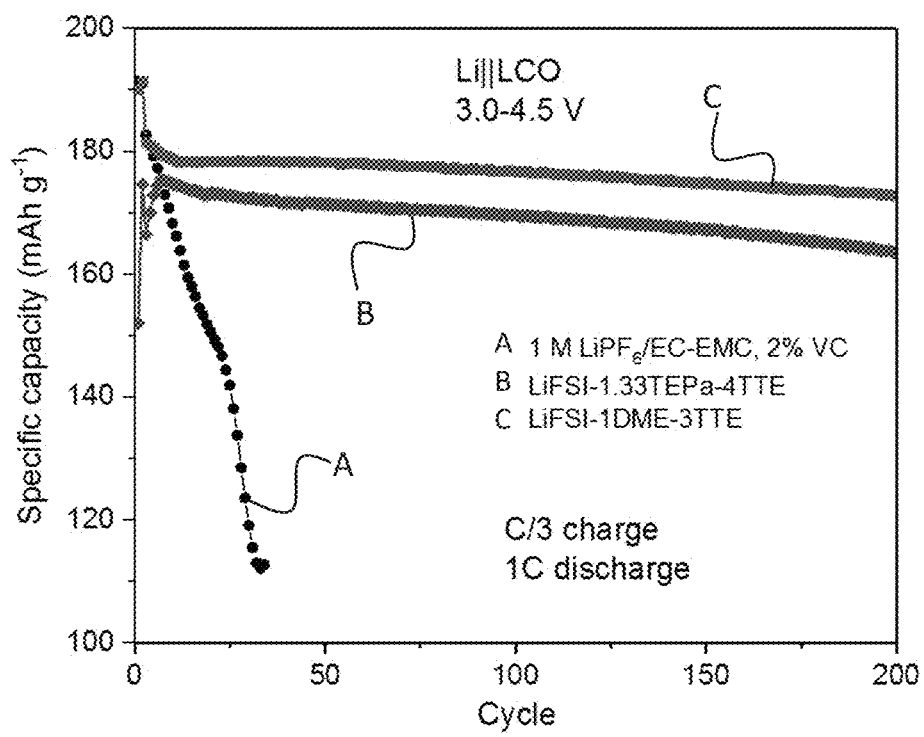
FIG. 55 shows the cycling performance of the 1 M LiPF$_6$ in EC-EMC (3:7 wt) with 2% VC electrolyte, an electrolyte comprising LiFSI-1.33TEPa-4TTE, and an electrolyte comprising LiFSI-1.0DME-3TTE in Li||LCO cells for 200 cycles at 4.5 V.

In this example, the performance of an electrolyte comprising LiFSI-1DME-3TTE was evaluated in a Li||LCO cell at 4.5 V, and compared to the performances of a LiFSI-1.33TEPa-4TTE electrolyte and the conventional carbonate electrolyte (1 M LiPF$_6$/EC-EMC and 2% VC). As can be seen in FIG. 55, the LiFSI-1DME-3TTE electrolyte outperformed the other two electrolytes.

Example 18

Figure 56:
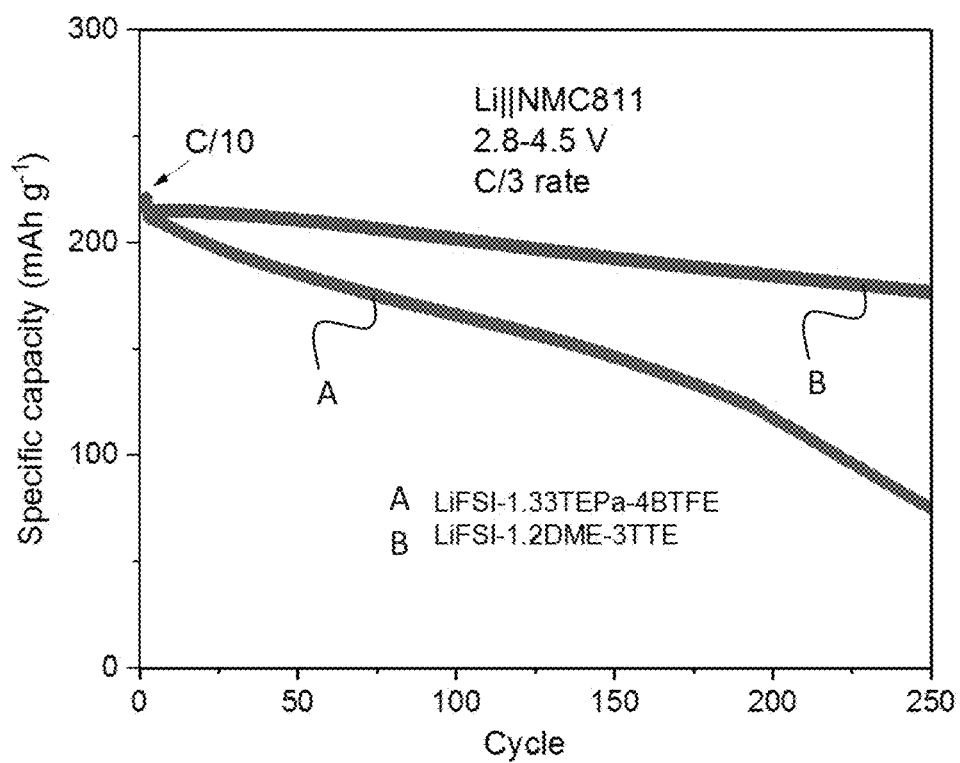
FIG. 56 shows the cycling performance of the LiFSI-1.2DME-3TTE electrolyte and the LiFSI-1.33TEPa-4BTFE electrolyte in Li||NMC811 cells for 250 cycles at 4.5 V.

In this example, the cycling performance of the LiFSI-1.2DME-3TTE electrolyte and an electrolyte comprising a flame retardant (LiFSI-1.33TEPa-4TTE) was evaluated with a Li||NMC811 cell operated at 4.5V. The results are shown in FIG. 56. As can be seen in FIG. 56, electrolyte LiFSI-1.2DME-3TTE exhibited a superior specific capacity retention at 4.5 V.

Example 19

Figure 57:
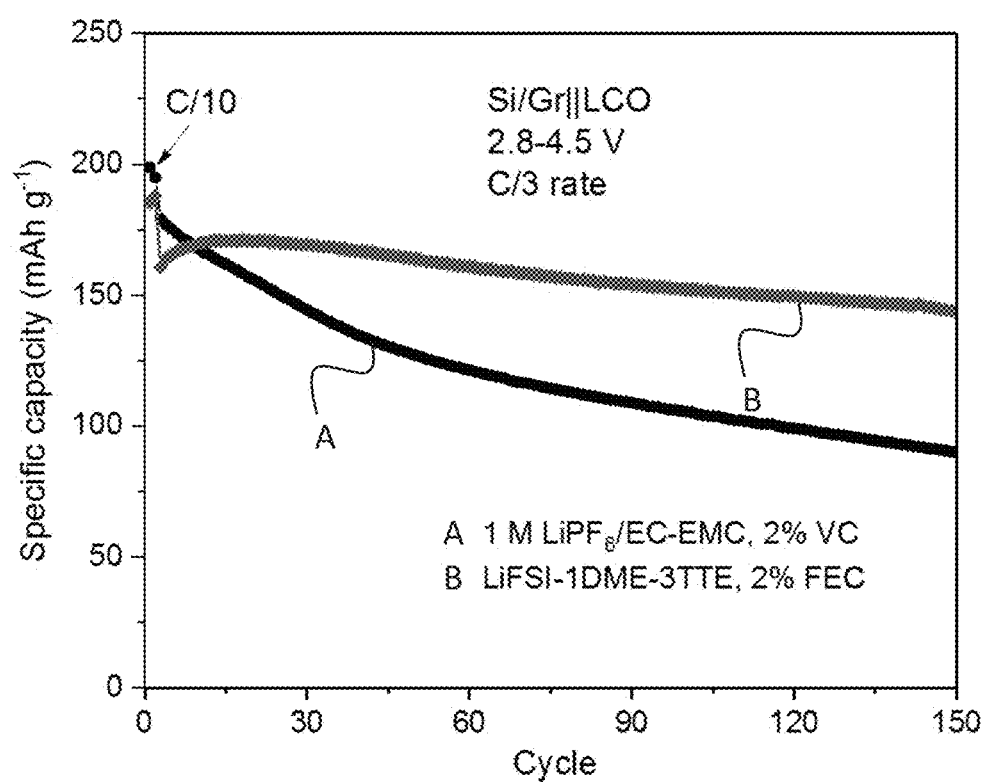
FIG. 57 shows the cycling performance of the 1 M LiPF$_6$ in EC-EMC (3:7 wt) with 2% VC electrolyte, and the LiFSI-1.0DME-3TTE with 2% FEC electrolyte, in Si/Gr||LCO cells for 150 cycles at 4.5 V (FEC: fluoroethylene carbonate; Si: silicon; Gr: graphite).

In this example, the cycling performance of an inventive electrolyte embodiment comprising LiFSI-1.0DME-3TTE with 2% FEC and the conventional carbonate electrolyte (1 M LiPF$_6$/EC-EMC and 2% VC) was evaluated with cell comprising a silicon/graphite composite anode and an NMC-containing cathode (Si/Gr||NMC) operated at 4.5V. The results are shown in FIG. 57. As can be seen in FIG. 57, the inventive electrolyte (LiFSI-1.0DME-3TTE with 2% FEC) comprising the diluent exhibited a superior specific capacity retention at 4.5 V as compared to the conventional carbonate electrolyte.

Example 20

Figure 59:
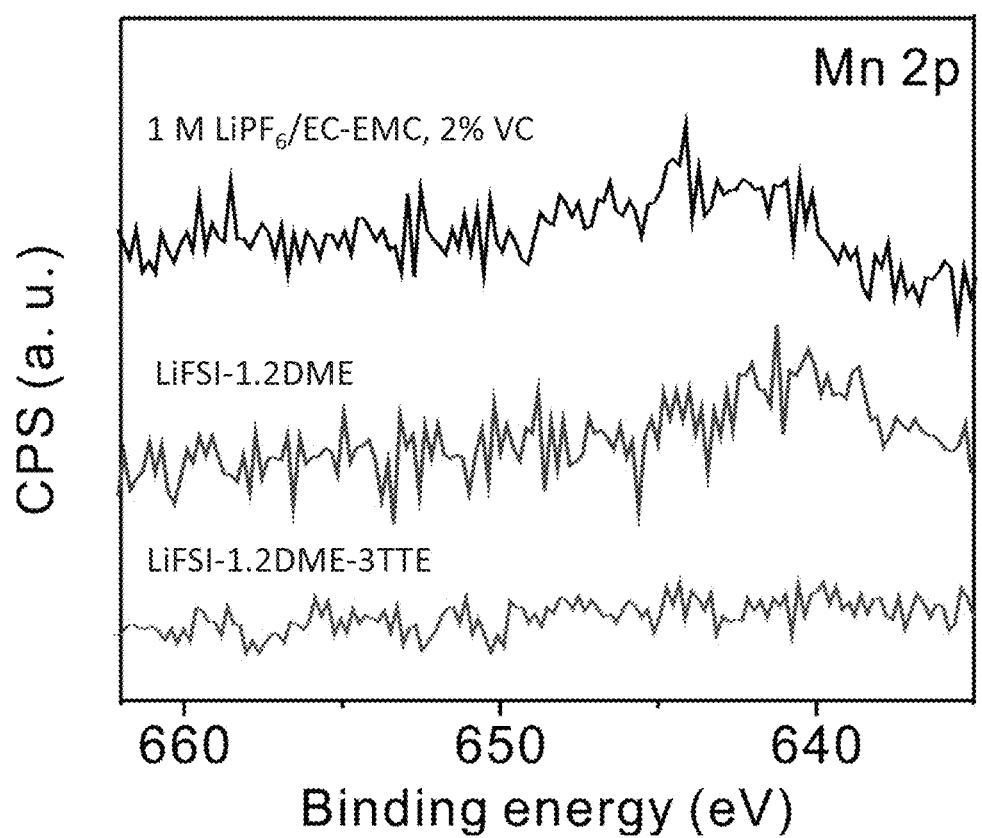
FIG. 59 shows the Mn 2p XPS spectra of Li anodes after 50 cycles from Li||NMC811 cells in a 1 M LiPF$_6$ in EC-EMC (3:7 wt) with 2% VC electrolyte, a LiFSI-1.2DME electrolyte, and a LiFSI-1.2DME-3TTE electrolyte.

In this example, the chemical compositions in the Li anode SEI layers of Li||NMC cells were characterized by XPS after 50 cycles in different electrolytes. As suggested by the high atomic ratios of C and F through Ar$^+$ depth profiling (see FIG. 58A), it is also clear that Li anode has serious side reactions with carbonate molecules and the LiPF$_6$ salt. The greatly decreased C content in the superconcentrated electrolyte (LiFSI-1.2DME, FIG. 58B) implies the SEI layered derived mainly from FSI$^-$ can effectively inhibit further side reactions. Without being limited to a particular theory, it currently is believed that the increase of F content in the LiFSI-1.2DME-3TTE electrolyte (FIG. 58C) and the further decrease of C content as well as the Li$_x$N signal that appeared suggests an improved SEI passivating ability from more complete FSI$^-$ sacrificial decomposition. Besides reducing concentrations of species reactive to Li anode, the diluent used in the LiFSI-1.2DME-3TTE electrolyte may further promote the reactions between FSI$^-$ and Li metal to suppress side reactions. At the same time, obviously lower Mn 2p signal can be seen on the Li anode cycled in the LiFSI-1.2DME-3TTE electrolyte compared to those in the conventional electrolyte and the superconcentrated electrolyte, again proving the LiFSI-1.2DME-3TTE electrolyte can enable a better cathode stability (see FIG. 59).

Interestingly, quite different Li anode morphologies were observed after long-term cycling of Li||NMC cells in different electrolytes, especially for the LiFSI-1.2DME-3TTE electrolyte (see FIGS. 58D-58F). Compared to the uneven SEI layer accumulated in the conventional electrolyte (FIG. 58D), the superconcentrated electrolyte (FIG. 58E) forms an anode SEI with a much better uniformity. Furthermore, the SEI morphology undergoes a major change in the LiFSI-1.2DME-3TTE electrolyte (FIG. 58F), where wrinkled films instead of accumulated particles as in the superconcentrated electrolyte were found. Without being limited to a particular theory, it currently is believed that such an SEI architecture is highly desirable for Li metal anodes, as the wrinkled SEI film could be very beneficial for accommodating Li metal volume changes during deposition and stripping as well as protecting against electrolyte attack.

In view of the many possible embodiments to which the principles of the present disclosure may be applied, it should be recognized that the illustrated embodiments are only examples and should not be taken as limiting the scope of the present disclosure. Rather, the scope is defined by the following claims. We therefore claim as our invention all that comes within the scope and spirit of these claims.

We claim:

1. A battery, comprising:
    an electrolyte, comprising LiFSI, DME, and TTE, wherein the molar ratio of the LiFSI to the DME ranges from 1:0.5 to 1:1.2 and wherein the LiFSI has a concentration in the electrolyte ranging from 0.2 M to 2 M; and
    a lithium metal anode, a silicon anode, a silicon/graphite composite anode, or a graphite anode;
    wherein the battery is capable of operating at a voltage of 4.5 V or higher to produce a coulombic efficiency of 99% or higher.

2. An electrolyte consisting essentially of LiFSI, DME, and TTE, wherein the molar ratio of the LiFSI to the DME is 1:1.2 or 1:1.

3. The electrolyte of claim 2, wherein the molar ratio of the LiFSI to the TTE ranges from 1:0.1 to 1:10.

4. An electrolyte, comprising LiFSI, DME, and TTE, wherein the molar ratio of the LiFSI to the DME ranges from 1:0.5 to 1:1.2 and wherein the LiFSI has a concentration in the electrolyte ranging from 0.2 M to 2 M.

5. The electrolyte of claim 4, wherein the molar ratio of the LiFSI to the TTE ranges from 1:0.1 to 1:10.

6. A battery, comprising:
    a cathode comprising a lithium cobalt oxide (LCO) material, a nickel manganese cobalt (NMC) material, or a nickel cobalt transition metal oxide (NC-TM) material;
    an anode; and
    the electrolyte of claim 2.

7. The battery of claim 6, wherein the cathode comprises the LCO material and the anode is a lithium metal anode, a silicon anode, a graphite anode, or a graphite/silicon composite anode.

8. The battery of claim 6, wherein the cathode comprises the NMC material and the anode is a lithium metal anode, a silicon anode, a graphite anode, or a graphite/silicon composite anode.

9. The battery of claim 6, wherein the battery exhibits a CE of 99.8% or more when operated at a voltage of 4.5 V or higher.

10. A battery, comprising:
    a cathode comprising a lithium cobalt oxide (LCO) material, a nickel manganese cobalt (NMC) material, or a nickel cobalt transition metal oxide (NC-TM) material;
    an anode; and
    the electrolyte of claim 4.

11. The battery of claim 10, wherein the cathode comprises the LCO material and the anode is a lithium metal anode, a silicon anode, a graphite anode, or a graphite/silicon composite anode.

12. The battery of claim 10, wherein the cathode comprises the NMC material and the anode is a lithium metal anode, a silicon anode, a graphite anode, or a graphite/silicon composite anode.

13. The battery of claim 10, wherein the battery exhibits a CE of 99.8% or more when operated at a voltage of 4.5 V or higher.

14. A method, comprising:
    providing a battery system comprising the battery of claim 1; and
    applying a voltage of 4.5 V or higher to the battery.

15. A method, comprising:
    providing a battery system comprising the battery of claim 6; and
    applying a voltage of 4.5 V or higher to the battery.

16. A method, comprising:
    providing a battery system comprising the battery of claim 10; and
    applying a voltage of 4.5 V or higher to the battery.

17. The electrolyte of claim 4, wherein the molar ratio of the LiFSI to the DME is 1:1 to 1:1.2.

* * * * *